(12) United States Patent
Li et al.

(10) Patent No.: US 12,646,227 B2
(45) Date of Patent: Jun. 2, 2026

(54) CAPTURING AND PROCESSING CONTENT FOR IN-VEHICLE AND EXTENDED DISPLAY, CURATED JOURNALING, AND REAL-TIME ASSISTANCE DURING VEHICULAR TRAVEL

(71) Applicant: Adeia Guides Inc., San Jose, CA (US)

(72) Inventors: Zhiyun Li, Kenmore, WA (US);
Ruoyun Li, Kenmore, WA (US);
Qingyun Li, Kenmore, WA (US);
Jean-Yves Couleaud, Mission Viejo, CA (US); Tao Chen, Palo Alto, CA (US); Serhad Doken, Bryn Mawr, PA (US)

(73) Assignee: ADEIA GUIDES INC., San Jose, CA (US)

( * ) Notice: Subject to any disclaimer, the term of this patent is extended or adjusted under 35 U.S.C. 154(b) by 233 days.

(21) Appl. No.: 18/498,712

(22) Filed: Oct. 31, 2023

(65) Prior Publication Data

US 2025/0139837 A1    May 1, 2025

(51) Int. Cl.
*G06T 11/00* (2026.01)
*G06F 3/01* (2006.01)
(Continued)

(52) U.S. Cl.
CPC .............. *G06T 11/00* (2013.01); *G06F 3/013* (2013.01); *G06T 7/70* (2017.01); *G06V 20/20* (2022.01);
(Continued)

(58) Field of Classification Search
CPC . G06T 11/00; G06T 7/70; G06T 2207/30201; G06T 2207/30268;
(Continued)

(56) References Cited

U.S. PATENT DOCUMENTS

2008/0201287 A1* 8/2008 Takeuchi ............... G06Q 30/08
                                                              706/46
2018/0144523 A1    5/2018 Edelman et al.
(Continued)

FOREIGN PATENT DOCUMENTS

WO        2021175749 A1    9/2021

OTHER PUBLICATIONS

U.S. Appl. No. 18/498,725, filed Oct. 31, 2023, Jean-Yves Couleaud.
(Continued)

*Primary Examiner* — Jitesh Patel
(74) *Attorney, Agent, or Firm* — HG LAW LLP

(57) ABSTRACT

Methods and systems are described for imaging and content generation. During a road trip, a driver or passenger observes an object or scene from a vehicle. From a perspective of the driver or passenger, the object or scene flows out of view in a relatively short amount of time. Images and video of the object or scene are captured with cameras. A field of view is extended beyond what the driver or passenger can easily observe. The capture is configurable to focus on particular types of objects or scenes. Recordings of billboards and road signs are easily displayed after passing the object. Object identification, gaze determination, and interest determination are provided. Curated content is generated. Applications to extended reality environments are provided. Artificial intelligence systems, including neural networks, and models are utilized to improve the imaging and content generation. Related apparatuses, devices, techniques, and articles are also described.

20 Claims, 25 Drawing Sheets

(51) Int. Cl.

| | |
|---|---|
| *G06T 7/70* | (2017.01) |
| *G06V 20/20* | (2022.01) |
| *G06V 20/59* | (2022.01) |
| *H04N 23/61* | (2023.01) |

(52) U.S. Cl.
CPC .......... *G06V 20/597* (2022.01); *H04N 23/61*
(2023.01); *G06T 2207/30201* (2013.01); *G06T*
*2207/30268* (2013.01)

(58) Field of Classification Search
CPC ...... G06F 3/013; G06V 20/20; G06V 20/597;
G06V 40/18; H04N 23/61
See application file for complete search history.

(56) References Cited

U.S. PATENT DOCUMENTS

| | | | |
|---|---|---|---|
| 2018/0349948 A1* | 12/2018 | Dow ................. | G06Q 30/0244 |
| 2019/0246036 A1 | 8/2019 | Wu et al. | |
| 2019/0374151 A1 | 12/2019 | Paudel et al. | |
| 2021/0096802 A1* | 4/2021 | Faaborg .................. | G06F 3/012 |
| 2022/0292841 A1* | 9/2022 | Corrodi .................... | B60R 1/26 |
| 2024/0144608 A1 | 5/2024 | Panainte | |
| 2025/0139838 A1 | 5/2025 | Couleaud et al. | |

OTHER PUBLICATIONS

Auto-Vox "OEM Rear View Mirror Camera, Recording Wide View Back Up Camera for Cars, Smart Full Touch Screen Stream Media Backup Camera with Super Night Vision" (https://www.amazon.com/AUTO-VOX-Backup-Camera-9-35Stream-Screen/dp/B08FT4VC37/?th=1),(8 pages).

Brandt, "New 'Smart Glass' Tech Turns Car Windows into Video Screens," (https://www.thedrive.com/article/11347/new-smart-glass-tech-turns-car-windows-into-video-screens) (2019).

Indeed How Much Does a Billboard Cost (and Is It Worth It), (https://www.indeed.com/hire/c/info/how-much-does-a-billboard-cost),(9 pages).

Liu, et al. "Jitter Does Matter: Adapting Gaze Estimation to New Domains" (State Key Laboratory of VR Technology and Systems School of CSE, Beihang University), (9 pages).

Mertens, "Continental wants to wrap an automobile's A-Pillar with flexible OLEDs to combat blind spots," CNET, Automotive OLEDs Flexible OLED (https://www.oled-info.com/continental-wants-warp-automobiles-pillar-flexible-oleds-combat-blind-spots) (4 pgs).

U.S. Appl. No. 18/196,938, filed May 12, 2023, "User Interface Method and Apparatus for Vehicle Display".

U.S. Appl. No. 18/498,725, filed Oct. 31, 2023, "Capturing and Processing Content for In-Vehicle and Extended Display, Curated Journaling, and Real-Time Assistance During Vehicular Travel".

\* cited by examiner

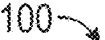
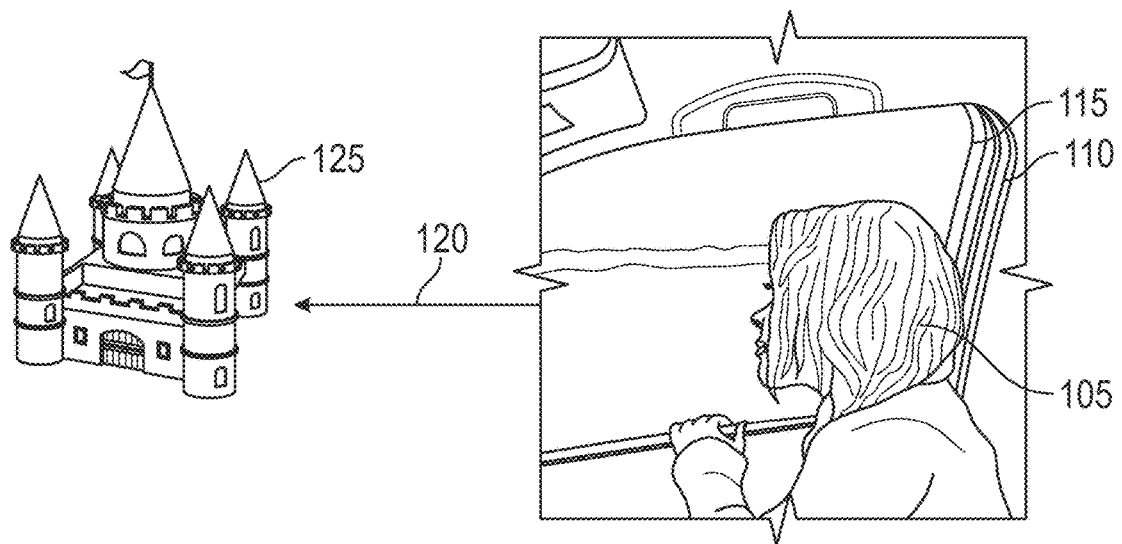
FIG. 1A
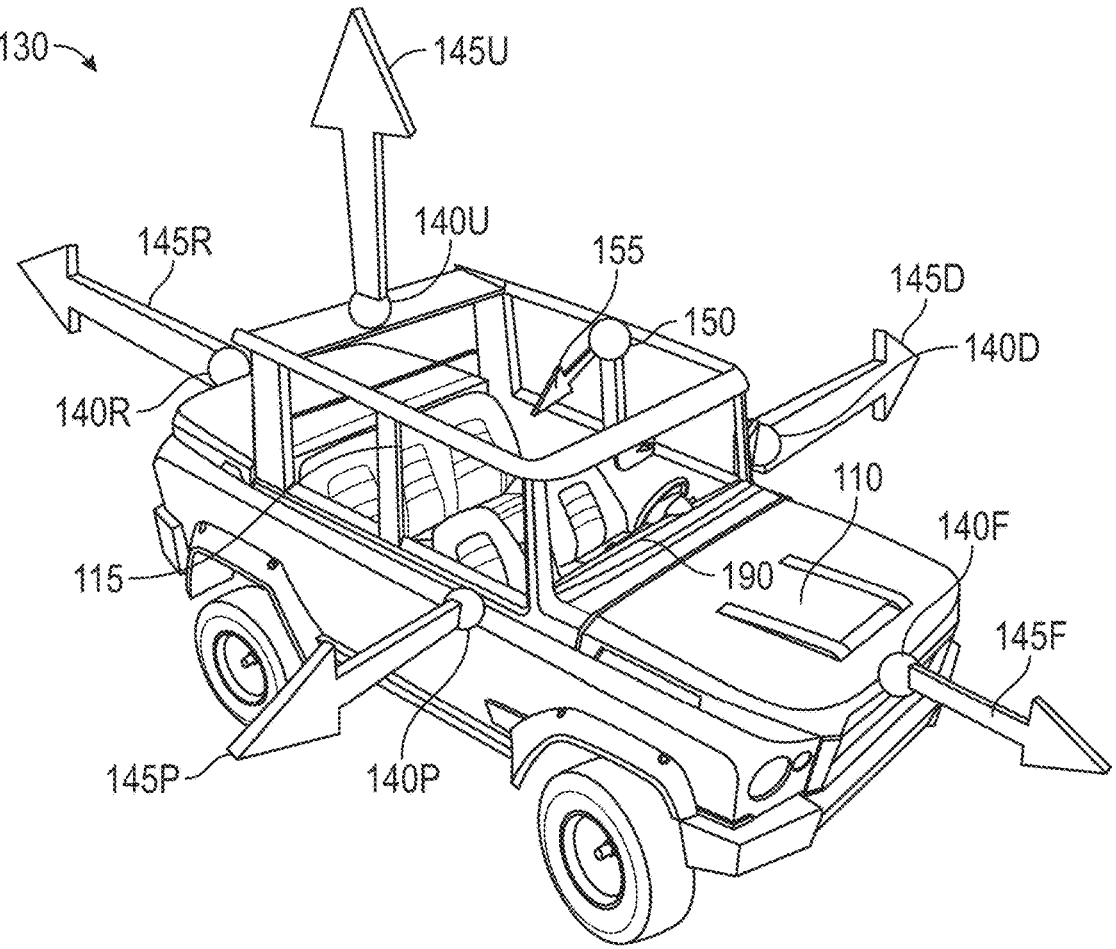
FIG. 1B

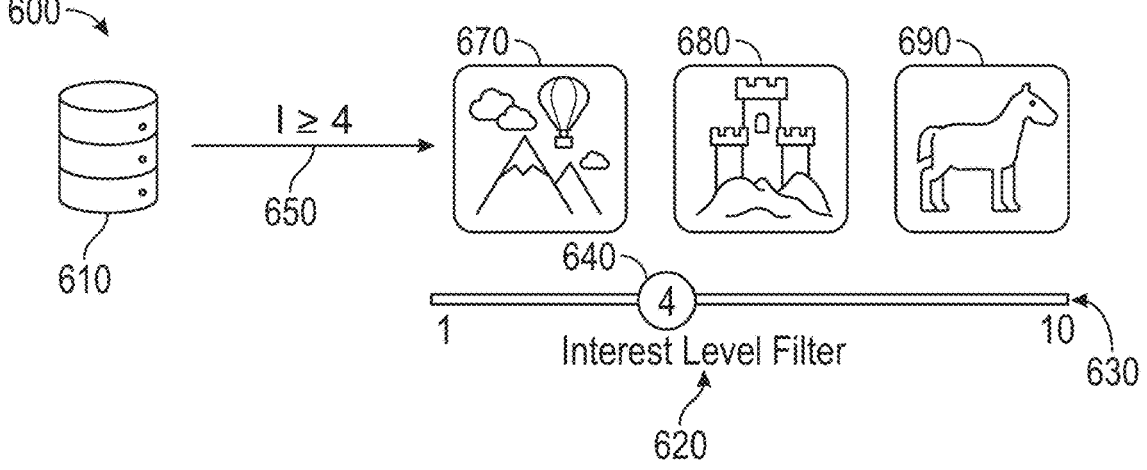
FIG. 6
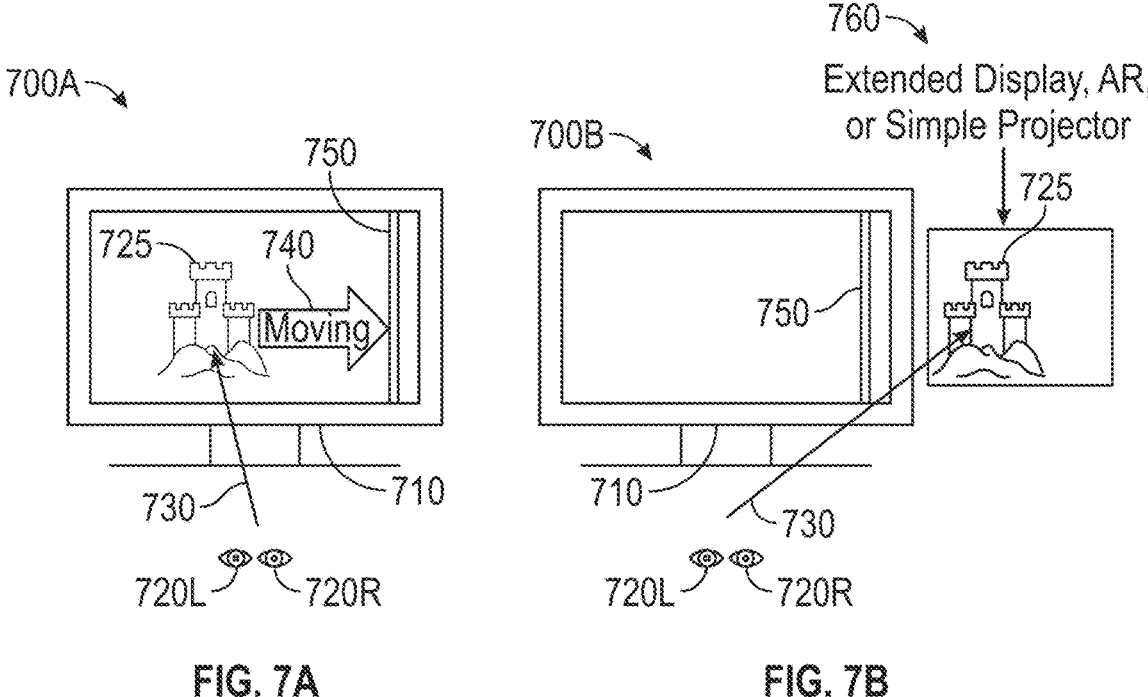
FIG. 7A          FIG. 7B
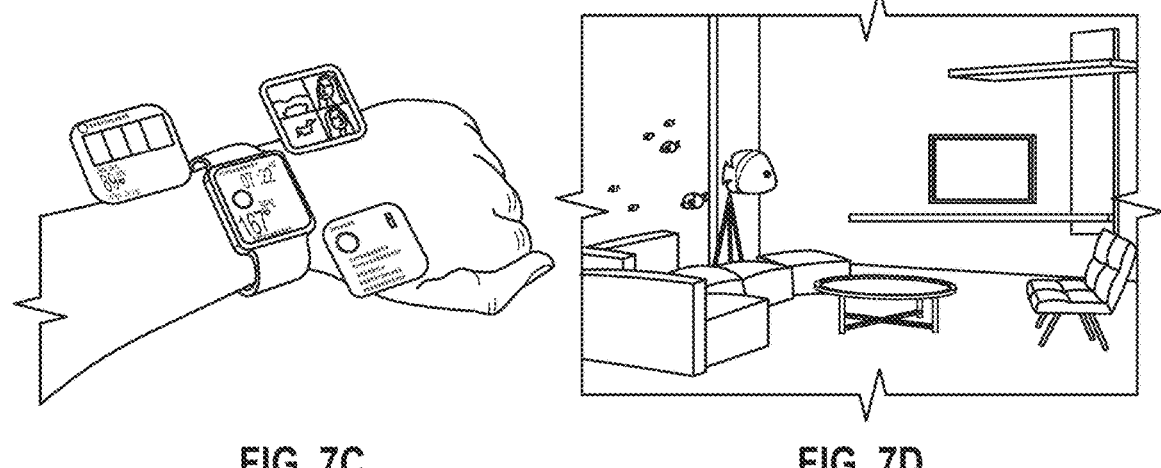
FIG. 7C          FIG. 7D

900
(Cont.)

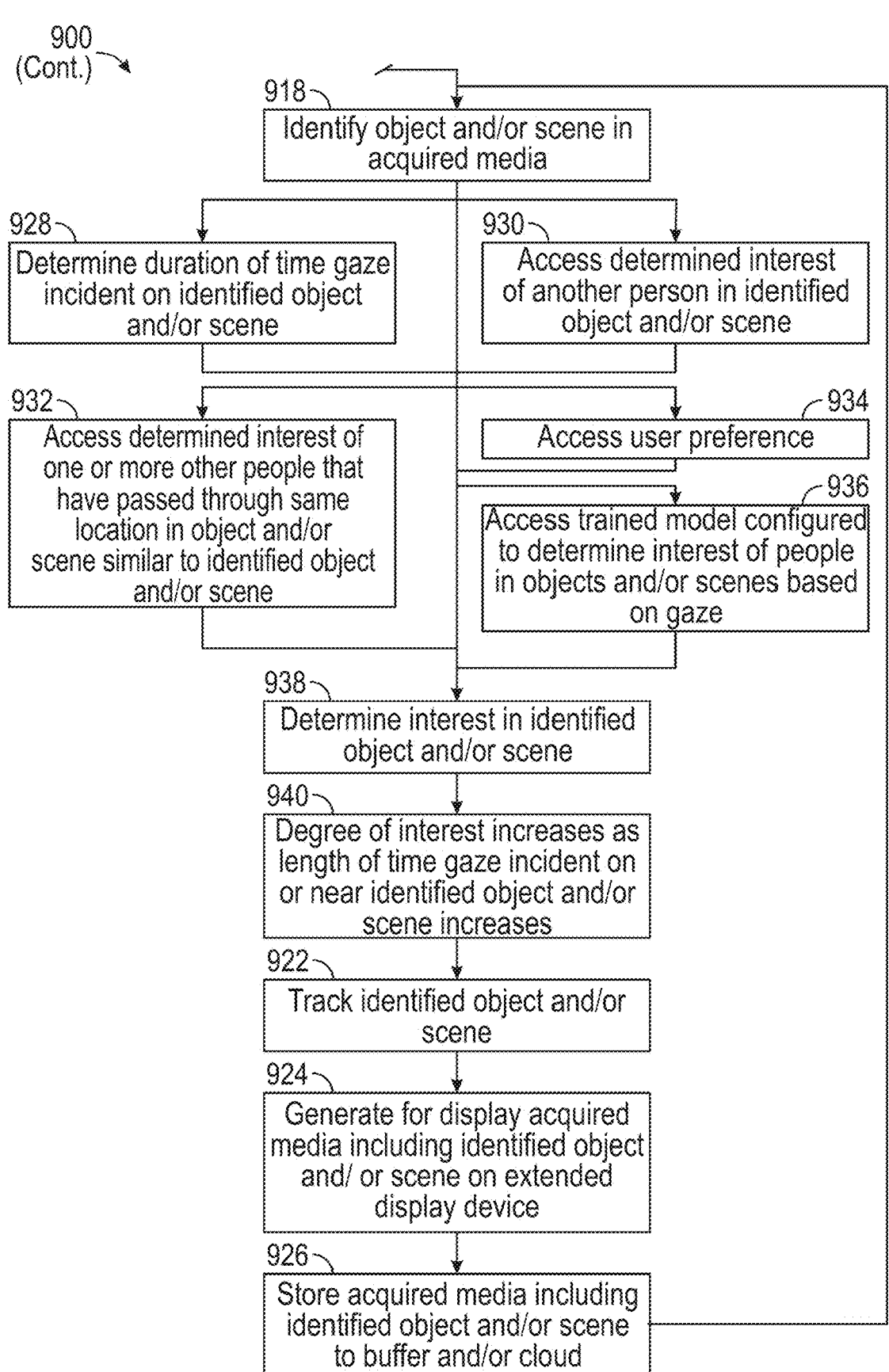

918 — Identify object and/or scene in acquired media

928 — Determine duration of time gaze incident on identified object and/or scene 930 — Access determined interest of another person in identified object and/or scene 932 — Access determined interest of one or more other people that have passed through same location in object and/or scene similar to identified object and/or scene 934 — Access user preference 936 — Access trained model configured to determine interest of people in objects and/or scenes based on gaze 938 — Determine interest in identified object and/or scene 940 — Degree of interest increases as length of time gaze incident on or near identified object and/or scene increases 922 — Track identified object and/or scene 924 — Generate for display acquired media including identified object and/ or scene on extended display device 926 — Store acquired media including identified object and/or scene to buffer and/or cloud

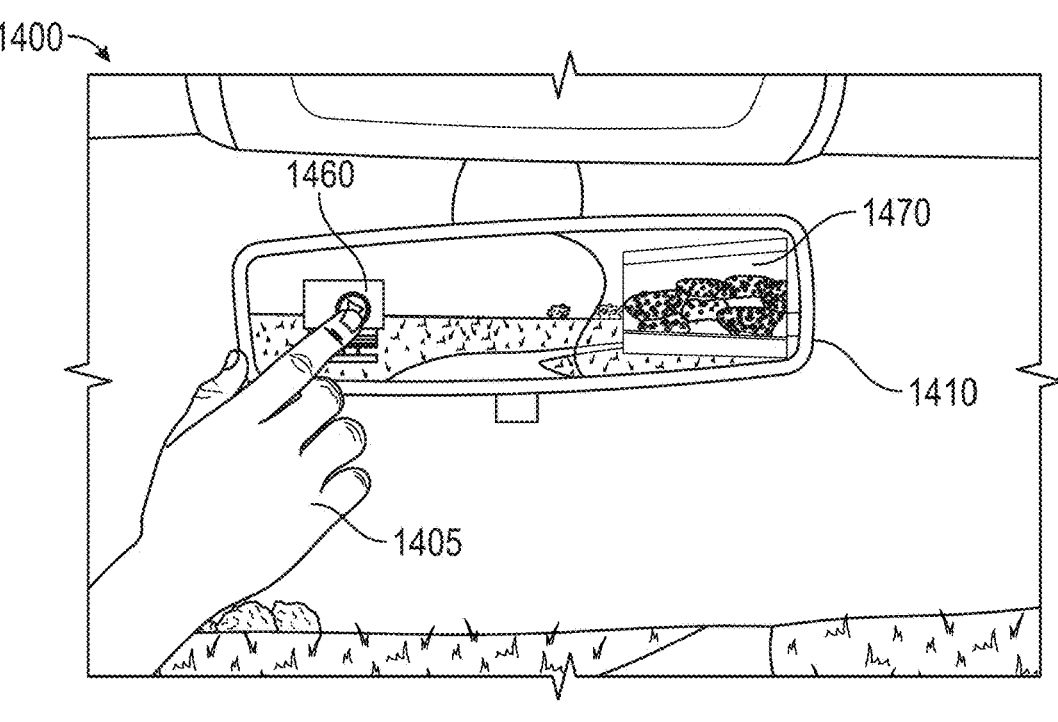
FIG. 14
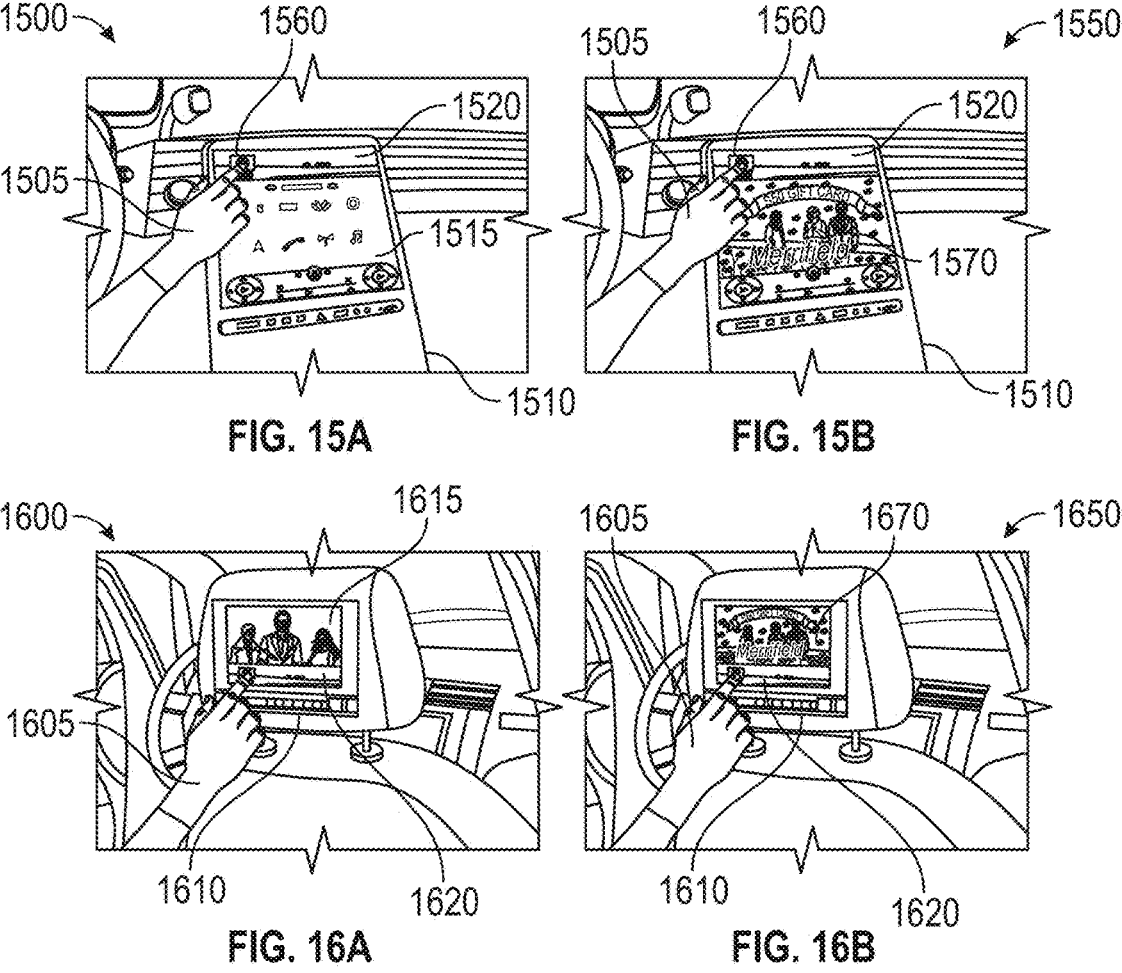
FIG. 15A
FIG. 15B
FIG. 16A
FIG. 16B

1900

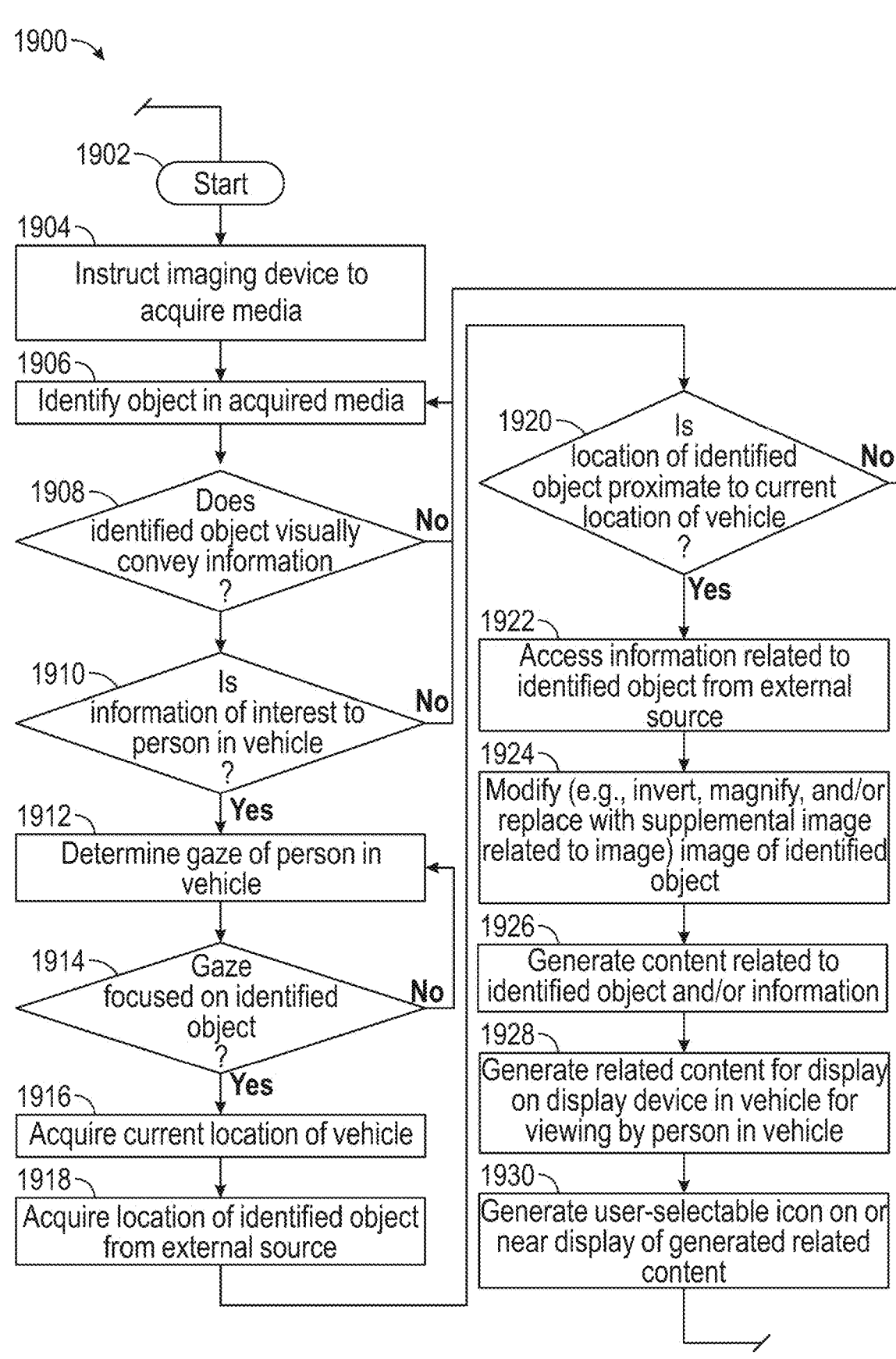

1902 — Start

1904 — Instruct imaging device to acquire media

1906 — Identify object in acquired media

1908 — Does identified object visually convey information? — No

1910 — Is information of interest to person in vehicle? — No

1912 — Determine gaze of person in vehicle — Yes

1914 — Gaze focused on identified object? — No

1916 — Acquire current location of vehicle — Yes

1918 — Acquire location of identified object from external source

1920 — Is location of identified object proximate to current location of vehicle? — No

1922 — Access information related to identified object from external source — Yes

1924 — Modify (e.g., invert, magnify, and/or replace with supplemental image related to image) image of identified object 1926 — Generate content related to identified object and/or information 1928 — Generate related content for display on display device in vehicle for viewing by person in vehicle 1930 — Generate user-selectable icon on or near display of generated related content

1932 — User selection of user-selectable icon on or near display of generated related content ?

No

Yes

1934 — Generate for display additional content related to generated related content, interactive material related to generated related content, and/or turn-by-turn directions to a real-world location associated with identified object

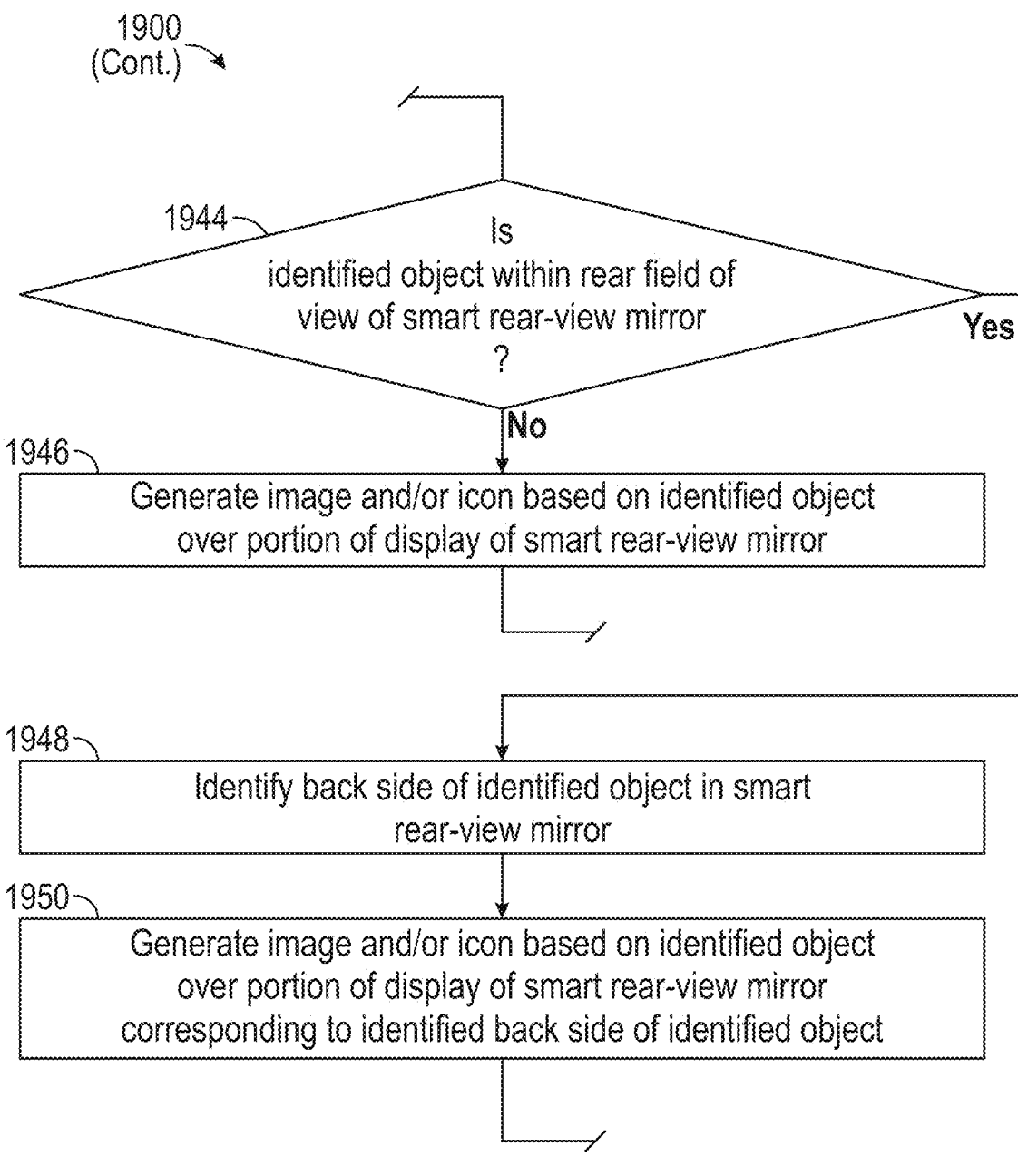

1900
(Cont.)

1944 — Is identified object within rear field of view of smart rear-view mirror ?

Yes

No

1946 — Generate image and/or icon based on identified object over portion of display of smart rear-view mirror 1948 — Identify back side of identified object in smart rear-view mirror 1950 — Generate image and/or icon based on identified object over portion of display of smart rear-view mirror corresponding to identified back side of identified object

FIG. 19D

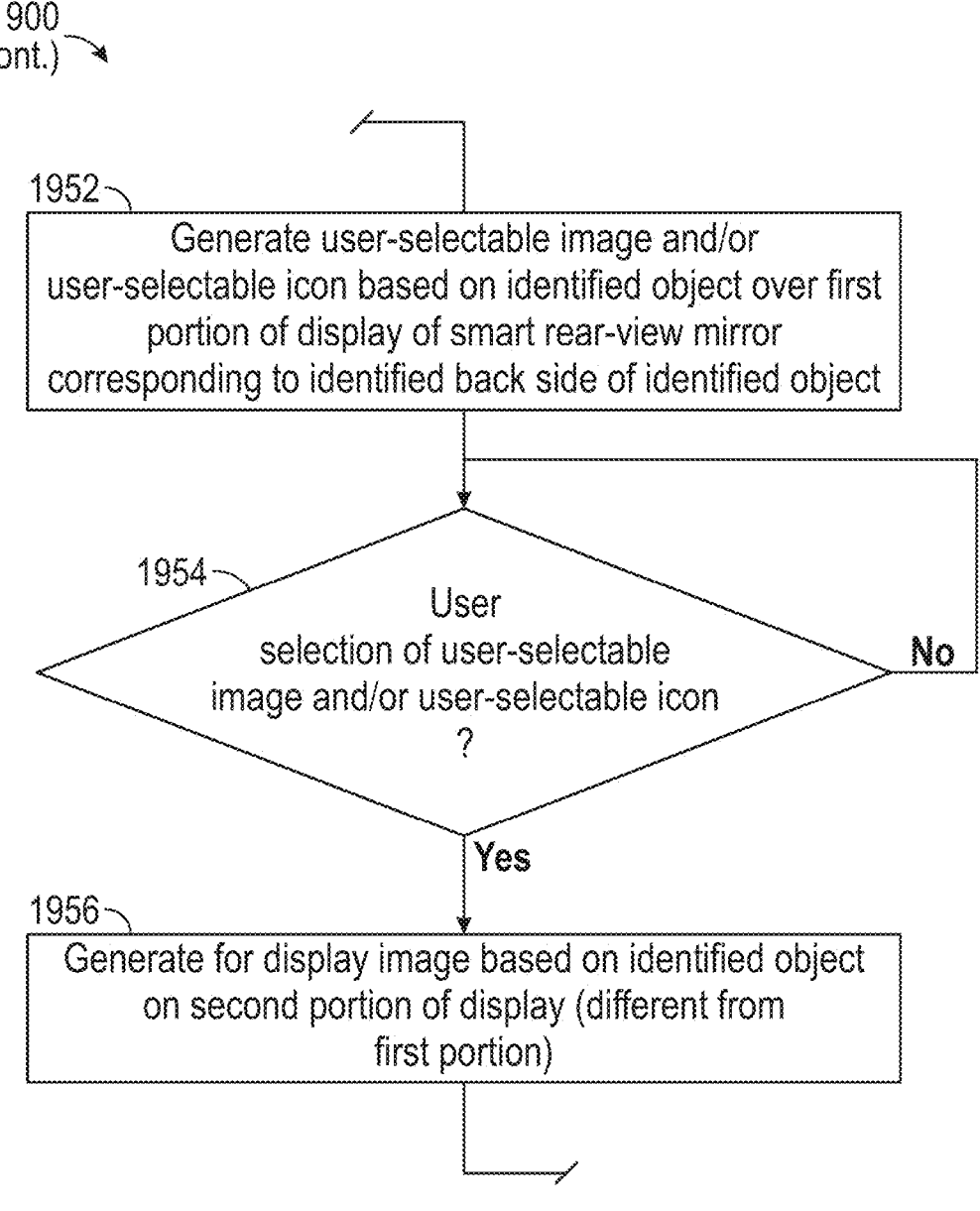

1900
(Cont.)

1952
Generate user-selectable image and/or
user-selectable icon based on identified object over first
portion of display of smart rear-view mirror
corresponding to identified back side of identified object 1954
User
selection of user-selectable
image and/or user-selectable icon
?

No

Yes

1956
Generate for display image based on identified object
on second portion of display (different from
first portion)

FIG. 19E

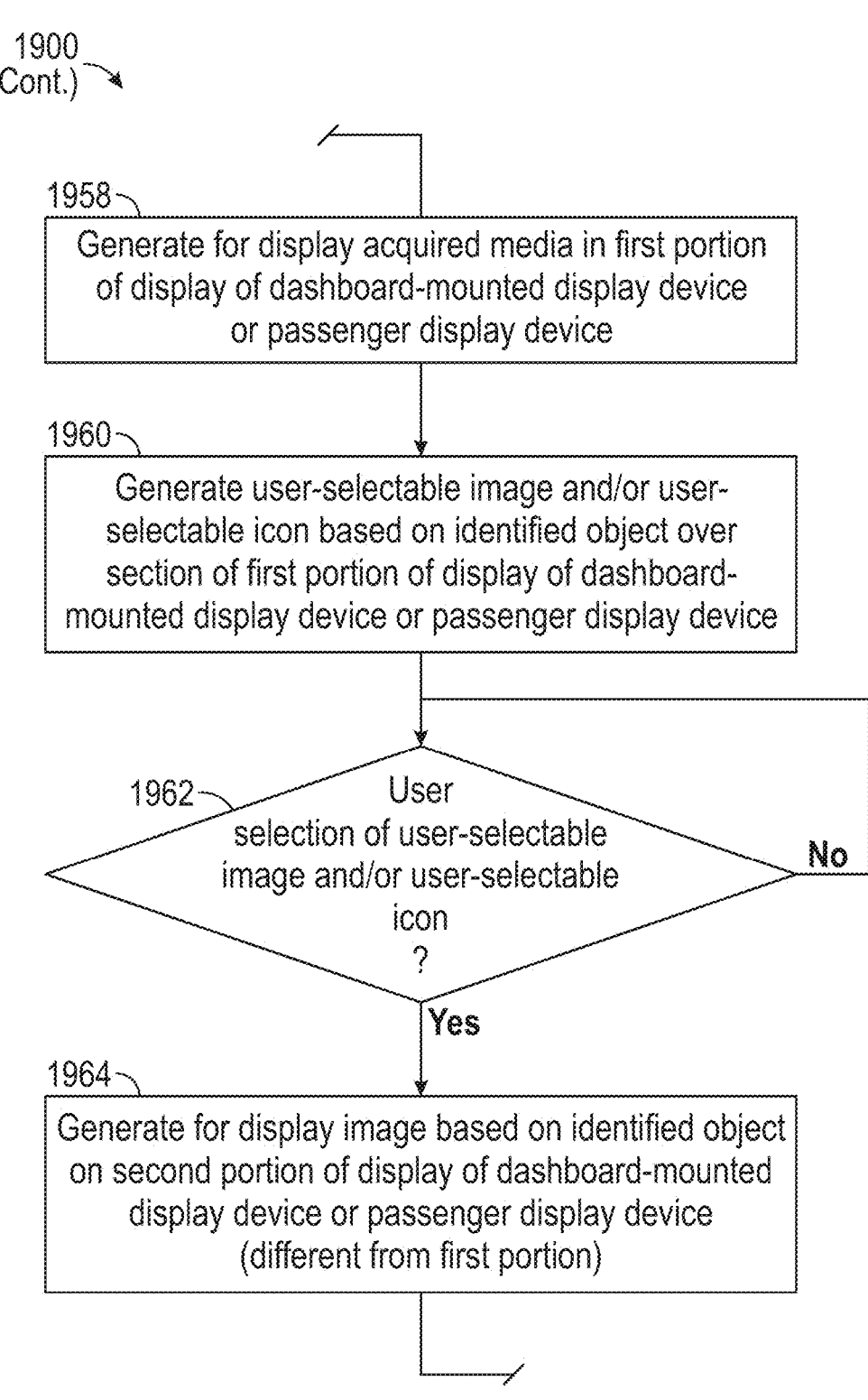

1900
(Cont.)

1958 —
Generate for display acquired media in first portion
of display of dashboard-mounted display device
or passenger display device 1960 —
Generate user-selectable image and/or user-
selectable icon based on identified object over
section of first portion of display of dashboard-
mounted display device or passenger display device 1962 — User
selection of user-selectable
image and/or user-selectable
icon
?

No

Yes

1964 —
Generate for display image based on identified object
on second portion of display of dashboard-mounted
display device or passenger display device
(different from first portion)

FIG. 19F 1900
(Cont.)

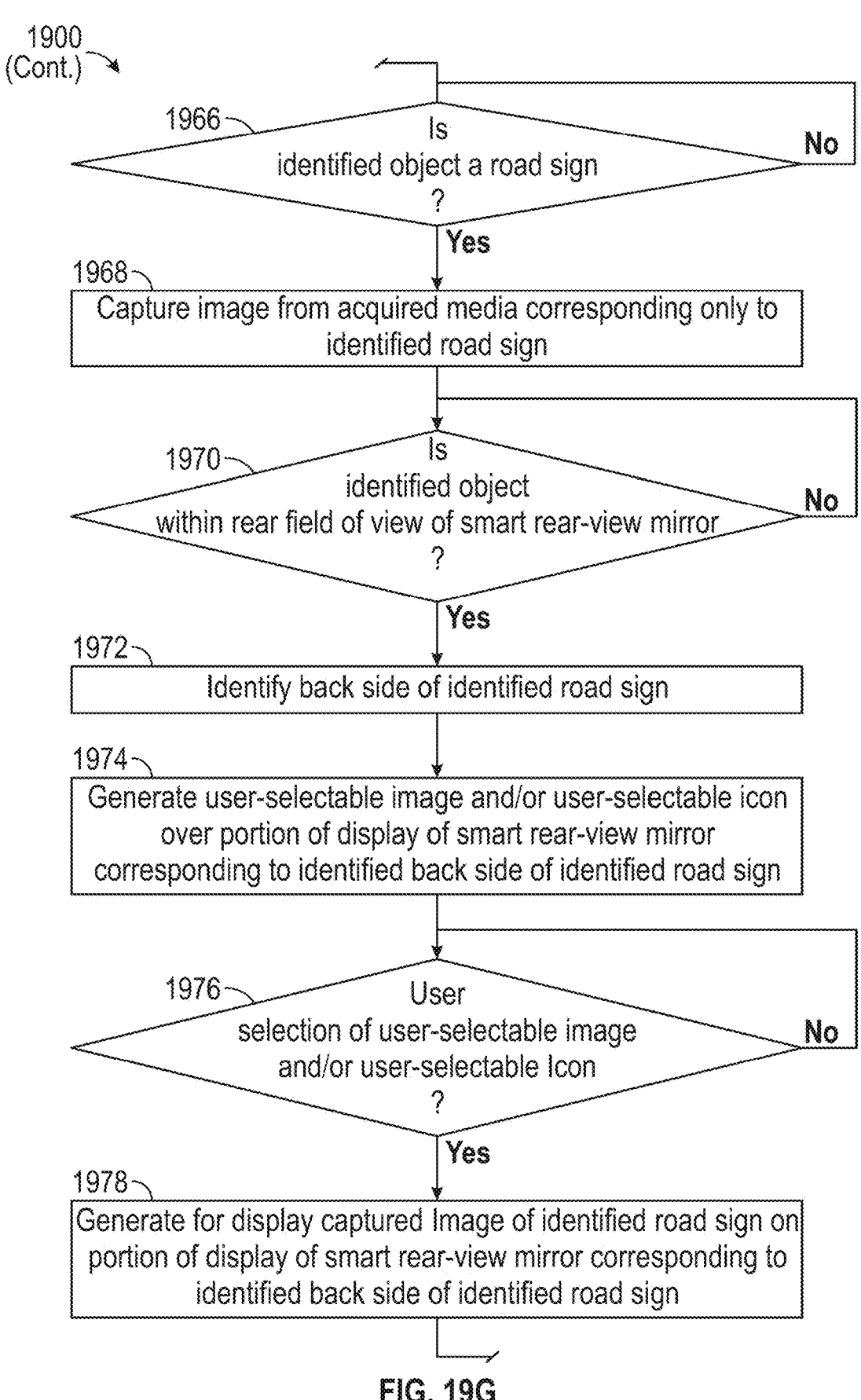

1966 — Is identified object a road sign ? — No

Yes

1968 — Capture image from acquired media corresponding only to identified road sign 1970 — Is identified object within rear field of view of smart rear-view mirror ? — No Yes 1972 — Identify back side of identified road sign 1974 — Generate user-selectable image and/or user-selectable icon over portion of display of smart rear-view mirror corresponding to identified back side of identified road sign 1976 — User selection of user-selectable image and/or user-selectable Icon ? — No Yes 1978 — Generate for display captured Image of identified road sign on portion of display of smart rear-view mirror corresponding to identified back side of identified road sign

FIG. 19G

CAPTURING AND PROCESSING CONTENT FOR IN-VEHICLE AND EXTENDED DISPLAY, CURATED JOURNALING, AND REAL-TIME ASSISTANCE DURING VEHICULAR TRAVEL

FIELD OF THE DISCLOSURE

The present disclosure relates to imaging and content generation.

SUMMARY

As the transportation industry transitions from manually operated vehicles to semi-autonomous and fully autonomous vehicles, drivers are decreasingly actively concerned about safety, and are more available for and desirous of purely enjoyable activities such as looking out the vehicle's windows at passing scenery. Drivers and passengers alike increasingly desire an ability to create, store, share, cast, and contemporaneously or later view these experiences.

In one approach, visual data is acquired in vehicles. A person's gaze point and gesture trigger a camera for capture of visual data. However, the approach is limited to using gaze to guide the camera in a desired direction.

In another approach, images are captured inside a vehicle based on detection of a gesture performed by a user. However, the approach is focused on taking interior pictures of the vehicle, e.g., "selfies."

In still another approach, a flexible OLED is wrapped around a portion of a vehicle's A-pillar to eliminate a typical blind spot caused by the A-pillar. However, this approach merely displays what is blocked by the A-pillar regardless of where a driver is looking.

In yet another approach, vehicle windows are electronically substituted with video displays (e.g., "smart glass"), particularly when the vehicle is parked. However, smart glass is merely another type of display.

In a further approach, roadside billboards are installed to advertise goods and services in the vicinity of the billboards. Although ubiquitous, such billboards lack targeting and tracking capabilities.

In a still further approach, digital billboards include dynamic displays. While dynamic in content, such digital billboards are static in location, generally limited to a pre-configured series of displays, and also do not include targeting and tracking capabilities.

In a yet further approach, rear-view mirrors include a built-in display. Front-facing and rear-facing cameras capture views from the vehicle for display on the built-in display. However, these mirrors are limited to functions relating to backing a vehicle, and simplistic and archival forms of video capture.

To overcome the limitations and problems of these and other approaches, methods and systems are provided to eliminate a need for a passenger (and/or driver) of a vehicle to operate a recording device such as a smartphone camera. The various features described herein allow passengers (and, as appropriate, drivers during a semi-or fully autonomous driving mode) to instead enjoy the experience around them, as appropriate.

Eye gaze is tracked in some embodiments. At least one of the user's gaze, a position of one or more of the user's eyes, a direction of the user's gaze, a duration of time that the user's gaze is incident on an object, a speed of movement of the user's gaze, combinations of the same, or the like is determined.

Objects are identified in some embodiments. For example, an interest in the identified object is determined. In another example, one or more objects are identified based on at least one of the user's gaze, a position of one or more of the user's eyes, a direction of the user's gaze, a duration of time that the user's gaze is incident on an object, a speed of movement of the user's gaze, a determined interest of another passenger in the vehicle, a determined interest of one or more other people that have passed through the same location, a trained model, one or more user preferences, a type of imagery visible from the vehicle, combinations of the same, or the like. The interest in the object is determined based on similar inputs. In some embodiments, the objects of interest are, in particular, roadside billboards. The objects of interest are not limited to billboards and include without limitation any physical conveyance of information. The conveyance is associated with a business or physical place, in some embodiments.

A determination and/or prediction of when an object of interest is nearing or moving out of view of one or more users (also referred to herein as a "scene overflow" condition) is performed. Compensation is made for movement of the vehicle. A trigger associated with the scene overflow condition is identified. The user's gaze is tracked, for example, at least until the scene overflow condition occurs or is about to occur. Capture of the scene continues even after the overflow conditions occur (e.g., by changing a focus and/or utilizing one or more additional cameras). A focus of the one or more cameras is directed to capture the selected objects for a duration of time necessary to generate desirable media content items.

In some embodiments, the object of interest, such as, for example, a roadside billboard, is identified and converted for display on a display device, such as at least one of a rear-view mirror, a head-up display (HUD), an infotainment system display, a rear passenger display, a portable device (e.g., a smartphone) determined to be present in the vehicle, combinations of the same, or the like. A location of a vehicle is detected. A location of a billboard is obtained in advance and/or determined based on an identified object being associated with a billboard. An image overlay (e.g., an expanded companion advertisement) is generated for display, e.g., on a portion of the rear-view mirror configured for supplemental displays. The image is configurable in any suitable manner including inversion, magnification, replacement with a supplemental image related to the inputted image, and the like. The image is controllable. The image includes, in some embodiments, a user-selectable icon, that, upon selection, generates additional content or interactive material. In some embodiments, the user selection of the image and/or the icon triggers turn-by-turn directions via a mapping application. In some embodiments, the display of the image is triggered by a determination that the physical billboard has passed out of view or is otherwise likely to be illegible to the driver or passenger in the vehicle.

Resulting content is stored (locally or remotely). The content is generated for display. The content is curated for an extended display for one or more passengers, regardless of whether they are focused on the outside of the vehicle. Search and review capabilities are provided for the generated content. In some embodiments, content is configured to be cast for remote display on a device that is not present in the vehicle, e.g., cast to a family member interested in the journey.

Mobile and automotive implementations are provided. Images and information about the captured images are analyzed and processed to identify targets and produce desirable media content items.

Content captured during travel is displayed on in-vehicle displays. Also, in some embodiments, the content is displayed on extended displays and/or shared to remote servers. Extended and virtual reality applications are provided.

During road trips, curated journals of objects and scenes of interest to the driver and passengers are generated and stored for contemporaneous and/or later enjoyment.

Driver assistance is improved with smart displays relating to objects or scenes that are out of view at a later point in time (e.g., after a vehicle passes an important sign or billboard).

The present invention is not limited to the combination of the elements as listed herein and may be assembled in any combination of the elements as described herein. These and other capabilities of the disclosed subject matter will be more fully understood after a review of the following figures, detailed description, and claims.

BRIEF DESCRIPTIONS OF THE DRAWINGS

The present disclosure, in accordance with one or more various embodiments, is described in detail with reference to the following figures. The drawings are provided for purposes of illustration only and merely depict non-limiting examples and embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The embodiments herein may be better understood by referring to the following description in conjunction with the accompanying drawings, in which like reference numerals indicate identical or functionally similar elements, of which:

FIG. 1A depicts a passenger in a vehicle observing an object of interest through a window of the vehicle, in accordance with some embodiments of the disclosure;

FIG. 1B depicts the vehicle of FIG. 1A including outwardly and one inwardly facing imaging devices, each depicted with a predominant direction of a centerline of the respective imaging device, in accordance with some embodiments of the disclosure;

Figure 2:
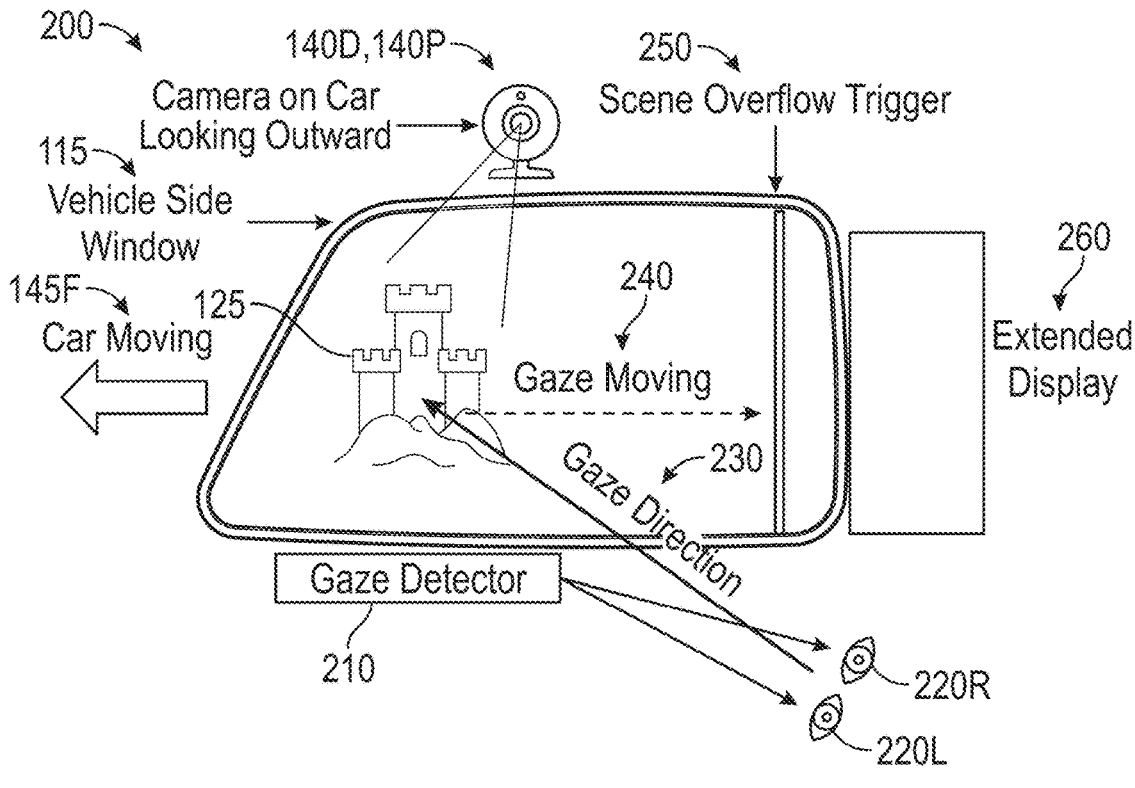
Figure 3:
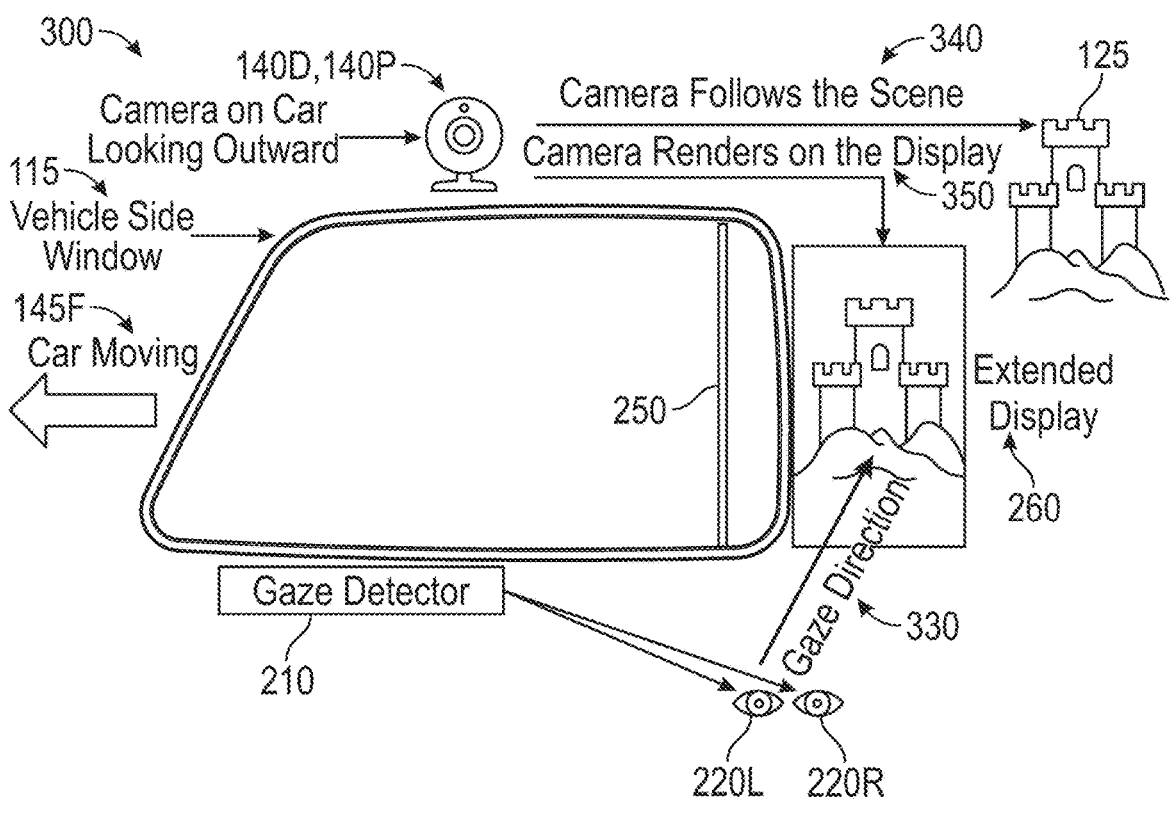
Figures 4, 5:
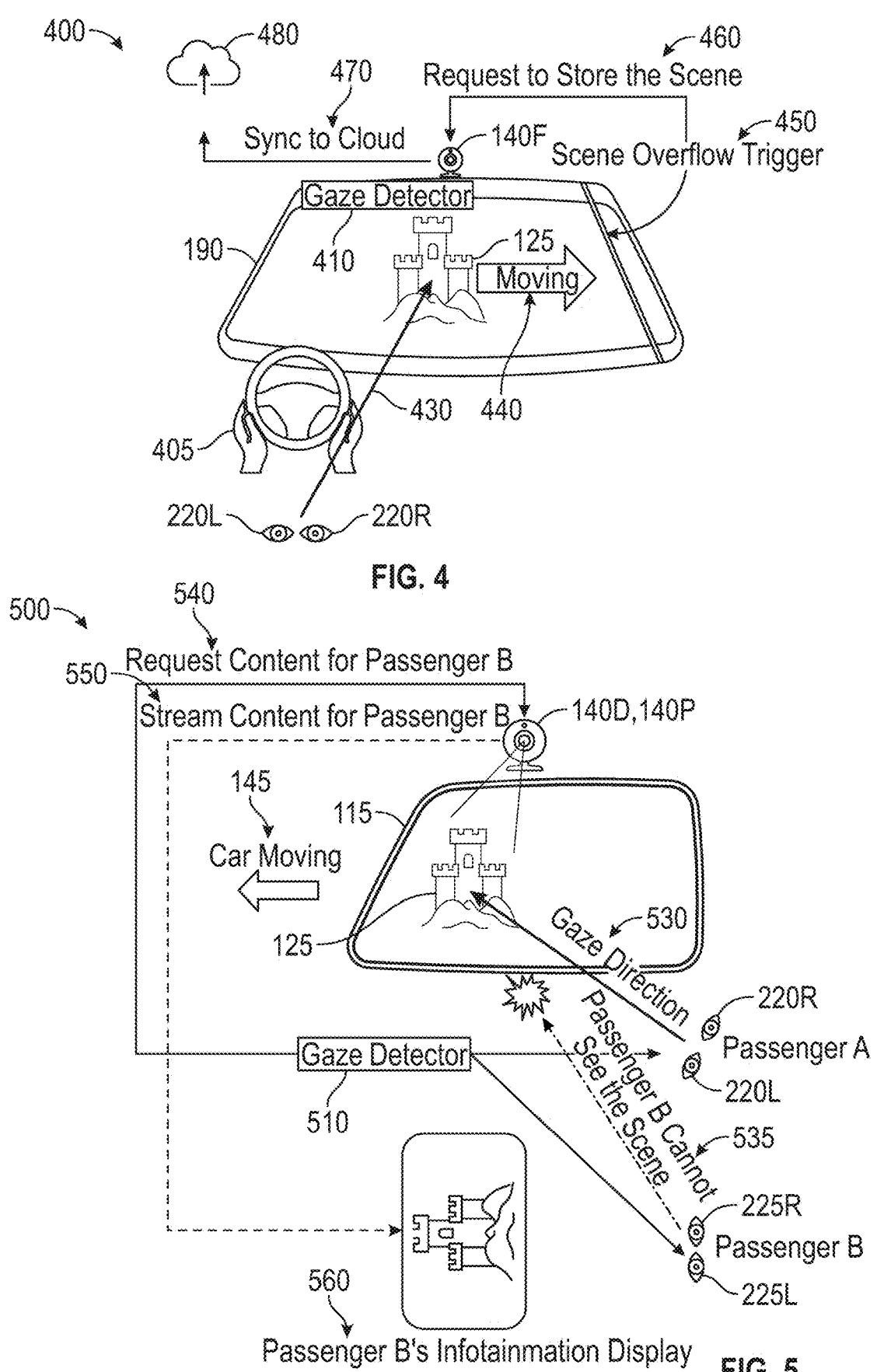
Figure 8:
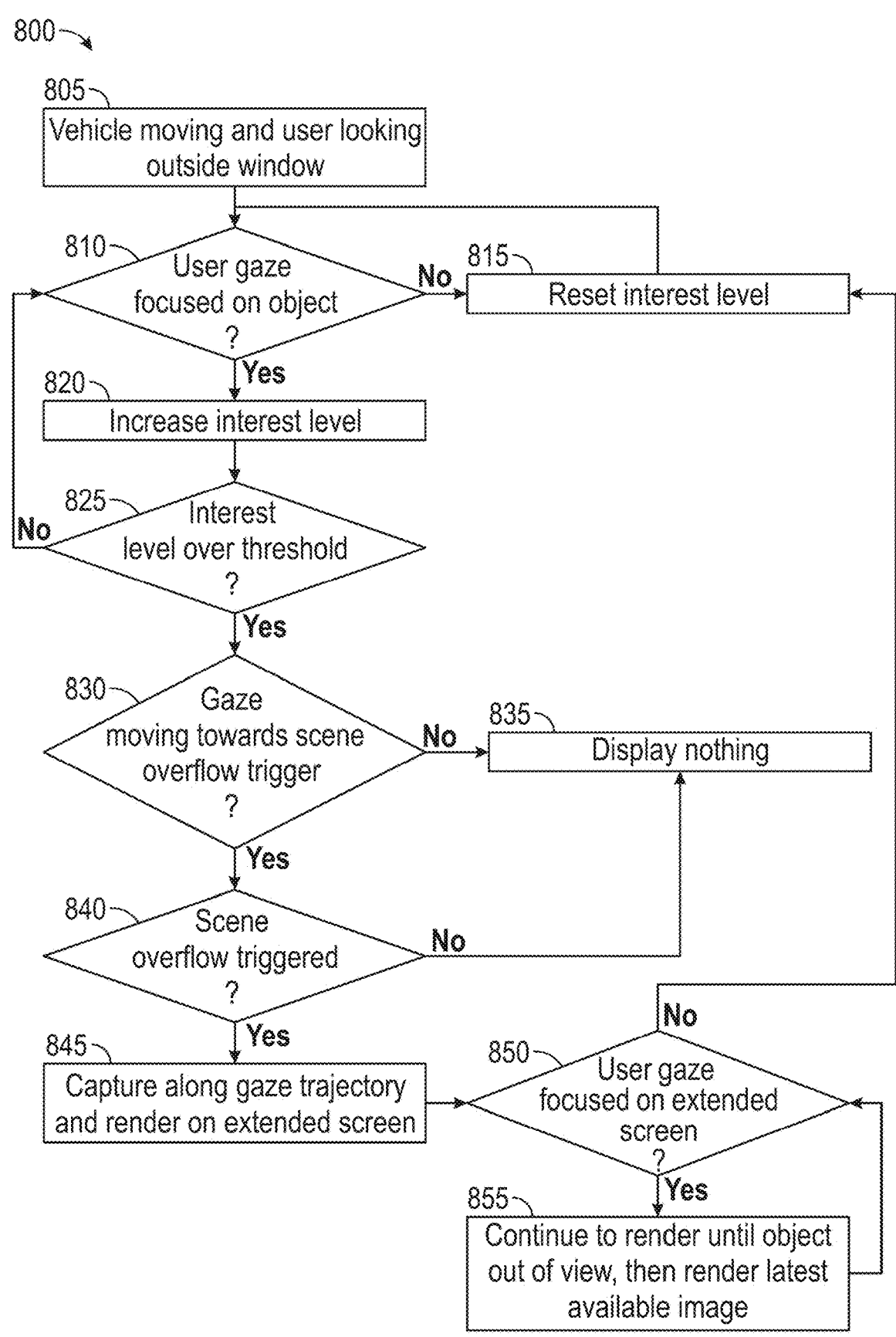
Figure 9A:
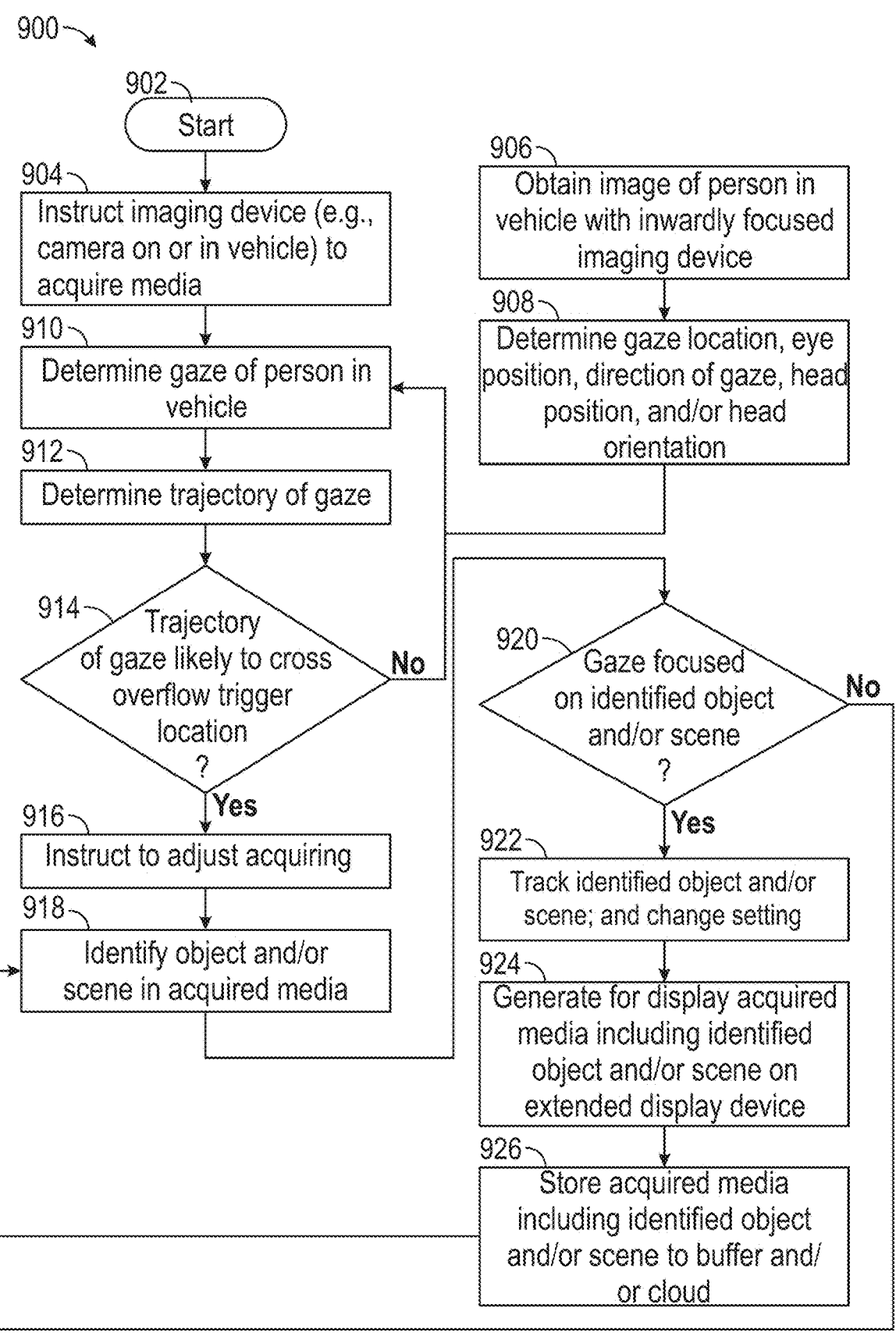
Figure 9C:
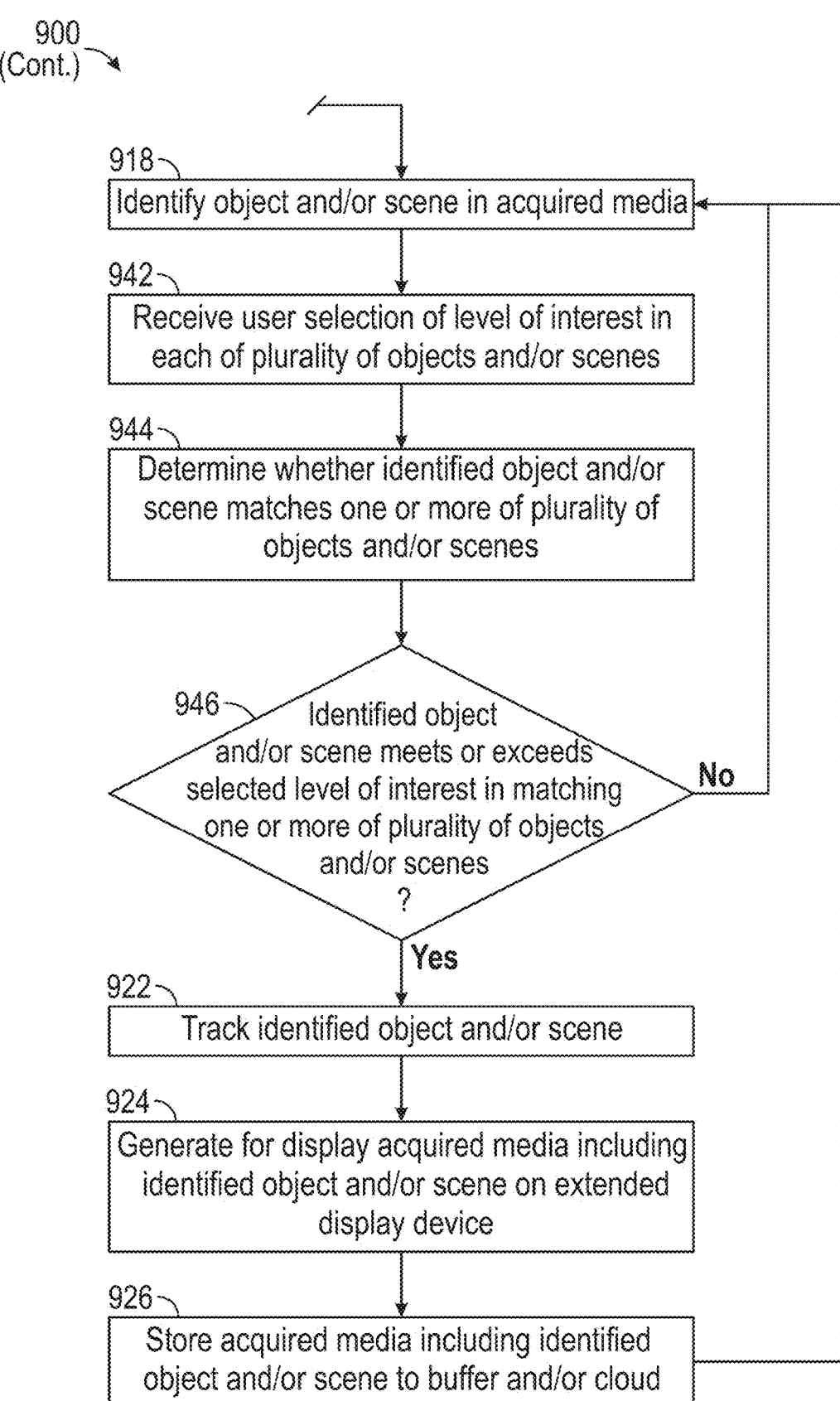
Figure 9D:
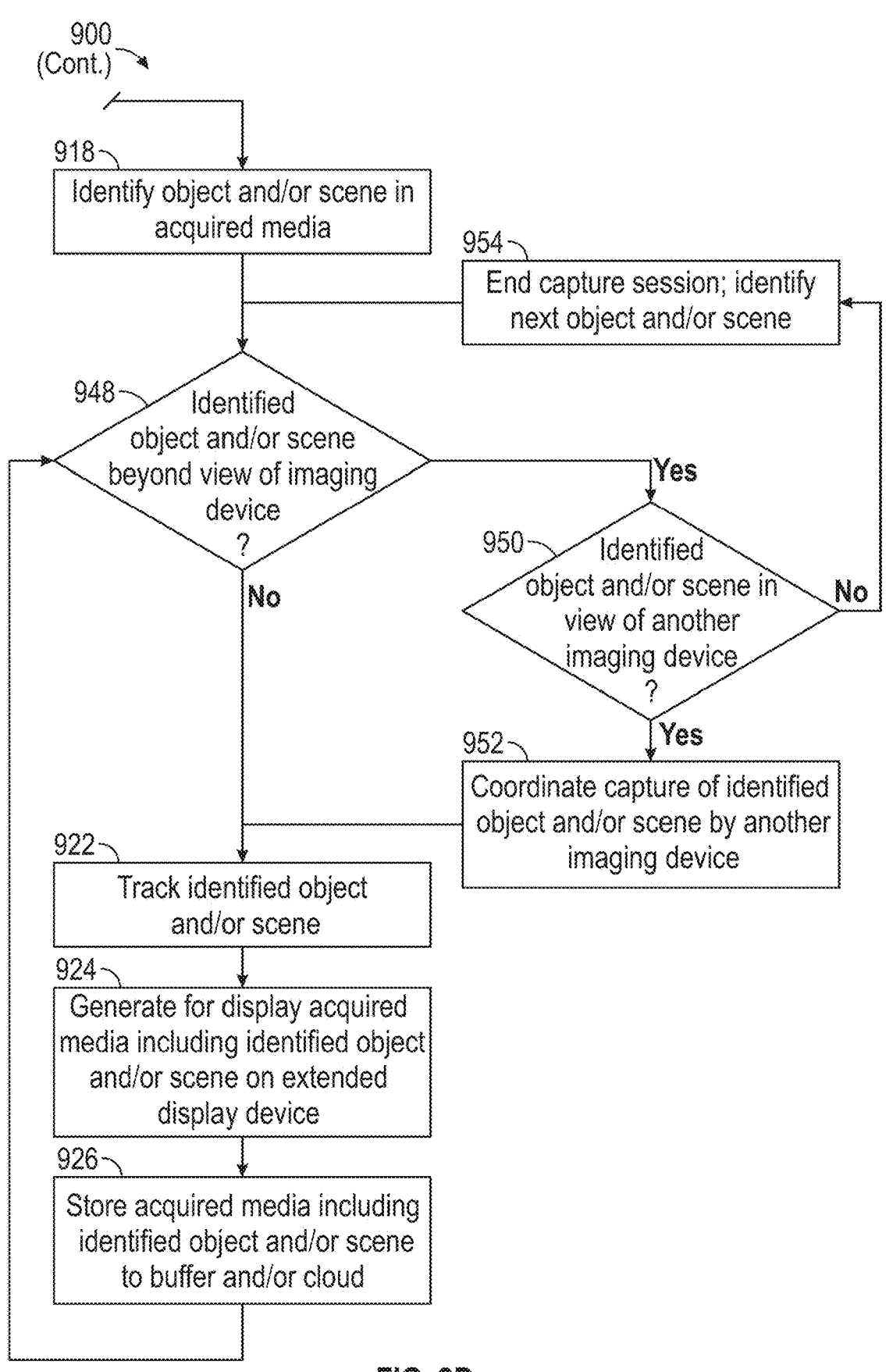
Figure 9E:
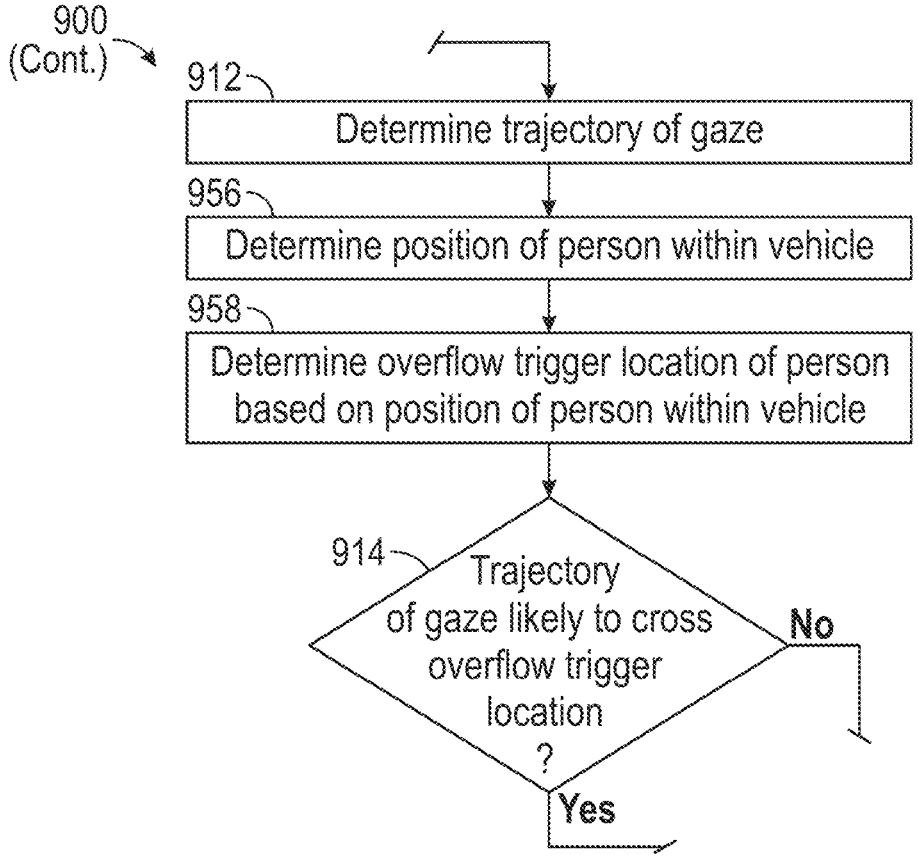
Figure 9F:
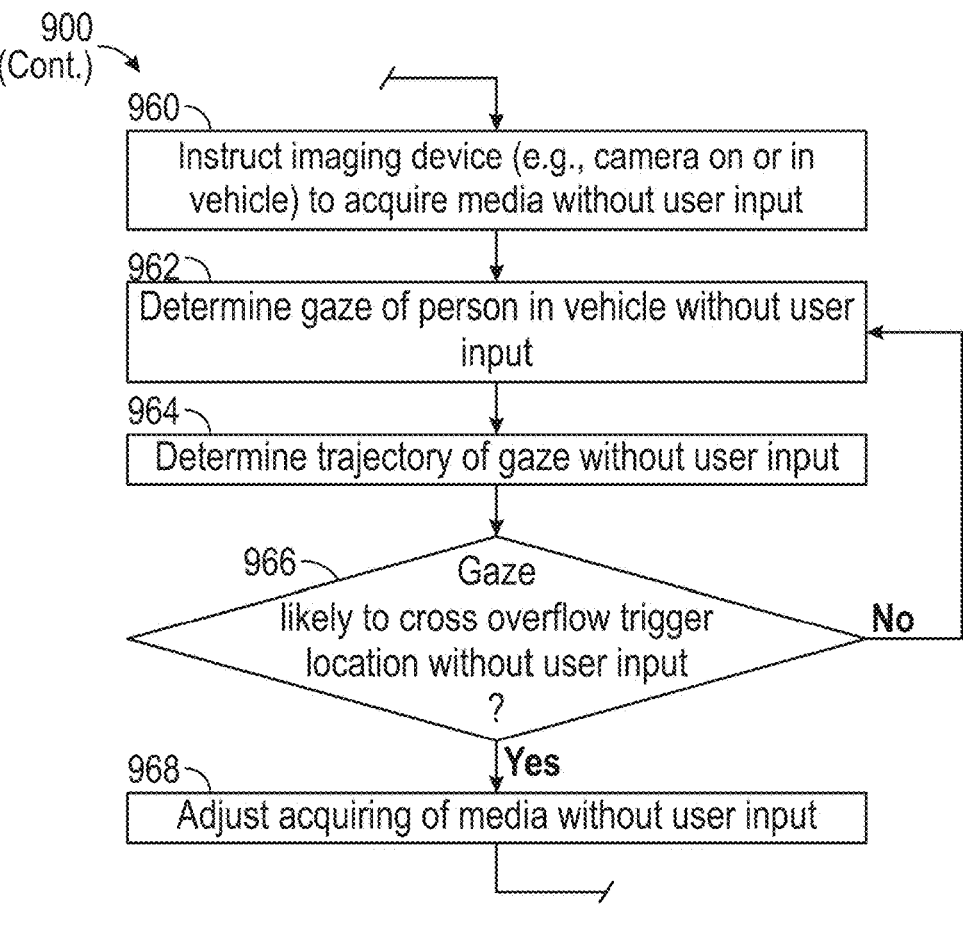
Figure 9G:
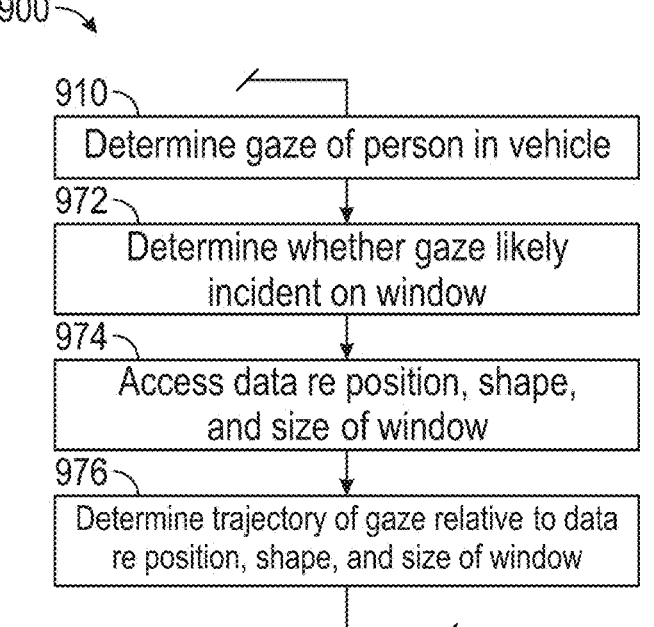
Figure 10:
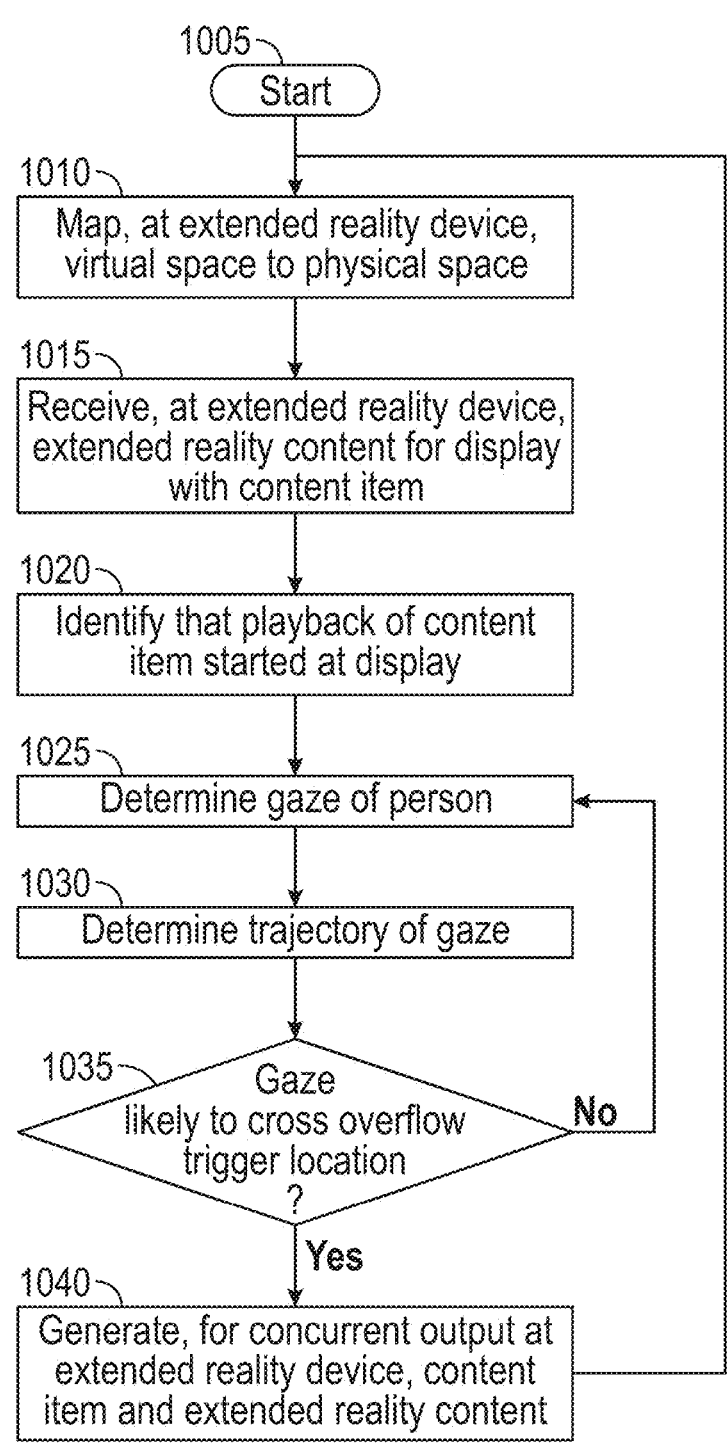
Figures 17A, 17B, 18A, 18B, 18C:
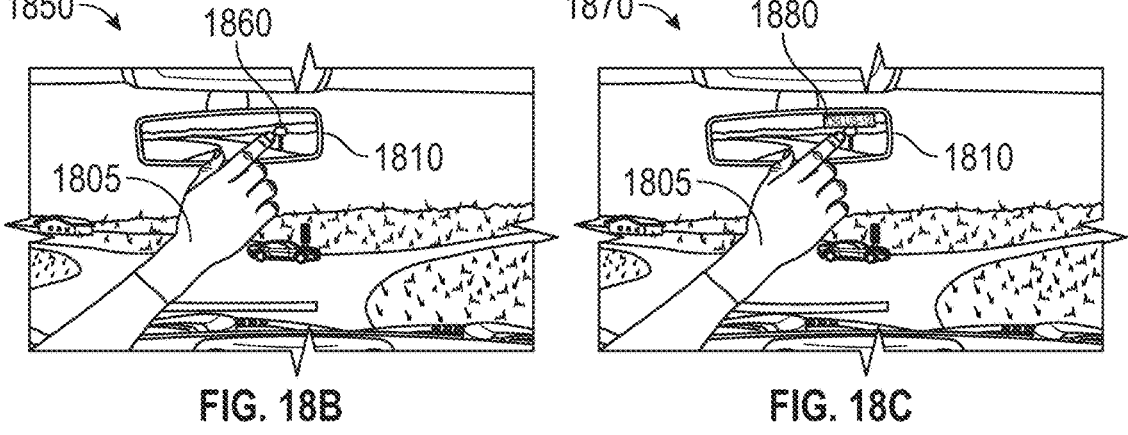
Figure 19B:
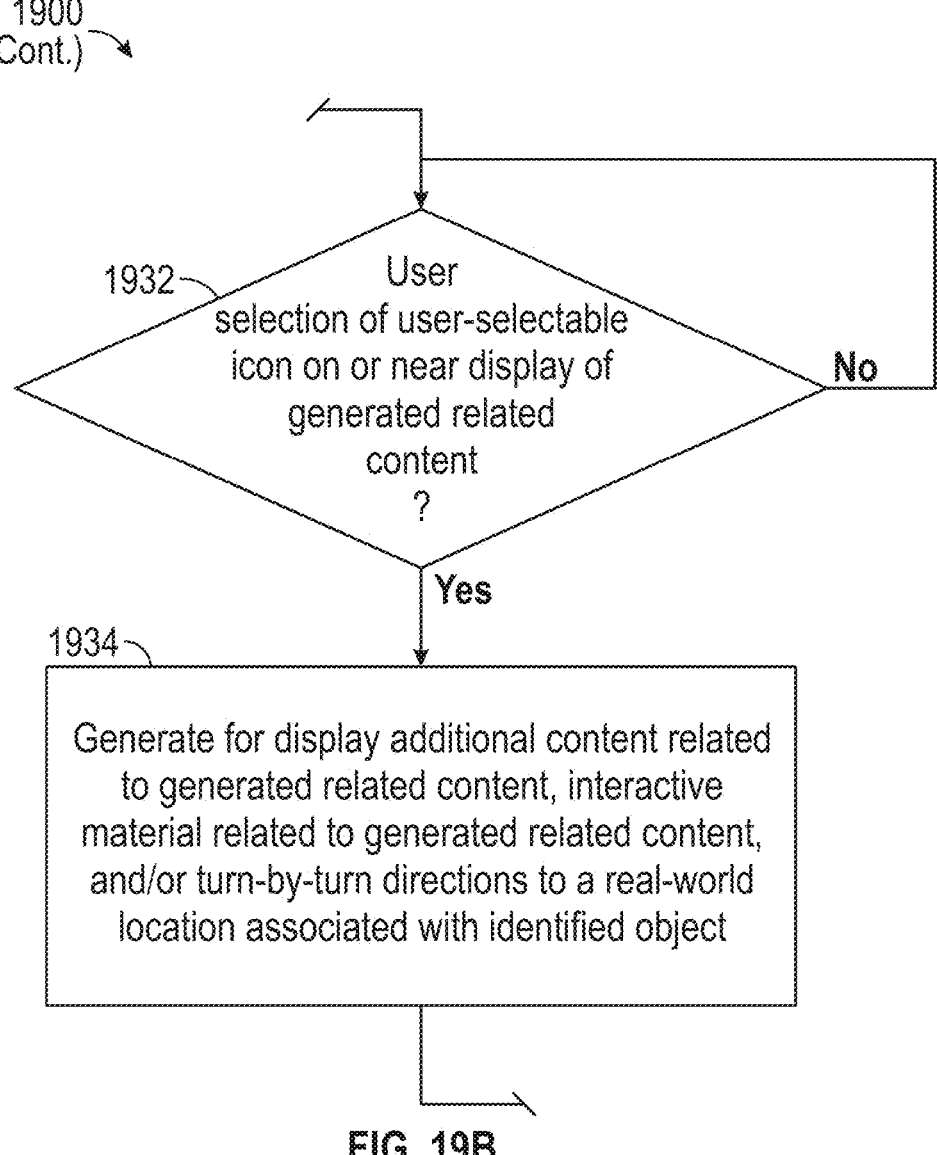
Figure 19C:
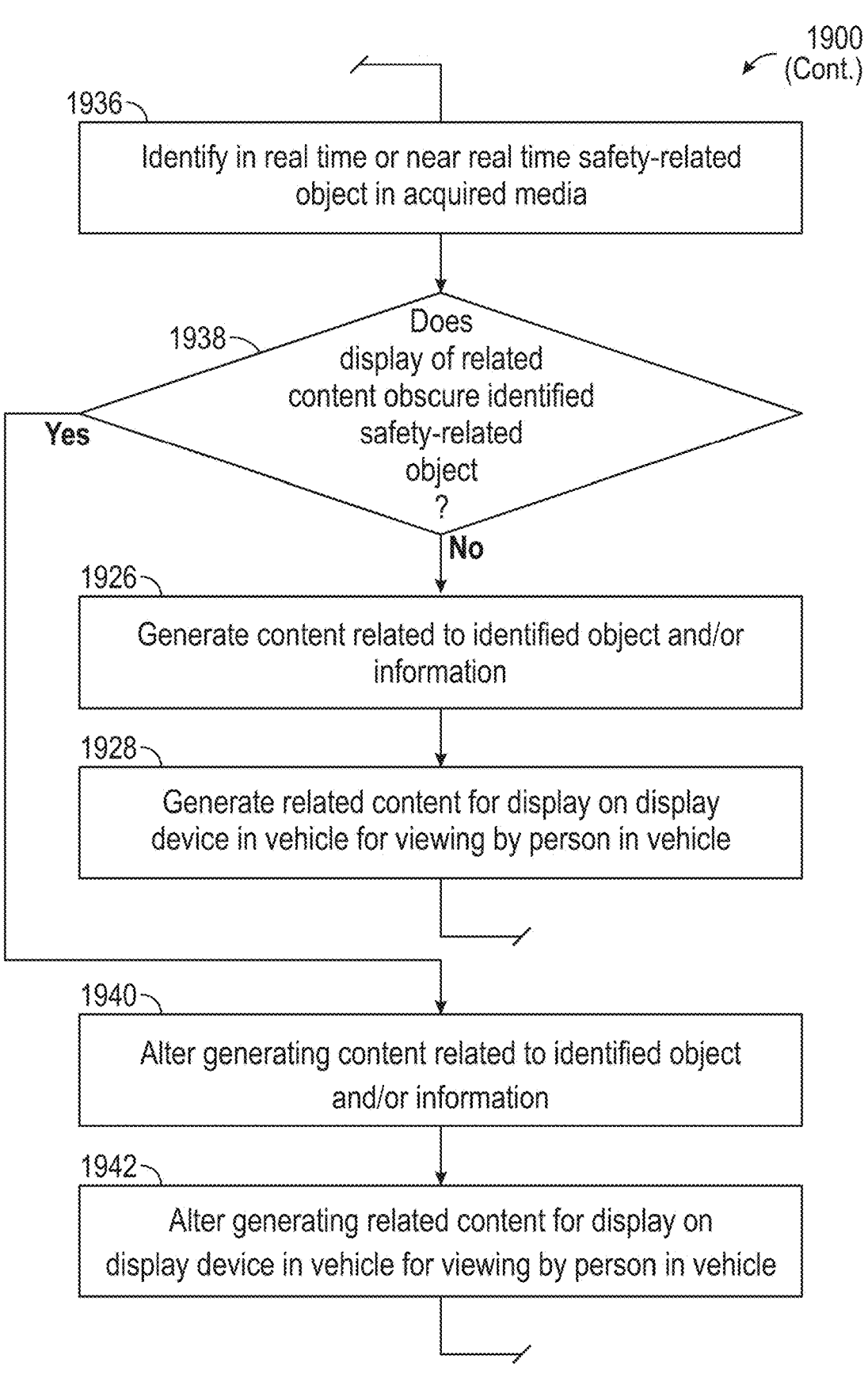
Figure 20:
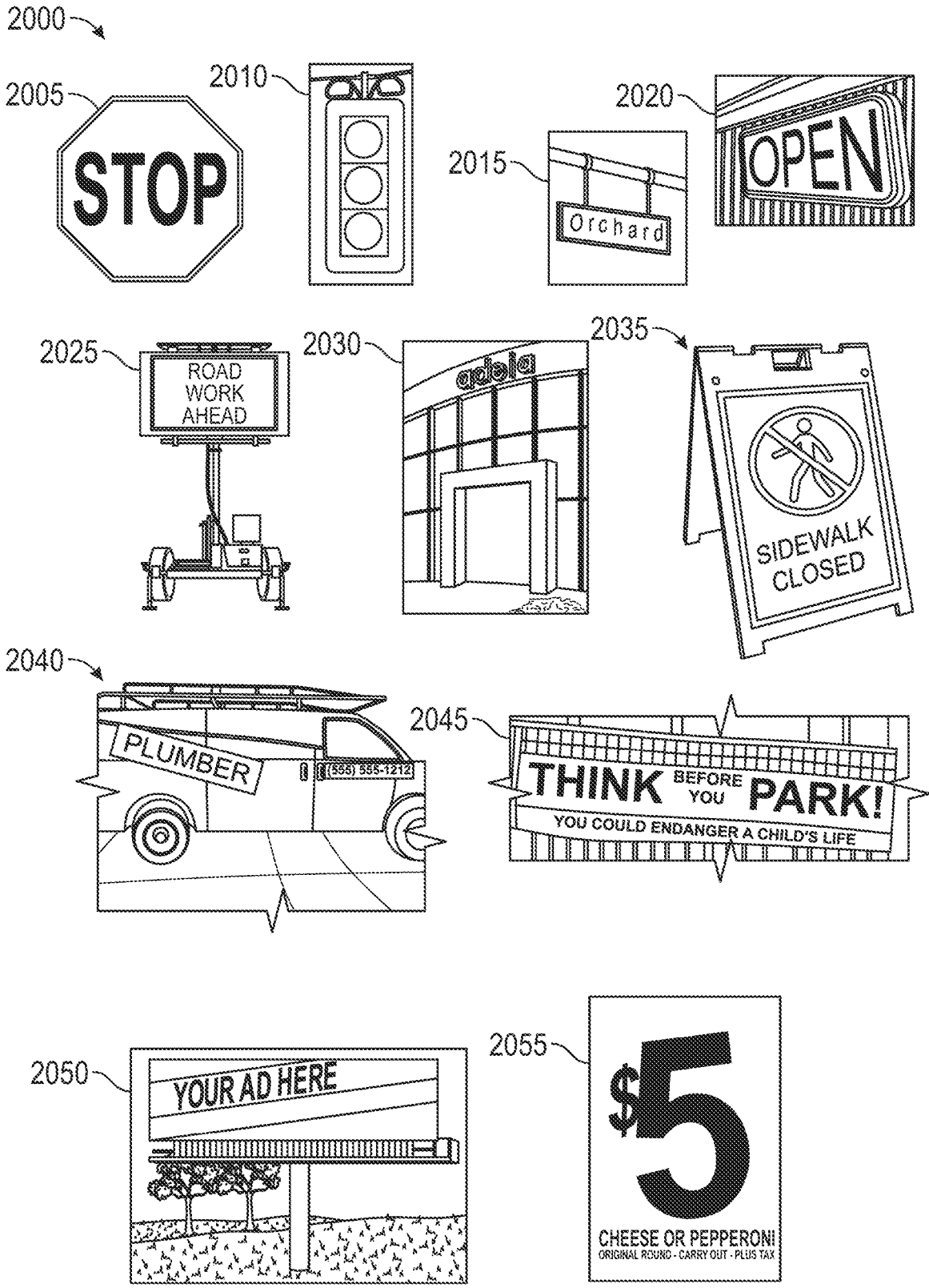
Figure 21:
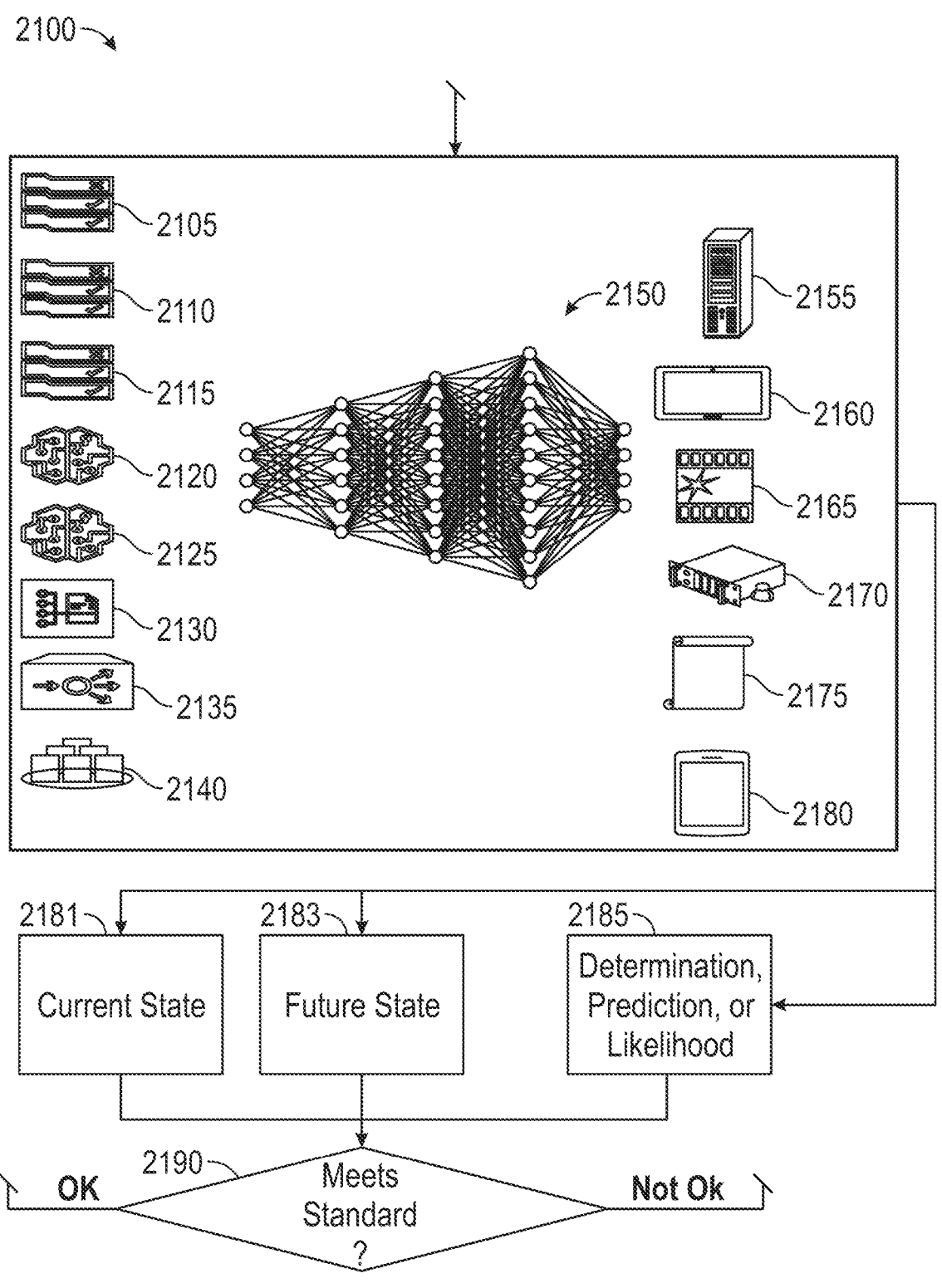
Figure 22:
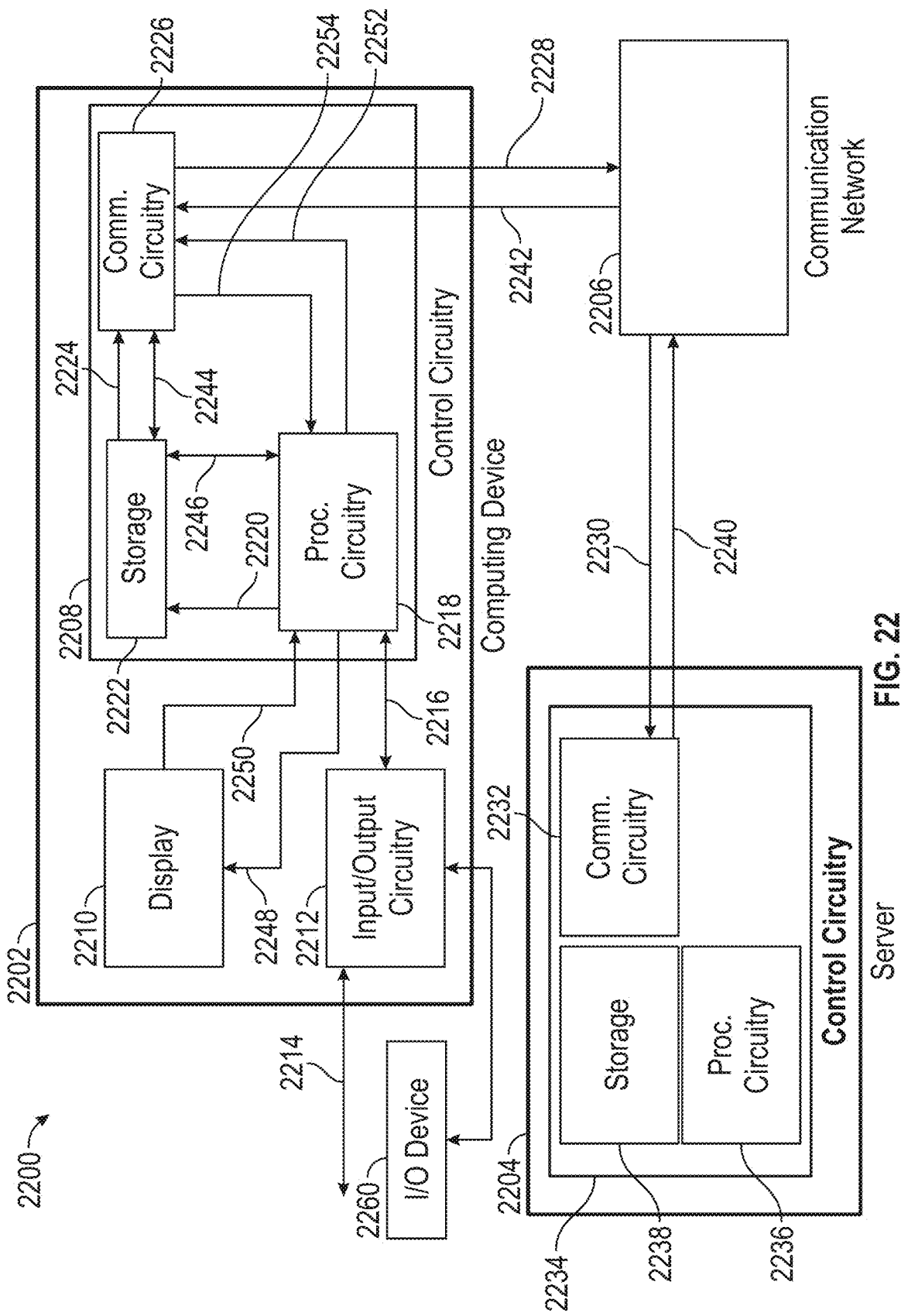

FIG. 2 depicts a scene visible to the passenger through a front passenger's side window of the vehicle, the scene including the object of interest, a gaze detector for the front passenger, an imaging device generally oriented in a passenger's side direction (or a driver's side direction in some embodiments), an extended display device, a scene overflow trigger for the front passenger's side window, and the like, in accordance with some embodiments of the disclosure;

FIG. 3 depicts the scene visible to the passenger inside the vehicle after the object of interest has passed beyond the scene overflow trigger and out of view of the passenger, in accordance with some embodiments of the disclosure;

FIG. 4 depicts a scene visible to a driver through a front windshield window of the vehicle, the scene including the object of interest, a gaze detector for the driver, an imaging device generally oriented in a forward direction, an extended display device, a scene overflow trigger for the front windshield window, and the like, in accordance with some embodiments of the disclosure;

FIG. 5 depicts streaming the scene visible to the passenger through the front passenger's side window of the vehicle to another passenger's infotainment display device, in accordance with some embodiments of the disclosure;

FIG. 6 depicts a database and a user interface with a user-selectable slide bar for selecting an interest level for one of a plurality of types of objects of interest, in accordance with some embodiments of the disclosure;

FIG. 7A depicts a viewer observing a display device displaying an object of interest, a scene overflow trigger for the display device, and the like, in accordance with some embodiments of the disclosure;

FIG. 7B depicts transmitting the display of the display device to an extended display device after the object of interest crosses the scene overflow trigger for the display device from a perspective of the viewer, in accordance with some embodiments of the disclosure;

FIG. 7C depicts extending displays of smartwatches and smartphones using AR glass, in accordance with some embodiments of the disclosure;

FIG. 7D depicts a display device displaying existing and ambient video content around the display device, in accordance with some embodiments of the disclosure;

FIG. 8 depicts a process for imaging and content generation, in accordance with some embodiments of the disclosure;

FIG. 9A depicts another process for imaging and content generation, in accordance with some embodiments of the disclosure;

FIG. 9B depicts subprocesses for imaging and content generation, in accordance with some embodiments of the disclosure;

FIG. 9C depicts additional subprocesses for imaging and content generation, in accordance with some embodiments of the disclosure;

FIG. 9D depicts additional subprocesses for imaging and content generation, in accordance with some embodiments of the disclosure;

FIG. 9E depicts additional subprocesses for imaging and content generation, in accordance with some embodiments of the disclosure;

FIG. 9F depicts additional subprocesses for imaging and content generation, in accordance with some embodiments of the disclosure;

FIG. 9G depicts additional subprocesses for imaging and content generation, in accordance with some embodiments of the disclosure;

FIG. 10 depicts still another process for imaging and content generation, in accordance with some embodiments of the disclosure;

Figures 11A, 11B, 12A, 12B, 13:
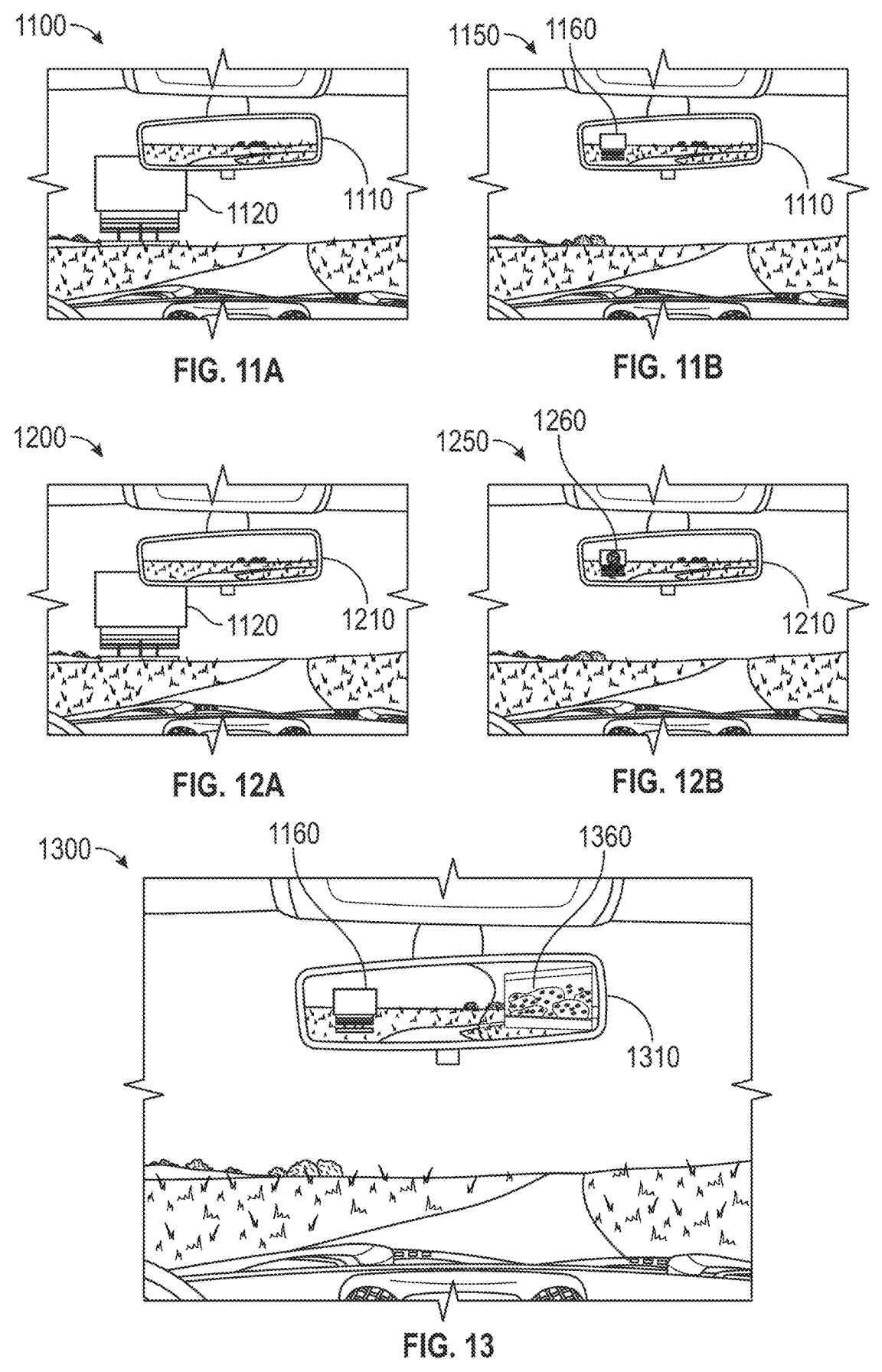

FIG. 11A depicts a vehicle with a rear-view mirror approaching a billboard, in accordance with some embodiments of the disclosure;

FIG. 11B depicts the vehicle with the rear-view mirror after the vehicle passes the billboard with a back of the billboard visible in the rear-view mirror, in accordance with some embodiments of the disclosure;

FIG. 12A depicts a vehicle with a smart rear-view mirror and display (SRVMD) approaching a billboard, in accordance with some embodiments of the disclosure;

FIG. 12B depicts the vehicle with the SRVMD after the vehicle passes the billboard, in accordance with some embodiments of the disclosure;

FIG. 13 depicts the vehicle with another configuration of the SRVMD after the vehicle passes the billboard, in accordance with some embodiments of the disclosure;

FIG. 14 depicts the vehicle with still another configuration of the SRVMD after the vehicle passes the billboard, in accordance with some embodiments of the disclosure;

FIG. 15A depicts the vehicle with a dashboard-mounted display device before the user selects a user-selectable icon, in accordance with some embodiments of the disclosure;

FIG. 15B depicts the vehicle with the dashboard-mounted display device after the user selects the user-selectable icon, in accordance with some embodiments of the disclosure;

FIG. 16A depicts the vehicle with a passenger seat back display device before the user selects a user-selectable icon, in accordance with some embodiments of the disclosure;

FIG. 16B depicts the vehicle with a passenger seat back display device after the user selects a user-selectable icon, in accordance with some embodiments of the disclosure;

FIG. 17A depicts the vehicle with yet another configuration of the SRVMD before the vehicle passes the billboard, in accordance with some embodiments of the disclosure;

FIG. 17B depicts the vehicle with the yet another configuration of the SRVMD after the vehicle passes the billboard, in accordance with some embodiments of the disclosure;

FIG. 18A depicts the vehicle with a further configuration of the SRVMD before the vehicle reaches a first vehicular position of an intersection with a road sign, in accordance with some embodiments of the disclosure;

FIG. 18B depicts the vehicle with the further configuration of the SRVMD after the vehicle reaches the first vehicular position of the intersection and before user selection of a user-selectable option, in accordance with some embodiments of the disclosure;

FIG. 18C depicts the vehicle with the further configuration of the SRVMD after the vehicle reaches the first vehicular position of the intersection and after user selection of the user-selectable option, in accordance with some embodiments of the disclosure;

FIG. 19A depicts still another process for imaging and content generation, in accordance with some embodiments of the disclosure;

FIG. 19B depicts subprocesses for imaging and content generation, in accordance with some embodiments of the disclosure;

FIG. 19C depicts additional subprocesses for imaging and content generation, in accordance with some embodiments of the disclosure;

FIG. 19D depicts additional subprocesses for imaging and content generation, in accordance with some embodiments of the disclosure;

FIG. 19E depicts additional subprocesses for imaging and content generation, in accordance with some embodiments of the disclosure;

FIG. 19F depicts additional subprocesses for imaging and content generation, in accordance with some embodiments of the disclosure;

FIG. 19G depicts additional subprocesses for imaging and content generation, in accordance with some embodiments of the disclosure;

FIG. 20 depicts examples of types of visual indicia of interest for driver assistance or passenger use and for imaging and content generation, in accordance with some embodiments of the disclosure;

FIG. 21 depicts an artificial intelligence system for imaging and content generation, in accordance with some embodiments of the disclosure; and FIG. 22 depicts a system including a server, a communication network, and a computing device for performing the methods and processes noted herein, in accordance with some embodiments of the disclosure.

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting embodiments and that the scope of the present invention is defined solely by the claims.

DETAILED DESCRIPTION

During a road trip, a driver and passengers are often attracted by interesting objects or scenes through a vehicle window, e.g., a historical town, a scenic beach, or random fun things encountered on or near the roadside. Since the vehicle is moving, e.g., forward or in reverse, from a perspective of the driver or passengers, the interesting objects or scenes flow in a direction opposite a travel direction, and flow out of the window in a relatively short amount of time. For example, when driving across the Bonneville Salt Flats on Interstate 80 between Salt Lake City, Utah, and the Nevada line, one encounters "Metaphor: The Tree of Utah," an 87-foot (about 27 meters) tall sculpture located about 200 feet (about 61 meters) from the roadside. When driving at about 80 miles per hour (about 129 kilometers per hour), the sculpture is clearly visible for only about 12 seconds from the vehicle and is relatively easily photographable for only a few seconds. With such interesting roadside scenes, the driver or passenger desires an extended view of the scene after the vehicle flows out of view. The brief time involved makes it difficult to capture a good photo or video from a single camera, even for a passenger not otherwise occupied by driving. For the driver, it is unsafe to divert attention to an object or scene of interest, much less operate a camera to capture a photo or video of the object or scene.

For purposes of this disclosure, this phenomenon will be referenced as the "scene overflow" or "object overflow" problem. The present methods and systems provide an elegant solution to the scene overflow problem. Some embodiments provide a solution to the above-described scenario, i.e., driving past an object or scene of interest at a relatively high speed. Other embodiments provide a solution to the scene overflow problem when multiple displays are available and/or for extended reality environments. Still other embodiments focus on solving the scene overflow problem as it pertains to roadside information, such as billboards, street name signs, and safety-related objects or information.

In some embodiments, objects and scenes of interest are captured by one or more cameras located in, on, or otherwise associated the vehicle. The captured objects and scenes are processed and transmitted in a manner that provides an improved experience for the driver and passengers without requiring explicit user actions or triggers in some examples. A viewing experience is extended for overflow scenes, which are viewable immediately or at a later time. Additional methods and systems are provided to perform at least one of eye gaze tracking, object identification, overflow condition triggering, display extension, storage, media curation, sign reading, interest determination, predictive analysis, information access, user interaction, combinations of the same, or the like are provided. The additional methods and systems utilize, as appropriate, at least one of database management, data warehousing, cloud storage, search engines, data mining, machine learning, artificial intelligence, natural language processing, speech-to-text technology, text-to-speech technology, information retrieval, combinations of the same, or the like.

In some embodiments, the scene overflow problem is minimized or eliminated by identifying a roadside object and/or scene as one of interest based on a user directing their gaze at the object or scene. That is, for example, the methods and systems are configured to observe, with an imaging device, a face of a user including their eyes. The image is analyzed to determine a direction and duration of the user's gaze relative to a known reference point such as a window or opening in the vehicle adjacent to the user. An orientation of a head and/or a body of the user is also analyzed by itself or in combination with gaze detection in some embodiments.

A trigger is defined to detect when the scene is moving out of view, i.e., the scene overflow condition in some embodiments. In some embodiments, the scene overflow condition is triggered by a user interest in a scene. In some embodiments, the scene overflow condition is triggered by user selection of at least one of a capture command, a bookmark command, a command to keep viewing a scene on an extended display, combinations of the same, or the like.

The user's gaze is tracked until the scene overflow condition is triggered. Capture of an object or scene is continued after the scene overflow condition is triggered. Capture is ended after the object or scene is no longer within view of an imaging device and/or after a predetermined amount of time has elapsed. In some embodiments, the predetermined amount of time is based on a speed of the vehicle and/or an apparent speed of the object relative to the vehicle. For instance, at a relatively slow speed and/or for objects at a relatively long distance from the imaging device, capture occurs for a relatively long period of time, whereas, at a relatively high speed and/or for objects a relatively short distance from the imaging device, capture occurs for a relatively short amount of time. In some instances, identification of multiple objects of interest occurs one after the other resulting in a longer capture period to ensure inclusion of the multiple identified objects of interest. The captured scene is displayed on an extended display. The captured scene is stored locally or externally. Captured scenes and/or capture conditions are analyzed for search and review.

Turning to some embodiments of the present disclosure, FIG. 1A depicts a scenario 100 in which a passenger 105 inside a vehicle 110 observes an object of interest 125 (e.g., a castle) through a window 115 of the vehicle 110. A gaze of the passenger 105 extends along a gaze direction 120 to the object of interest 125. FIG. 1B depicts the vehicle 110 of FIG. 1A including, for example, five outwardly facing imaging devices 140F, 140R, 140U, 140D, 140P and one inwardly facing imaging device 150. Any suitable number of outwardly and inwardly facing imaging devices is provided. In some embodiments, where gaze detection is not utilized, the inwardly facing imaging device is not present.

In the illustrated embodiment of FIG. 1B, the vehicle 110 includes the window 115, a front windshield window 190, a front-facing imaging device 140F generally facing a forward direction 145F of the vehicle 110, a rear-facing imaging device 140R generally facing a rearward direction 145R of the vehicle 110, an upward facing imaging device 140U generally facing an upward direction 145U of the vehicle 110, a driver's side left facing imaging device 140D generally facing a driver's side direction 145D of the vehicle 110, a passenger's side right facing imaging device 140P generally facing a passenger's side direction 145P of the vehicle 110, and an inwardly facing imaging device 150 generally facing an interior direction 155 of the vehicle 110. Although only one inwardly facing imaging device 150 is illustrated, more than one is provided in some embodiments.

One or more inwardly facing imaging devices are generally directed to a passenger-conveying space or cabin within the vehicle. In some embodiments, one or more inwardly facing imaging devices 150 are provided to monitor each seating position in the vehicle. A suitable passenger or occupant monitoring system is provided by DTS AutoSense™, which includes single-camera system for monitoring multiple passengers spaced throughout a vehicle cabin. Other illustrative systems include four or more inwardly facing imaging devices for a four-passenger vehicle such as vehicle 110, the imaging devices being positioned optimally to capture a face and eyes of each passenger. In some embodiments, the imaging device is provided above or below a side window of the vehicle, and/or on a seat back. For drivers and front seat passengers, the imaging device is provided above or below the windshield and/or in the dashboard in some embodiments. Other suitable configurations are provided to suit the particular seating arrangement of the vehicle 110 and the vehicle's structure. To ensure capture of a face and eyes of a passenger, one or more additional imaging systems are provided at or near a back window of the vehicle 110 in some embodiments.

The type of imaging system, device or component thereof (e.g., lens) is not limited. Imaging devices have a wide variety of lenses and fields of view. Any suitable camera system may be provided, including, e.g., at least one of a backup camera, a dual-facing dash camera, an exterior camera, a forward-facing dash camera, an interior camera, a panoramic camera, a 360-degree view camera, a single lens camera, a time-of-flight camera, a multi-lens camera, combinations of the same, or the like. Any suitable lens type may be provided, including, e.g., at least one of super telephoto lens, telephoto lens, medium telephoto lens, normal lens, wide angle lens, extreme wide angle lens, a transverse 360° capture lens, a longitudinal 360° capture lens, combinations of the same, or the like. In some embodiments, the directions (e.g., 145F) indicate a central axis or centerline of the respective imaging device (e.g., 140F) and/or a predominant viewing direction. The illustrated directions should not be construed as limiting the field of view of any individual camera or the imaging system as a whole. In some embodiments, a complete field of view about the vehicle 110 is provided. In some embodiments, for example when the vehicle is a drone, an airplane, or submarine, an additional imaging device is provided below the vehicle, and/or the imaging device or system is configured to capture imagery below the vehicle (not shown) in the downward direction, which is generally opposite the upward direction 145U. For systems including multiple imaging devices, image stitching is provided in some embodiments to generate a continuous image or video across multiple viewpoints.

It is understood that the driver's and passenger's sides may be reversed in some vehicles. The illustrated vehicle 110 has a left-hand side steering wheel, common in countries such as the United States where right-hand traffic is the norm; whereas, in some countries such as the United Kingdom where left-hand traffic is the norm, vehicles typically have the steering wheel on the right-hand side of the vehicle. The descriptions herein are directed to vehicles having left-hand side steering wheel and are understood to be reversed for vehicles having the right-hand side steering wheel.

FIG. 2 depicts a scene 200 visible to the passenger 105 through a front passenger's side window 115 of the vehicle 110, the scene 200 including the object of interest 125, a gaze detector 210 for the front passenger 105, the imaging device 140P generally oriented in the passenger's side direction 145P (or the imaging device 140D generally oriented in the driver's side direction 145D, as appropriate), an extended display device 260, and a scene overflow trigger 250 for the front passenger's side window 115. The gaze detector 210 is any suitable device. In some embodiments, the gaze detector 210 includes the inwardly facing imaging device 150. In lieu of or in addition to the inwardly facing imaging device 150, the gaze detector 210 utilizes a wearable device, such as a head-mounted device, and/or a sensor for gaze detection in some embodiments. In some embodiments, the gaze detector 210 is configured to perform operations utilizing at least one of a speed of the vehicle, an acceleration of the vehicle, a parallax effect between two different imaging devices focused on a same object, combinations of the same, or the like. In some embodiments, the gaze detector 210 is configured to associate a relatively long duration (e.g., 3 seconds) of eye gaze incident on an object or scene as an indicator of interest. In some embodiments, the gaze detector 210 is configured to differentiate between the relatively long duration of eye gaze incident on the object as the indicator of interest versus detection of the eyes of the user scanning back and forth.

As shown in FIG. 2, the vehicle 110 is moving in the forward direction 145F, and the passenger 105 is looking with the passenger's eyes 220L, 220R at the object of interest 125 through the side window 115. The gaze detector 210 is configured to detect a gaze direction 230 of the passenger 105. The gaze detector 210 is configured to guide the imaging device 140P to track the same object and/or scene.

Gaze-based visual data acquisition and processing are provided in some embodiments. The term "gaze detector" is used in the present disclosure to describe technologies configured to be used to detect eye position and/or a direction of the eyes. In some embodiments, the gaze detector 210 is configured to utilize images from an imaging device and/or an infrared scanner to perform eye detection, head position determination, and orientation determination. The gaze detector 210 is configured with a position, a shape, and a size of the window 115 of the vehicle 110 in some embodiments. The position, the shape, and the size of the window 115 of the vehicle 110 are programmed in advance, determined during an installation, and/or determined as needed after installation in some embodiments. Gaze detection is performed by the gaze detector 210 relative to the determined position, the shape, and the size of the window 115 of the vehicle 110 in some embodiments.

In some embodiments, cameras on the vehicle are primarily operated to perform advanced driver-assistance system (ADAS) functions for semi-autonomous or fully autonomous driving. For example, during a left-hand turn, a camera focused on the left side (driver's side) of the vehicle is configured to identify, e.g., obstacles and/or pedestrians on that side of the vehicle. In embodiments where cameras are utilized for ADAS functions and also utilized for capturing objects and/or scenes of interest, the ADAS functions are prioritized over the use of the cameras to capture objects and/or scenes of interest. In other embodiments, a vehicle is equipped with one set of cameras and/or sensors for ADAS functions and another set of cameras and/or sensors for capturing objects and/or scenes of interest, thus ensuring uninterrupted operation of the ADAS functions. In some embodiments, a dedicated outwardly facing camera and a dedicated inwardly facing camera are assigned to each seating position within the vehicle.

In some embodiments, the gaze detector 210 is configured to acquire visual data in the vehicle 110 based on a person's gaze. The gaze detector 210 is configured to determine and update a gaze point. The gaze detector 210 is configured to use finite-state machines to track the gaze.

In some embodiments, the gaze detector 210 is configured to tag sensor data. For example, the gaze detector 210 is configured to receive sensor data and the driver's gaze directions. For each gaze direction, the gaze detector 210 is configured to identify features in the sensor data intersected by the gaze direction and to create a focus record indicating the driver's focus on these features. The gaze detector 210 is configured to add driver control at the time of each gaze capture to the focus record. Focus records from multiple drivers are aggregated to obtain a metric of relevance for the features. A machine learning model is trained according to these focus records. This model is used to determine a region of primary focus. The sensor data is received from sensors with a 360-degree view around the vehicle. The sensor data includes light detection and ranging (LIDAR) point clouds, camera images, and/or radar sensor outputs in some embodiments.

If the passenger 105 is interested in the scene including the object of interest 125, then the gaze of the passenger 105 will tend to stay on the scene while the vehicle 110 is moving. Utilizing the side window 115 as a reference, the gaze moves in a direction of gaze movement 240 (i.e., in the rearward direction 145R).

If the gaze of the passenger 105 is focused on an object or scene for a duration of time longer than a pre-defined threshold, then the gaze detector 210 determines that the passenger 105 is interested in the object or scene. The focus of the gaze of the passenger 105 is defined, in some embodiments, as a consistent direction along an angle with respect to an object (e.g., the direction of gaze movement 240 relative to an edge of the window opening) swept by the gaze, and/or the duration in time of the gaze (e.g., on the order of seconds or fractions of a second) in accordance with gaze-based visual data acquisition and processing.

In some embodiments, scene knowledge is determined, e.g., a scene from a camera is analyzed to determine at least one of a 3D structure of the scene, a location of one or more objects in the scene, relative movements between the scene and the vehicle, combinations of the same, or the like. The gaze detector 210 is configured to determine whether the user is focusing on a given object in the context of the determined scene knowledge. In other embodiments, the gate detector 210 is configured to distinguish smooth pursuit (i.e., focusing on an object while moving) and/or fixation (i.e., focusing on an object while not moving) from observed eye movements. As such, in some embodiments, smooth pursuit and/or fixation identifies objects and/or scenes of interest without determining scene knowledge.

For purposes of the present disclosure, in some embodiments, the interest level based on gaze is defined as an interest level value I. The interest level value I increases the longer in time the user's gaze stays on a specific object or scene. When the user becomes satisfied with what they are looking at, or as their interest changes, then they might look at another object or scene. Such change is detected by the gaze detector 210, the interest level value I is reset, and the interest level value I accumulates over time for the other object or scene. In some embodiments, the interest level value I is associated with each of a plurality of identified objects or scenes. For example, if the user's gaze is determined to be switching back and forth between two or more objects, the interest level value I for each identified object or scene is aggregated across a discrete viewing session, which may be defined as a period of time (e.g., within about 30 seconds).

If the interest level value I is over a predetermined threshold, and the gaze is observed to move close to and/or cross a right boundary of the window 115, in some embodiments, the passenger 105 is determined to have an interest in the object or scene. This scenario indicates a high likelihood that the passenger 105 is not getting enough time to watch the object or scene. In some embodiments, a virtual vertical line and/or region is defined as the scene overflow trigger 250, which is generally located near the right boundary of the window 115. In some embodiments, the scene overflow trigger 250 is located at a distance from an edge of the opening that is about 5% to about 15% of a total width of the opening, and about 10% of the total width in some embodiments. In some embodiments, the scene overflow trigger 250 is changed depending on a distance between the passenger 105 and the window. That is, when the passenger 105 is relatively close (e.g., less than about 6 inches (about 15 centimeters)) to the window, the scene overflow trigger 250 is adjusted to be any persistent sweep of the gaze of the passenger 105 along generally a same direction through a relatively short horizontal distance (e.g., less than about 6 inches (about 15 centimeters)). Whereas, in some embodiments, when the passenger 105 is relatively far (e.g., greater than about 6 inches (about 15 centimeters)) from the window, the scene overflow trigger 250 is adjusted to be any persistent sweep of the gaze of the passenger 105 along generally a same direction through a relatively long horizontal distance (e.g., greater than about 6 inches (about 15 centimeters)). Other suitable distances for the scene overflow trigger 250 are provided as appropriate to the seating configuration of the vehicle. In some embodiments, when the gaze is observed to continue moving across the scene overflow trigger 250, the user's interest is further confirmed. The user's interest confirmed by the gaze moving across the scene overflow trigger 250 is reflected by an increase in the interest level value I in some embodiments. The gaze detector 210 is configured to compensate for natural jitter of eye movement, movement and/or vibration of the vehicle, and the like.

FIG. 3 depicts a scene 300 visible to the passenger inside the vehicle 110 after the object of interest 125 has passed beyond the scene overflow trigger 250 and out of view of the passenger 105, in accordance with some embodiments of the disclosure. Since the camera (e.g., 140D, 140P) on the vehicle 110 also follows 340 the user's gaze on that specific scene, the camera is configured to project the user's gaze along a predicted trajectory of the gaze. The extended display panel 260 is configured to render 350 what the camera (e.g., 140D, 140P) is directed towards and/or focused on until the scene is no longer within the field of view of the camera (e.g., 140D, 140P), in some embodiments. At that point, in some embodiments, the last snapshot of the scene will stay on the extended display panel 260 if the user is looking at it as determined from gaze direction 330. In other embodiments, completion of the image and/or scene capture results in a generation and display of a UI for controlling the captured image and/or scene. For example, the user is provided options to perform media controls such as a rewind operation of the recorded video for the scene. It is noted that any reference to a single camera herein is not to be construed as limiting, and the disclosure includes embodiments employing multiple cameras.

In some embodiments, one or more cameras are configured to pan and zoom to capture a given object and/or scene.

An image is captured, for example, in response to a determination that the user intends to watch an object and/or scene longer than the user's perspective from within the vehicle allows. In some embodiments, even after the camera loses the object and/or scene, content is provided to the user to view for a longer duration. The provided content includes, for example, a still image of the object and/or scene, and/or a short video of the object and/or scene.

In addition to or in lieu of displaying content on the extended display panel 260, captured content is sent to a device, e.g., a smartphone held by a passenger, for display, in some embodiments. In some embodiments, the extended display panel 260 is at least one of a virtual screen, an AR glass, a screen positioned next to a side window, combinations of the same, or the like.

If the user keeps looking at the extended display 260, the interest level value I keeps growing. The display panel will reset or gradually fade away if the user loses interest and looks at a new scene through the window. At that time, the interest level value I also resets.

In some embodiments, the extended display panel 260 is a virtual display for a user wearing an extended reality (XR) device. XR sessions include at least one of augmented reality (AR), three-dimensional (3D) content, four-dimensional (4D) experiences, virtual reality (VR), mixed reality (MR), interactive experiences, control using next-generation user interfaces (next-gen UIs), combinations of the same, or the like.

In some embodiments, the extended display panel 260 is part of the side window, for example, a liquid crystal display (LCD) on window glass.

FIG. 4 depicts a scene 400 visible to a driver 405 through the front windshield window 190 of the vehicle 110, the scene 400 including the object of interest 125 appearing to move in a left-to-right direction 440 from the perspective of the driver 405, a gaze detector 410 configured to detect a gaze direction 430 of the driver 405, an imaging device (e.g., 140F) generally oriented in the forward direction (e.g., 145F (see, FIG. 1B)), an extended display device (not shown in FIG. 4), a scene overflow trigger 450 for the front windshield window 190, and the like, in accordance with some embodiments of the disclosure. In some embodiments, a relatively larger trigger threshold is required to trigger capture if the driver 405 is looking through the front window 190 (assuming the vehicle 110 is moving towards the scene until it passes by), and a relatively smaller trigger threshold if the driver 405 is looking through the side window (assuming the vehicle 110 is passing by the scene). In some embodiments, instead of using an extended display device for the driver, a request 460 to store the captured scene is transmitted to a storage device for storage and later viewing of the captured scene. For example, the captured scene is synchronized 470 to a cloud storage system 480, in some embodiments.

FIG. 5 depicts streaming 550 a scene 500 visible to a front Passenger A through the side window 115 of the vehicle 110 to an infotainment display device 560 of Passenger B, in accordance with some embodiments of the disclosure. As such, Passenger B, who is sitting on the other side of the vehicle 110, is able to enjoy the scene 500. For example, Passenger A is looking at the scene 500 along gaze direction 530. Passenger A or Passenger B need not necessarily be seated in a front seat of the vehicle. In some embodiments, one of Passenger A and Passenger B is seated in a front seat of the vehicle, and the other of Passenger A and Passenger B is seated behind the front of the vehicle, i.e., in a middle row or back row seat of an SUV. In some embodiments, both Passenger A and Passenger B are seated behind the front seats of the vehicle.

Passenger A's eyes 220L, 220R and Passenger B's eyes 225L, 225R are tracked by gaze detector 510. In response to detecting that Passenger A's gaze satisfies an interest condition (such as the gaze crossing the scene overflow trigger), the outside camera (e.g., 140P) captures content. Then, in some embodiments, the gaze detector 510 is configured to determine whether Passenger B is trying to look through the same window but cannot see the scene 535. If so, then the gaze detector 510 requests 540 the camera (e.g., 140P) to stream 550 the captured scene to Passenger B. Then, Passenger B chooses to display the captured scene on the infotainment display 560. The time that Passenger B spends viewing the scene 500 also increases the interest level value I for that scene 500 in some embodiments. In some embodiments, a scene on one display is automatically cast to another display.

In some embodiments, a UI is generated for user selection of categories of objects of interest or disinterest to the driver. In some embodiments, a driver is presented with user selectable options to choose a threshold before a trip so that objects and/or scenes above the threshold are detected and captured during the trip. In some embodiments, after the trip, the captured content is viewable by one or more occupants of the vehicle. In some embodiments, after the trip, a user selectable option for sharing the captured content is provided. In some embodiments, the UI includes a user selectable filter for selection by viewers, regardless of whether the viewer is or was a passenger in the vehicle.

FIG. 6 depicts a system 600 including a database 610 and a user-selectable slide bar 630 for selecting an interest level value I for one of a plurality of types of objects of interest, in accordance with some embodiments of the disclosure. When storing the captured scenes, the interest level value I is associated with each scene, normalized to a fixed range, such as 1 to 10. The captured scenes are filtered easily by setting various thresholds for the interest level value I. For example, an interest level filter 620 has a scale 630 from 1 to 10 with partial or whole integers therebetween. The user is presented with options to select an interest level for groups of potential objects of interest. In the illustrated embodiment, the user is prompted to select the level of interest for a mountains category 670, a landmarks category 680, and a horses category 690. If, for instance, the user selects 640 an interest level of 4 for the mountains category 670 (as illustrated), and an interest level of 7 (not shown) for the horses category 690, then the mountains category 670 has a relatively lower priority than the horses category 690. Capture of scenes is then performed in accordance with a selected priority 650 for each category of objects. For example, a capture trigger is set to correspond with greater than or equal to 7 out of 10, and the selection 640 of the interest level of 4 for the mountains category 670 and the interest level of 7 (not shown) for the horses category 690 results in default scores. Upon detection of mountains in an actual scene, the user's gaze must linger on the type of object long enough for the interest level to increase and meet or exceed the set capture trigger point of 7. For instance, detection of a gaze for 0.5 seconds on a type of object results in an increase of the interest level of 1 point. As such, after the user's gaze lingers on a mountain range for 1.5 seconds, 3 points are added to the interest level, and the trigger point of 7 is achieved (default interest level of 4 plus 3 points for lingering of the gaze=7 points) and capture automatically occurs without user input. Whereas, since the interest level of 7 was selected for the horses category 690, detection of any horse in a scene results in capture of the scene with focus on the horse.

In addition, the user's ID is associated with each corresponding scene in some embodiments. For example, the filter 640 filters by a combined interest level from all users for a specific scene, or filters by the selected user's interest level. Options are provided for sharing the captured scenes with other users in the vehicle, on social media, aggregated with other captured scenes by other users in the vehicle 110, and/or organized automatically into a photo/video storybook. For example, for a child captivated by horses, all horses are captured during a trip resulting in a trip storybook featuring horses (or any other object of interest).

FIG. 7A depicts a first scenario 700A in which a gaze detector (not shown) detects that eyes 720L, 720R of a viewer are observing a display device 710 displaying an object of interest 725 along a gaze direction 730, a relative movement direction 740 of the object of interest 725, and a scene overflow trigger 750 for the display device 710, in accordance with some embodiments of the disclosure. FIG. 7B depicts a second scenario 700B in which the display of the display device 710 is sent to an extended display device 760 after the object of interest 725 crosses the scene overflow trigger 750 for the display device 710 from a perspective of the viewer, in accordance with some embodiments of the disclosure.

In some embodiments, the extended display device 760 is at least one of an AR device, a VR device, an XR device, combinations of the same, or the like. For example, as shown in FIG. 7C, in an XR environment, one or more virtual display elements are provided, each corresponding to an application executable by a user device. In some embodiments, a position of a user device in a field of view of a user in an XR environment is determined. One or more display elements are displayed in the XR environment relative to the position of the user device in the field of view. Each display element comprises a user interface of an executable application for controlling the user device. Methods and systems for displaying virtual elements in an XR environment are described, for example, in Dasher, et al., U.S. Patent Application No. 18/088,067, filed Dec. 23, 2022, which is hereby incorporated by reference herein in its entirety.

The XR environment of FIG. 7C includes one or more additional features in some embodiments. The executable application is executable by control circuitry of the user device, and/or by control circuitry of a server operating in communication with the user device. The one or more display elements are generated for display using control circuitry of an XR device operating in communication with the user device. The position of the user device is monitored. The position of the one or more display elements in the XR environment is updated as the position of the user device changes. An anchor point of the user device is determined. The one or more display elements are generated relative to the anchor point. The anchor point is determined by control circuitry of an XR device operating in communication with the user device. The position of the one or more display elements in the XR environment relative to the position of the user device is defined by a predetermined layout corresponding to a type of user input. A type of user input is determined. The one or display elements are generated in the predetermined layout. The position of the one or more display elements in the XR environment relative to the position of the user device is defined by a predetermined layout based on user activity relating to each executable application. A command is received to switch between usage of executable applications. The one or more display elements are generated for display in response to receiving the command. A determination of whether the user device is in a predetermined region of the field of view of the user in an XR environment is performed. The display elements are generated for display when user device is within the predetermined region. The one or more display elements are transitioned between a first display state and a second display state as the user device moves into the predetermined region. The transition between display states is based on a type of user input. An anchor point of the XR environment is defined. An anchor point of the user device is defined. The one or more display elements are transitioned from the anchor point of the XR environment towards the anchor point of the user device as the user device moves into the predetermined region. A level of user interaction with a first display element is determined. The position or appearance of the first display element is modified in response to the level of user interaction being above a threshold level. The user interface provided by one of the display elements is controlled by virtue of user interaction with the user device. The user device is a physical user device including a physical display screen. The XR environment is an AR or MR environment provided using an AR or MR device. The executable application is running on the physical user device operating in communication with the AR or MR device. Using the AR or MR device, a display screen of the physical user device is rendered in the AR or MR environment. In the AR or MR environment, the display screen, rendered using the AR or MR device, is positioned relative to the physical display screen of the physical user device. The XR environment is a VR environment. Using a VR device, a virtual twin of a physical user device is rendered. In the VR environment, the virtual twin is positioned based on a determined position of the physical user device. The one or more display elements each correspond to a different portion of the user interface of the executable application.

For example, as shown in FIG. 7D, an enhanced extended reality (XR) experience is provided. In some embodiments, concurrent output of a content item and pre-generated XR content are provided. At an XR device, a virtual space is mapped to a physical space. At the XR device, pre-generated XR content is received for display with a content item. An identification that the content item has started playback at a display is performed. For concurrent output at the XR device, the content item and the XR content are generated. Systems and methods for enabling an enhanced XR experience are described, for example, in Dasher, U.S. patent application Ser. No. 18/123,625, filed Mar. 20, 2023, which is hereby incorporated by reference herein in its entirety.

The XR experience of FIG. 7D includes one or more additional features in some embodiments. A time stamp of the content item is identified. A corresponding time stamp of the XR content is identified. The XR content is generated for output at the corresponding time stamp. When the display is a physical display, at the XR device, the physical display is identified. The content item is played back at the physical display. When the display is a virtual display, at the XR device, a virtual display for outputting the content item is generated. The content item is played back at the virtual display. The pre-generated XR content further includes metadata indicating a relative location, movement data and/or timing data for an XR object, animation and/or scene. At a physical computing device, a request to access a preview of the pre-generated XR content is received. For output at the physical computing device, a two-dimensional representation of at least a portion of the XR content is generated. At the physical computing device, input associated with navigating the preview is received. At the physical computing device and based on the input, an updated view of the XR content is generated for output. User input to pause the content item is received. Playback of the content item is paused. For output at the XR device, a pre-generated XR object for display while the content item is paused is generated. A virtual assistant is integrated with the XR object. A query is received via the integrated virtual assistant. A response to the query is generated. The response to the query is output. The XR object based on the response to the query is animated. In the virtual space, a volume around the display is identified. A path of one or more XR objects is identified in the XR content. For each identified path, whether the path will intersect with the volume is determined. For each path that intersects with the volume, the path is amended so that it does not intersect with the volume. When the XR device is a first XR device, at a second XR device, the pre-generated XR content for display with the content item is received. For output at the second XR device, the XR content at the corresponding time stamp is generated. A user interaction is identified with an XR object at the first XR device. For output at the first and second XR devices and based on the user interaction, the XR object is generated. For output, a content item guidance application is generated. The content item guidance application includes a selectable asset region corresponding to a content item, and an icon, associated with the asset region. The icon indicates that XR content is available for the content item.

FIG. 8 depicts a process 800 for imaging and content generation, in accordance with some embodiments of the disclosure. For this process 800, exemplary details are provided. In some embodiments, steps are omitted, modified, combined, duplicated, rearranged, and/or substituted with other steps in any suitable combination. Steps shown in parallel are performed in series in some embodiments. Steps shown in series are performed in parallel in some embodiments.

The process 800 includes detecting 805 that a vehicle is moving and a user is looking outside a window of the vehicle. The process 800 includes determining 810 whether the user's gaze is focused on an object. In response to determining 810 the user's gaze is not focused on the object (810="No"), the interest level is reset 815, and the process 800 reverts to the determining 810 step. In response to determining 810 the user's gaze is focused on the object (810="Yes"), the interest level is increased 820. The process 800 includes determining 825 whether the interest level is over (or greater than or equal to) a threshold. In response to determining 825 the interest level is not over the threshold (825="No"), the process 800 reverts to the determining 810 step. In response to determining 825 the interest level is over the threshold (825="Yes"), the process 800 includes determining 830 whether the gaze is moving towards a scene overflow trigger. In response to determining 830 the gaze is not moving towards the scene overflow trigger (830="No"), the process 800 includes displaying 835 nothing, and the process reverts to the determining 830 step (not shown). In response to determining 830 the gaze is moving towards the scene overflow trigger (830="Yes"), the process 800 includes determining 840 whether the scene overflow trigger is triggered. In response to determining 840 the scene overflow trigger is not triggered (840="No"), the process 800 reverts to the displaying 835 nothing step. In response to determining 840 the scene overflow trigger is triggered (840="Yes"), the process 800 includes capturing 845 along a gaze trajectory and rendering the captured scene on an extended screen. The process 800 includes determining 850 whether the user's gaze is focused on the extended screen. In response to determining 850 the user's gaze is not focused on the extended screen (850="No"), the process 800 reverts to resetting 815 the interest level step. In response to determining 850 the user's gaze is focused on the extended screen (850="Yes"), the process 800 continues 855 to render until the object is out of view, and the process 800 continues to render a latest available image.

Variations of the process 800 are provided. For instance, in some embodiments, the vehicle need not be moving to perform subsequent steps. In some embodiments, the user need not be looking outside the window and a gaze need not be detected, and capture is instead triggered by detection of an object of interest satisfying an interest level threshold as described herein. In some embodiments, capture is triggered by the user's gaze crossing the scene overflow trigger. In some embodiments, capture is triggered by a prediction that the user's gaze is likely to cross the scene overflow trigger at a future time. In some embodiments, scenes are captured and stored without rendering or display.

FIG. 9A depicts a process 900 for imaging and content generation, in accordance with some embodiments of the disclosure. FIGS. 9B to 9G depict subprocesses for imaging and content generation, in accordance with some embodiments of the disclosure. For this process 900, exemplary details are provided. In some embodiments, steps are omitted, modified, combined, duplicated, rearranged, and/or substituted with other steps in any suitable combination. Steps shown in parallel are performed in series in some embodiments. Steps shown in series are performed in parallel in some embodiments.

As shown in FIG. 9A, the process 900 includes starting 902 the process 900. The process 900 starts 902 in response to at least one of starting the vehicle, user selection of a start request, detection of an object of interest, combinations of the same, or the like. The process 900 includes instructing 904 an imaging device 140F, 140R, 140U, 140D, 140P (on or in a vehicle 110) to acquire media. The imaging device 140F, 140R, 140U, 140D, 140P is positioned to capture media external to the vehicle 110. The process 900 includes determining 910 a gaze of a person 105 in the vehicle 110. Although applications are described with respect to humans, the present methods and systems are applicable to non-human passengers, such as a dog or cat. The process 900 includes determining 912 a trajectory along a direction 230, 330, 430, 530, 730 of the gaze. The process 900 includes determining 914 whether the trajectory along the direction 230, 330, 430, 530, 730 of the gaze is likely to cross an overflow trigger location 250, 450, 750. The process 900 includes, in response to determining (914="Yes") the gaze is likely to cross the overflow trigger location 250, 450, 750, adjusting 916 the acquiring of the media from the imaging device 140F, 140R, 140U, 140D, 140P. The process 900 includes, in response to determining (914="No") the gaze is not likely to cross the overflow trigger location 250, 450, 750, reverting the process 900 to the determining 910 step.

In some embodiments, the determining 910 the gaze of the person 105 in the vehicle 110 is based on an image of the person 105 obtained 906 by an inwardly focused imaging device 150. The determining 910 the gaze of the person 105 is based on determining 908 at least one of a gaze location of the person 105, an eye position of the person 105, a direction 230, 330, 430, 530, 730 of the gaze of the person 105, a head position of the person 105, a head orientation of the person 105, combinations of the same, or the like.

In some embodiments, the process 900 includes identifying 918 an object and/or scene 125 in the acquired media. The process 900 includes determining 920 whether the gaze of the person 105 is focused on the identified object and/or scene 125. The adjusting 916 the acquiring of the media from the imaging device 140F, 140R, 140U, 140D, 140P includes tracking 922 the identified object and/or scene 125. In some embodiments, the adjusting 916 includes changing a setting of the imaging device 140F, 140R, 140U, 140D, 140P based on the tracking 922 of the identified object and/or scene. In some embodiments, the setting includes at least one of an exposure, an aperture, a depth of field, a magnification level, a shutter speed, an ISO speed, a white balance, a focus, a drive mode, a metering mode, an image quality, a storage file type, an image sensor setting, combinations of the same, or the like. The process 900 includes, in response to determining (920="Yes") the gaze of the person 105 is focused on the identified object and/or scene 125, performing the tracking 922 of the identified object and/or scene 125. The process 900 includes, further in response to determining (920="Yes") the gaze of the person 105 is focused on the identified object and/or scene 125, generating 924 for display the acquired media including the identified object and/or scene 125 on an extended display device 260, 560, 760. The process 900 includes, in response to determining (920="No") the gaze of the person 105 is not focused on the identified object and/or scene 125, reverting the process 900 to the identifying 918 step. Object and/or scene identification, i.e., the identifying 918 step, is not required in all embodiments. In some embodiments, the determining 914 step triggers media acquisition without further requirements. The process 900 includes storing 926 the acquired media including identified object and/or scene to a buffer and/or a cloud storage device.

In some embodiments, once the object and/or scene is identified, additional information about the object and/or scene is provided to the user. For example, a location of the object and/or scene is determined, and this information is displayed on the display. In some embodiments, queries are received and responses are provided. For example, when the identified object and/or scene is displayed on the display and the user performs a voice query (e.g., "What's that building?"), an answer to the question is determined and output in any suitable manner. As such, entertainment and educational opportunities are provided to users.

As shown in FIG. 9B, in some embodiments, the process 900 includes determining 938 an interest of the person 105 in the identified object and/or scene 125. The determining 938 is based on the gaze of the person 105 in some embodiments. In some embodiments, the determining 938 the interest of the person 105 in the identified object and/or scene 125 is based on at least one of determining 928 a duration of time that the gaze of the person 105 is incident on the identified object and/or scene 125, accessing 930 a determined interest of another person Passenger B in the vehicle 110 in the identified object and/or scene 125, accessing 932 a determined interest of one or more other people that have passed through the same location as the vehicle 110 in an object and/or scene 125 similar to the identified object and/or scene 125, accessing 934 a user preference, accessing 936 a trained model configured to determine the interest of people in objects and/or scenes based on the gaze of the person 105, combinations of the same, or the like. The process 900 includes increasing 940 a degree of the interest as a length of time that the gaze is incident on or near the identified object and/or scene 125 increases.

As shown in FIG. 9C, in some embodiments, the process 900 includes receiving 942 a user selection 640 of a level of interest 630 in each of a plurality of objects and/or scenes 670, 680, 690. The process 900 includes determining 944 whether the identified object and/or scene 125 matches one or more of the plurality of objects and/or scenes 670, 680, 690. The process 900 includes filtering 946 the identifying of the object and/or scene 125 based on whether the identified object and/or scene 125 meets or exceeds (946="Yes") the selected level of interest "4" out of 10 in FIG. 6 in the matching one or more of the plurality of objects and/or scenes 670, 680, 690. The process 900 includes, in response to determining (946="No") that the identified object and/or scene 125 does not meet or exceed the selected level of interest "4" out of 10 in FIG. 6 in the matching one or more of the plurality of objects and/or scenes 670, 680, 690, reverting the process 900 to the identifying 918 step.

In some embodiments, the process 900 includes capturing the media including the identified object and/or scene 125 until the identified object and/or scene 125 is beyond a view of the imaging device 140F, 140R, 140U, 140D, 140P. As shown in FIG. 9D, in some embodiments, the process 900 includes determining 948 whether the identified object and/or scene 125 is beyond a view of the imaging device 140F, 140R, 140U, 140D, 140P. In some embodiments, in response to determining (948="Yes") the identified object and/or scene 125 is beyond a view of the imaging device 140F, 140R, 140U, 140D, 140P, the process 900 includes determining 950 whether the identified object and/or scene 125 is within a view of another imaging device. In response to determining (950="Yes") the identified object and/or scene 125 is within a view of another imaging device, the process 900 includes coordinating 952 capture of the identified object and/or scene 125 by the other imaging device. The process 900 includes, in response to determining (950="No") the identified object and/or scene 125 is not within a view of another imaging device, ending 954 a capture session, and identifying a next object and/or scene. In embodiments in which a single imaging device is provided, in response to determining (948="No") the identified object and/or scene 125 is beyond a view of the single imaging device, the process 900 proceeds directly to the ending 954 step, as appropriate.

In some embodiments, the imaging device 140F, 140R, 140U, 140D, 140P includes a plurality of imaging devices 140F, 140R, 140U, 140D, 140P. The instructing of the imaging device 140F, 140R, 140U, 140D, 140P to adjust the acquiring of the media includes coordinating 952 the plurality of imaging devices 140F, 140R, 140U, 140D, 140P.

In some embodiments, the imaging device 140F, 140R, 140U, 140D, 140P is configured to capture media visible above the vehicle 110.

In some embodiments, the imaging device 140F, 140R, 140U, 140D, 140P includes one or more lenses having transverse 360° and longitudinal 360° capture.

As shown in FIG. 9E, in some embodiments, the process 900 includes determining 956 a position of the person 105 within the vehicle 110. The process 900 includes determining 958 the overflow trigger location 250, 450, 750 of the person 105 based on the position of the person 105 within the vehicle 110. The overflow trigger location 250, 450, 750 is at least one of a virtual vertical line proximate to an edge of a window opening 115 of the vehicle 110, a virtual region of the window opening 115 of the vehicle 110, combinations of the same, or the like.

One or more functions are performed, in some embodiments, without user input. As shown in FIG. 9F, in some embodiments, at least one of the acquiring 960 media from the imaging device 140F, 140R, 140U, 140D, 140P on or in the vehicle 110; the determining 962 the gaze of the person 105 in the vehicle 110; the determining 964 the trajectory along direction 230, 330, 430, 530, 730 of the gaze; the determining 966 whether the trajectory along direction 230, 330, 430, 530, 730 of the gaze is likely to cross the overflow trigger location 250, 450, 750; the adjusting 968 the acquiring of the media from the imaging device 140F, 140R, 140U, 140D, 140P occurs without user input; combinations of the same; or the like. In response to determining (966="Yes") the trajectory along direction 230, 330, 430, 530, 730 of the gaze is likely to cross the overflow trigger location 250, 450, 750, the process 900 continues to the adjusting 968 step. In response to determining (966="No") the trajectory along direction 230, 330, 430, 530, 730 of the gaze is not likely to cross the overflow trigger location 250, 450, 750, the process 900 reverts to the determining 962 step.

In some embodiments, the process 900 includes determining a head position of the person 105 in the vehicle 110. The process 900 includes determining the gaze of the person 105 based on the determined head position.

As shown in FIG. 9G, in some embodiments, the process 900 includes determining 972 whether the gaze of the person 105 in the vehicle 110 is likely to be incident on a window 115 of the vehicle 110. The process 900 includes accessing 974 data regarding a position, shape, and size of the window 115. The process 900 includes determining 976 the trajectory along direction 230, 330, 430, 530, 730 of the gaze relative to the data regarding the position, shape, and size of the window 115.

FIG. 10 depicts a process 1000 for imaging and content generation, in accordance with some embodiments of the disclosure. For this process 1000, exemplary details are provided. In some embodiments, steps are omitted, modified, combined, duplicated, rearranged, and/or substituted with other steps in any suitable combination. Steps shown in parallel are performed in series in some embodiments. Steps shown in series are performed in parallel in some embodiments. In some embodiments, one or more steps of processes 900 and 1000 are combined.

The process 1000 includes mapping 1010, at an XR device 760, a virtual space to a physical space. The process 1000 includes receiving 1015, at the XR device 760, XR content for display with a content item. The process 1000 includes identifying 1020 that playback of the content item started at a display 710. The process 1000 includes determining 1025 a gaze of a person. The process 1000 includes determining 1030 a trajectory along direction 730 of the gaze. The process 1000 includes determining 1035 whether the trajectory along direction 730 of the gaze is likely to cross an overflow trigger location 750 of the display 710. The process 1000 includes, in response to determining (1035="Yes") the gaze is likely to cross the overflow trigger location 750 of the display 710, generating 1040, for concurrent output at the XR device 760, the content item and the XR content. The process 1000 includes, in response to determining (1035="No") the gaze is not likely to cross the overflow trigger location 750 of the display 710, reverting to the determining 1025 step.

Turning to some embodiments of the present disclosure, FIGS. 12A to 18C depict processes involving, for example, acquisition and display of imagery and information pertaining, for example, to roadside information, such as billboards, street name signs, and safety-related objects or information.

Billboards are a form of advertisement that are used nearly everywhere, from rural America to New York's Time Square. Advertising on a billboard is as inexpensive as a few hundred dollars a month in rural areas to tens of thousands of dollars a month or more in larger cities. Digital billboards are found in high traffic areas such as airports or malls. Costs to advertise with some digital billboards are known to be at least tens of thousands of dollars a month. The present methods and systems provide targeting and impression data and overcome limitations with billboards, including digital billboards, and the like.

For reference, FIGS. 11A and 11B illustrate a rear-view mirror 1110. In a first perspective 1100 at a first point in time, a driver looks through a windshield of the vehicle and can see the mirror 1110, which reflects a rear-facing view, and a billboard 1120 approaching. In a second perspective 1150 at a second point in time after the first point in time, the driver has passed the billboard 1120, and the driver can see a back side 1160 of the billboard 1120 in the mirror 1110.

Methods and systems are provided that improve on the rear-view mirror 1110. Persistent impressions are provided past an initial impression by the driver. Messages are reinforced without a need for an advertiser to utilize a digital billboard on a vehicle (such as a taxi cab), or erect or rent additional billboards along a given stretch of road. Drivers and passengers are able to easily see a billboard's message after the billboard has been passed without a need for the driver to perform a U-turn, turn their head, or rely on passengers to see and retain the information. Advertisers need not install a billboard with a reverse image to permit a driver who has passed the billboard to, for example, see the billboard in one of the rear-view or side mirrors of the vehicle.

In some embodiments, an SRVMD is provided. The SRVMD is configured to provide augmented reality functions, such as overlay information related to a billboard passed by the vehicle. Interactive functionalities are provided to re-enforce the advertising message on the billboard. In some embodiments, the SRVMD includes an LCD screen. The LCD screen is configured to display images produced by one or more cameras installed on the vehicle. Although the disclosure includes embodiments of the SRVMD mounted in a center of a vehicle's windshield, the present methods and systems are applied to side mirrors and displays and to other types of displays.

In some embodiments, a vehicle is detected in proximity to a billboard. An image overlay of the billboard is generated for display in the SRVMD. The image overlay is displayed on the SRVMD upon passing the billboard. The image includes an inverted view of the billboard and/or a control such as an icon to interact with the image of the billboard. Upon activation of the control, an expanded companion advertisement to the billboard is displayed. Views of the billboard with the SRVMD are tracked.

In some embodiments, a vehicle is configured with an SRVMD configured to overlay images and/or information on a display of the SRVMD. For example, an LCD-based rear-view mirror is configured to display a video stream of one or more cameras to reproduce the scene around the vehicle with at least similar or better accuracy as compared to a reflective mirror.

The LCD-based rear-view mirror is configured to provide an unobstructed view (e.g., a view from a camera mounted on a rear passenger or cargo section of the vehicle). The view includes an expanded field of view in some embodiments. The LCD-based rear-view mirror is referred to as a smart mirror or the like. The smart mirror is configured to alter the scene being displayed. The smart mirror enhances safety for the driver. The vehicle is configured with a plurality of front-facing sensors in some embodiments. The sensors include additional visible and invisible light cameras and/or LIDAR sensors configured to detect a presence of a roadside advertisement. In some embodiments, a roadside advertisement is detected (or detection is reinforced) by determining that a current location of the vehicle is within a predetermined distance of a physical billboard. The determination is made, in some embodiments, by cross-referencing the current location of the vehicle with a database of billboard locations offered by a cloud-based service.

Upon detecting the presence of the billboard, the system is configured, in some embodiments, to capture an image of the billboard using a front camera sensor and to generate an inverted image that is subsequently displayed in the rear-view mirror. The rear camera generates a first video stream of the scene behind the vehicle and sends the scene to a processing system. The processing system starts tracking the billboard utilizing, for example, a computer vision model trained for billboard detection. Using image segmentation methods, for example, the computer then generates a second video stream where the portion of the scene representing the billboard being seen from behind is replaced with the image of the billboard previously captured by the front-facing camera.

Turning to some embodiments of the present disclosure, FIG. 12A depicts a viewpoint 1200 from a vehicle with an SRVMD 1210 approaching a billboard 1120, in accordance with some embodiments of the disclosure. FIG. 12B depicts a viewpoint 1250 from the vehicle with the SRVMD 1210 after the vehicle passes the billboard 1120, in accordance with some embodiments of the disclosure. The SRVMD 1210 is configured to display an image 1260 of the billboard 1120 taken at a time corresponding to the viewpoint 1200. The image 1260 of the billboard 1120 replaces the back 1160 of the billboard 1120 that would be seen with the rear-view mirror 1110. The image 1260 includes a user-selectable icon (e.g., an arrow in a circle). The SRVMD 1210 is touch-sensitive allowing user selection of the user-selectable icon and detection thereof.

In some embodiments, a vehicle computer communicates with a billboard within view. The vehicle communicates with the billboard using, for example, a vehicle-to-infrastructure protocol or another form of communication such as a 5G-to-cloud application. The application is configured to receive and respond to requests from the vehicle computer regarding billboards. The application is configured to request and retrieve supplemental content to be displayed, for example, on an in-vehicle display device, such as that illustrated in FIG. 13 (i.e., on the SRVMD) or on a passenger device.

FIG. 13 depicts a viewpoint 1300 from the vehicle with an SRVMD 1310 after the vehicle passes the billboard 1120, in accordance with some embodiments of the disclosure. In this embodiment, the SRVMD 1310 displays, on a left side of the SRVMD 1310, a reflection of the back side 1160 of the billboard 1120. In addition, the SRVMD 1310 displays supplemental content 1360 on a right side of the SRVMD 1310.

FIG. 14 depicts a viewpoint 1400 from the vehicle with an SRVMD 1410 after the vehicle passes the billboard 1120, in accordance with some embodiments of the disclosure. The SRVMD 1410 is configured to display an image 1460 of the billboard 1120 taken at a time corresponding to a time prior to passing the billboard 1120. The image 1460 of the billboard 1120 replaces the back 1160 of the billboard 1120 that would be seen with the rear-view mirror 1110. The image 1460 includes a user-selectable icon (e.g., an arrow in a circle). The SRVMD 1410 is touch-sensitive allowing user selection 1405 of the user-selectable icon and detection thereof. In response to the user selection 1405 of the user-selectable icon (as seen in FIG. 14), the SRVMD 1410 displays supplemental content 1470 on a right side of the SRVMD 1410. In some embodiments, the supplemental content 1470 is personalized for one or more occupants of the vehicle.

In some embodiments, the mirror is configured, in response to the vehicle computer detecting a presence of safety-related objects such as other vehicles, on the road, and/or on a side of the road, to restrict display of images or supplemental content on an area of the mirror that is currently displaying the safety-related objects.

In some embodiments, the mirror includes an additional section of a display onto which non-safety-related information is displayed. The supplemental content related to the billboards is displayed on the additional section.

In some embodiments, in response to user selection of the supplemental content, turn-by-turn navigation directions are provided. For instance, if the billboard 1120 displays information about a restaurant, in response to user selection of an icon corresponding to the restaurant, the vehicle reroutes the vehicle's navigation system with directions to go to the restaurant. In some embodiments, a table is booked at the restaurant for a number of guests corresponding to a number of occupants in the vehicle.

In some embodiments, displayed information is completely virtual. The displayed information is displayed as an overlay on a head-up display (HUD) utilizing a windshield as a display surface (not shown). Options for interaction are displayed in the virtual billboard. One set of options for interaction is displayed at the HUD when the vehicle is approaching the virtual billboard, and another set of options is displayed at the HUD when the vehicle passes the virtual billboard. In some embodiments, activation of the virtual billboard is based on a location of the vehicle and a database of virtual billboard locations built to replicate an experience of viewing physical roadside billboards. The display of virtual billboards is provided without a need for investment by a business to install, operate, and maintain a physical structure and without a need to rent such physical structure.

In some embodiments, the display of interactable elements or overlays is limited to the HUD or rear-view mirror. A user interface method and apparatus for a vehicle display are described, for example, in Bove Jr., et al., U.S. patent application Ser. No. 18/196,938, filed May 12, 2023, which is hereby incorporated by reference herein in its entirety.

For example, a control input is detected based on user interaction with a UI. The vehicle seat position is determined corresponding to the UI interaction. An action corresponding to the control input is allowed when selected by an occupant in the determined vehicle seat position. The action is executed corresponding to the control input if permitted. The vehicle seat position is determined by capturing image data of the area near the UI during interaction, and the seat of the interacting occupant is identified in some embodiments. The vehicle seat position is determined based on a radio frequency signal present at the point of contact with the UI during interaction in other embodiments. The control input corresponds to different sets of actions, some of which are not permitted when selected by the occupant in the vehicle seat position. In such cases, an alert is presented to the occupant. The action executed varies depending on whether it was selected by a first occupant in a first vehicle seat position or a second occupant in a second vehicle seat position.

The vehicle allows interactions from the driver when a predetermined level of autonomy is detected. The vehicle automatically switches to a higher level of autonomy when detecting an intent for an interaction or an interaction, using in-cabin monitoring systems for instance.

Examples of interactable surfaces other than a rear-view mirror are depicted in FIGS. 15A to 16B. FIG. 15A depicts a viewpoint 1500 from the vehicle with a dashboard-mounted display device 1510 before the user selects 1505 a user-selectable icon in image 1560, in accordance with some embodiments of the disclosure. A vehicle's center console display is displayed in a lower portion 1515 of the device 1510. A viewpoint corresponding to a front-facing camera or a rear-facing camera is displayed in an upper portion 1520 of the device 1510. FIG. 15B depicts a viewpoint 1550 from the vehicle with the dashboard-mounted display device 1510 after the user selects 1505 the user-selectable icon in image 1560, in accordance with some embodiments of the disclosure. In response to the user selection 1505 of the user-selectable icon in image 1560, supplemental content 1570 related to the billboard is displayed in the lower portion 1515 of the device 1510.

FIG. 16A depicts a viewpoint 1600 from the vehicle with a passenger seat back display device 1610 before the user selects 1605 a user-selectable icon in the image 1560, in accordance with some embodiments of the disclosure. A movie (or other media content item) is displayed in an upper portion 1615 of the device 1610. A viewpoint corresponding to a front-facing camera or a rear-facing camera is displayed in a lower portion 1620 of the device 1610. FIG. 16B depicts a viewpoint 1650 from the vehicle with the dashboard-mounted display device 1610 after the user selects 1605 the user-selectable icon in the image 1560, in accordance with some embodiments of the disclosure. In response to the user selection 1605 of the user-selectable icon in image 1660, the movie is paused, and supplemental content 1670 related to the billboard is displayed in the upper portion 1615 of the device 1610.

FIG. 17A depicts a viewpoint 1700 from the vehicle with an SRVMD 1710 before the vehicle passes the billboard 1720, in accordance with some embodiments of the disclosure. FIG. 17B depicts a viewpoint 1750 from the vehicle with SRVMD 1710 after the vehicle passes the billboard 1720, in accordance with some embodiments of the disclosure. The SRVMD 1710 is configured to display a user-selectable icon 1760 (e.g., an arrow in a circle) over a back side of a reflection of the billboard 1720. The SRVMD 1710 is touch-sensitive, allowing user selection 1705 of the user-selectable icon 1760 and detection thereof. In response to the user selection 1705 of the user-selectable icon 1760, the SRVMD 1710 is configured to display an image 1770 of the billboard 1120 taken at a time corresponding to a time prior to passing the billboard 1720 on a right side of the SRVMD 1710.

In some embodiments, information other than billboards is detected. The information includes at least one of information from a direction sign, a street name sign, a physical object, a person, combinations of the same, or the like. FIG. 18A depicts the vehicle with an SRVMD 1810 before the vehicle reaches a first vehicular position of an intersection with a first street name sign 1820, a stop sign 1825, and a second street sign 1830, in accordance with some embodiments of the disclosure. In this example, visibility is poor, and the driver is focusing on traffic rather than on the first street name sign 1820. In some embodiments, the SRVMD 1810 is configured to detect additional objects within view, such as a license plate tag 1835 of another vehicle and a do not enter/wrong way sign 1840.

FIG. 18B depicts a viewpoint 1850 from the vehicle with the SRVMD 1810 after the vehicle reaches the first vehicular position of the intersection, in accordance with some embodiments of the disclosure. The SRVMD 1810 is configured to display a user-selectable icon 1860 in an upper-right-hand corner of a display of the SRVMD 1810. In response to selection 1805 of the user-selectable icon 1860, as seen from a viewpoint 1870 in FIG. 18C, the SRVMD 1810 is configured to display an image 1880 of the sign 1820. The image 1880 to be displayed is user configurable. For example, instead of the sign 1820, the image 1880 may be one of the other objects of interest within the view of the forward-facing camera.

In some embodiments, the vehicle computer applies image processing methods, for example, to the image 1880 of the sign 1820, to improve a readability of the image 1880 of the sign 1820 as displayed. The vehicle computer is configured to send improved image information to another in-vehicle display such as a center console or to a navigation computer thus improving the respective displays. In some embodiments, the vehicle displays a zoomed-in image of the street sign 1820 as captured by the front-facing camera. In some embodiments, a query of a database and/or of the navigation computer is performed to display a name of the street or any other information the street sign 1820 contains in plain text.

In some embodiments, detected objects and recorded imagery are combined. For example, in response to detection of a scene of an accident or a demonstration, the scene of the accent or demonstration is captured by the one or more cameras, which can be stored and/or played back on any display.

In some embodiments, in order to limit the amount of distraction caused by overlaying information on the rear-view mirror, the vehicle computer triggers overlays only when the mirror detects interest from the driver, such as a sustained gaze on a location of a tracked sign or on an object within the rear-view mirror.

In some embodiments, the vehicle computer registers an interaction by a user and reports it to an interaction tracking service. The interaction is utilized in the determination of whether or not information should be displayed on top of an object in the rear-view mirror of the present vehicle or other similarly configured vehicles. The information is utilized to assess how interesting and/or important a given object, e.g., a billboard, is. Thus, over time, general interest in a given billboard among a plurality of drivers is determined.

A process for imaging and content generation in accordance with the examples illustrated in FIGS. 12A to 18C is provided. The process includes receiving a first video stream from a front-facing camera in a vehicle. The process includes detecting a presence of a billboard in the first video stream. The process includes generating a first image of the billboard from the first video stream. The process includes receiving a second video stream from a rear-facing camera in the vehicle. The process includes detecting the billboard in the second video stream. The process includes overlaying the first image of the billboard on the image of the billboard in the second video stream in a third video stream. The process includes delivering the third video stream to a display in the vehicle. The display in the vehicle is at least one of a rear-view mirror, a console display, an HUD, a seat-back display, combinations of the same, or the like. The detecting the presence of the billboard is based on at least one of image analysis of the frames of the first video stream using an object detection model trained on billboard silhouettes, a location of the vehicle, a database of billboards, combinations of the same, or the like. The generating the first image of the billboard from the first video stream comprises extracting the image of the billboard from the video stream using image segmentation or the like in some embodiments. The generating the first image of the billboard from the first video stream comprises receiving an image from a billboard management service to provide personalized overlay for the billboard in some embodiments. The generating the first image of the billboard from the first video stream includes an interactable control in some embodiments. The interactable control triggers reception of supplemental content to the display in some embodiments.

FIG. 19A depicts a process 1900 for imaging and content generation, in accordance with some embodiments of the disclosure. For this process 1900, exemplary details are provided. In some embodiments, steps are omitted, modified, combined, duplicated, rearranged, and/or substituted with other steps in any suitable combination. Steps shown in parallel are performed in series in some embodiments. Steps shown in series are performed in parallel in some embodiments. FIGS. 19B to 19G depict subprocesses for imaging and content generation, in accordance with some embodiments of the disclosure.

The process 1900 includes instructing 1904 an imaging device 140F on or in a vehicle 110 to acquire media. The imaging device 140F is positioned to capture media external to the vehicle 110. The process 1900 includes identifying 1906 an object 1120, 1820, 1825, 1830, 1835, 1840 in the acquired media. The process 1900 includes determining 1908 whether the identified object 1120, 1820, 1825, 1830, 1835, 1840 visually conveys information including at least one of billboard information, sign information, license plate information, safety-related information, combinations of the same or the like. The process 1900 includes, in response to determining (1908="Yes") the identified object 1120, 1820, 1825, 1830, 1835, 1840 visually conveys the information, determining 1910 whether the information is of interest to a person 105 in the vehicle 110. The process 1900 includes, in response to determining (1908="No") the identified object 1120, 1820, 1825, 1830, 1835, 1840 does not visually convey the information, the process 1900 reverts to the identifying 1906 step. The process 1900 includes, in response to determining (1910="Yes") the information is of interest to the person 105 in the vehicle 110, generating 1926 content related to at least one of the identified object 1120, 1820, 1825, 1830, 1835, 1840, the information. The process 1900 includes, in response to determining (1910="Yes") the information is of interest to the person 105 in the vehicle 110, generating 1928 the related content 1260, 1360, 1460, 1470, 1560, 1570, 1670, 1770, 1880 for display on a display device in the vehicle 110 for viewing by the person 105 in the vehicle 110. The process 1900 includes, in response to determining (1910="Yes") the information is of interest to the person 105 in the vehicle 110, generating 1930 a user-selectable icon 1260, 1460, 1560, 1760, 1860 on or near the display of the generated related content 1260, 1360, 1460, 1470, 1560, 1570, 1670, 1770, 1880. The process 1900 includes, in response to determining (1910="No") the information is not of interest to the person 105 in the vehicle 110, reverting the process 1900 to the identifying 1906 step.

The process 1900 includes determining 1912 a gaze of the person 105 in the vehicle 110. The gaze is detected by the gaze detector (e.g., 210) in some embodiments. The process 1900 includes determining 1914 whether the gaze of the person 105 is focused on the identified object 1120, 1820, 1825, 1830, 1835, 1840. The process 1900 includes, in response to determining (1914="Yes") that the gaze of the person 105 is focused on the identified object 1120, 1820, 1825, 1830, 1835, 1840, performing the generating 1926 content related to the at least one of the identified object 1120, 1820, 1825, 1830, 1835, 1840, and the information. The process 1900 includes, in response to determining (1914="Yes") that the gaze of the person 105 is focused on the identified object 1120, 1820, 1825, 1830, 1835, 1840, performing the generating 1928 the related content 1260, 1360, 1460, 1470, 1560, 1570, 1670, 1770, 1880 for display on the display device in the vehicle 110 for viewing by the person 105 in the vehicle 110. The process 1900 includes, in response to determining (1914="No") that the gaze of the person 105 is not focused on the identified object 1120, 1820, 1825, 1830, 1835, 1840, reverting the process 1900 to the determining 1912 step.

The process 1900 includes acquiring 1916 a current location of the vehicle 110. The process 1900 includes acquiring 1918 a location of the identified object 1120, 1820, 1825, 1830, 1835, 1840 from an external source. The process 1900 includes, in response to determining (1920="Yes") that the location of the identified object 1120, 1820, 1825, 1830, 1835, 1840 is proximate to the current location of the vehicle 110, generating 1926 the related content 1260, 1360, 1460, 1470, 1560, 1570, 1670, 1770, 1880 by accessing 1922 information related to the identified object 1120, 1820, 1825, 1830, 1835, 1840 from the external source. The process 1900 includes, in response to determining (1920="No") that the location of the identified object 1120, 1820, 1825, 1830, 1835, 1840 is not proximate to the current location of the vehicle 110, reverting the process to the identifying 1906 step.

The process 1900 includes generating 1926 the related content 1260, 1360, 1460, 1470, 1560, 1570, 1670, 1770, 1880 by modifying 1924 an image 1260, 1460, 1560, 1880 of the identified object 1120, 1820, 1825, 1830, 1835, 1840. The modifying 1924 includes at least one of inverting the image, magnifying the image, replacing the image with a supplemental image 1360, 1470, 1570, 1670, 1770 related to the image, combinations of the same, or the like.

As shown in FIG. 19B, the process 1900 includes, in response to user selection (1932="Yes") of the user-selectable icon 1260, 1460, 1560, 1760, 1860 on or near the display of the generated related content 1260, 1360, 1460, 1470, 1560, 1570, 1670, 1770, 1880, generating 1934 for display at least one of additional content related to the generated related content 1260, 1360, 1460, 1470, 1560, 1570, 1670, 1770, 1880, interactive material related to the generated related content 1260, 1360, 1460, 1470, 1560, 1570, 1670, 1770, 1880, turn-by-turn directions to a real-world location associated with the identified object 1120, 1820, 1825, 1830, 1835, 1840, combinations of the same, or the like. The process 1900 includes, in response to no user selection (1932="No") of the user-selectable icon 1260, 1460, 1560, 1760, 1860 on or near the display of the generated related content 1260, 1360, 1460, 1470, 1560, 1570, 1670, 1770, 1880, repeating the determining 1932 step.

As shown in FIG. 19C, the process 1900 includes identifying 1936 in real time or in near real time a safety-related object 1825 in the acquired media. The process 1900 includes determining 1938 whether the display of the related content 1260, 1360, 1460, 1470, 1560, 1570, 1670, 1770, 1880 obscures the identified safety-related object 1825. The process 1900 includes, in response to determining (1938="Yes") that the display of the related content 1260, 1360, 1460, 1470, 1560, 1570, 1670, 1770, 1880 obscures the identified safety-related object 1825, altering 1940 the generating content related to the at least one of the identified object 1120, 1820, 1825, 1830, 1835, 1840, or the information, and altering 1942 the generating the related content 1260, 1360, 1460, 1470, 1560, 1570, 1670, 1770, 1880 for display on the display device in the vehicle 110 for viewing by the person 105 in the vehicle 110. The process 1900 includes, in response to determining (1938="No") that the display of the related content 1260, 1360, 1460, 1470, 1560, 1570, 1670, 1770, 1880 does not obscure the identified safety-related object 1825, generating 1926 content related to the at least one of the identified object 1120, 1820, 1825, 1830, 1835, 1840, or the information, and generating 1928 the related content 1260, 1360, 1460, 1470, 1560, 1570, 1670, 1770, 1880 for display on the display device in the vehicle 110 for viewing by the person 105 in the vehicle 110. In some embodiments, supplemental content is displayed on an infotainment display or at another location on the 1210, 1310, 1410, 1710, 1810 that does not contain safety-related content.

In some embodiments, the display device is an SRVMD 1210, 1310, 1410, 1710, 1810. As shown in FIG. 19D, the process 1900 includes determining 1944 whether the identified object 1120, 1820, 1825, 1830, 1835, 1840 is within a rear field of view FIG. 12B, FIG. 13, FIG. 14, FIG. 17B of the SRVMD 1210, 1310, 1410, 1710, 1810. The process 1900 includes, in response to determining (1944="No") the identified object 1120, 1820, 1825, 1830, 1835, 1840 is not within the rear field of view FIG. 12B, FIG. 13, FIG. 14, FIG. 17B of the SRVMD 1210, 1310, 1410, 1710, 1810, generating 1946 an image and/or an icon based on the identified object 1120, 1820, 1825, 1830, 1835, 1840 over a portion of a display of the SRVMD 1210, 1310, 1410, 1710, 1810. The process 1900 includes, in response to determining (1944="Yes") the identified object 1120, 1820, 1825, 1830, 1835, 1840 is within the rear field of view FIG. 12B, FIG. 13, FIG. 14, FIG. 17B of the SRVMD 1210, 1310, 1410, 1710, 1810, identifying 1948 a back side 1160 of the identified object 1120, 1820, 1825, 1830, 1835, 1840 in the SRVMD 1210, 1310, 1410, 1710, 1810 and generating 1950 an image and/or an icon based on the identified object 1120, 1820, 1825, 1830, 1835, 1840 over a portion of a display of the SRVMD 1210, 1310, 1410, 1710, 1810 corresponding to the identified back side 1160 of the identified object 1120, 1820, 1825, 1830, 1835, 1840. In some embodiments, the process 1900 includes generating 1950 for display an image and/or an icon based on the identified object 1120, 1820, 1825, 1830, 1835, 1840 on a portion of a display of the SRVMD 1210, 1310, 1410, 1710, 1810 without necessarily placing the image on the back side of identified object.

As shown in FIG. 19E, the process 1900 includes generating 1952 a user-selectable image and/or an icon based on the identified object 1120, 1820, 1825, 1830, 1835, 1840 over a first portion of a display of the SRVMD 1210, 1310, 1410, 1710, 1810 corresponding to the identified back side 1160 of the identified object 1120, 1820, 1825, 1830, 1835, 1840. The process 1900 includes, in response to determining (1954="Yes"), user selection of the user user-selectable image and/or an icon has occurred, generating 1956 for display an image based on the identified object 1120, 1820, 1825, 1830, 1835, 1840 on a second portion of the display of the SRVMD 1210, 1310, 1410, 1710, 1810, where the second portion is different from the first portion. The process 1900 includes, in response to determining (1954="No"), user selection of the user user-selectable image and/or an icon has not occurred, repeating the determining 1954 step.

In some embodiments, the process 1900 includes generating for display an image and/or an a user selectable on a portion of a display of a smart rear-view mirror and display; and in response to user selection of the user selectable icon, generating for display an image based on the identified object on the portion of the display of the smart rear-view mirror and display In some embodiments, the display device is a dashboard-mounted display device 1510 or a passenger display device 1610. As shown in FIG. 19F, the process 1900 includes generating 1958 for display the acquired media in a first portion of a display of the dashboard-mounted display device 1510 or the passenger display device 1610. The process 1900 includes generating a user-selectable image and/or a user-selectable icon 1260, 1460, 1560, 1760, 1860 based on the identified object 1120, 1820, 1825, 1830, 1835, 1840 over a section of the first portion of the display of the dashboard-mounted display device 1510 or the passenger display device 1610. The process 1900 includes in response to user selection (1962="Yes") of the user-selectable image and/or the user-selectable icon 1260, 1460, 1560, 1760, 1860, generating 1964 for display an image based on the identified object 1120, 1820, 1825, 1830, 1835, 1840 on a second portion of the display of the dashboard-mounted display device 1510 or the passenger display device 1610, where the second portion is different from the first portion.

In some embodiments, the display device is an SRVMD 1210, 1310, 1410, 1710, 1810. As shown in FIG. 19G, the process 1900 includes determining 1966 whether the identified object 1120, 1820, 1825, 1830, 1835, 1840 is a road sign 1120, 1720. In response to determining (1966="Yes") the identified object 1120, 1820, 1825, 1830, 1835, 1840 is a road sign 1120, 1720, the process 1900 includes capturing 1968 an image from the acquired media corresponding only to the identified road sign 1120, 1720. In response to determining (1966="No") the identified object 1120, 1820, 1825, 1830, 1835, 1840 is not a road sign 1120, 1720, the determining 1966 step is repeating.

The process 1900 includes, in response to determining (1970="Yes") the identified object 1120, 1820, 1825, 1830, 1835, 1840 is within the rear field of view FIG. 12B, FIG. 13, FIG. 14, FIG. 17B of the SRVMD 1210, 1310, 1410, 1710, 1810, identifying 1972 a back side 1160 of the identified road sign 1120, 1720; generating 1974 a user-selectable image and/or a user-selectable icon 1260, 1460, 1560, 1760, 1860 over a portion of a display of the SRVMD 1210, 1310, 1410, 1710, 1810 corresponding to the identified back side 1160 of the identified road sign 1120, 1720; and in response to user selection (1976="Yes") of the user-selectable image and/or the user-selectable icon 1260, 1460, 1560, 1760, 1860, generating e.g., 1978 for display the captured image of the identified road sign 1120, 1720 on the portion of the display of the SRVMD 1210, 1310, 1410, 1710, 1810 corresponding to the identified back side 1160 of the identified road sign 1120, 1720. In response to no user selection (1976="No") of the user-selectable image and/or the user-selectable icon 1260, 1460, 1560, 1760, 1860, the determining 1976 repeats.

FIG. 20 depicts identified objects 2000 for driver assistance or passenger use and for imaging and content generation, in accordance with some embodiments of the disclosure. The identified object 1120, 1820, 1825, 1830, 1835, 1840 includes at least one of a license plate 1835 (see, e.g., FIG. 18A), a billboard 1120, 1720 (see, e.g., FIGS. 11A and 17A), 2050, a road sign 1820, 1825, 1830, 1840 (see, e.g., FIG. 18A), a stop sign 2005, a street name sign 1820, 1830 (see, e.g., FIG. 18A), 2015, a traffic light 2010, a neon sign 2020, a digital sign 2025, a building sign 2030, a sandwich board 2035, a vehicle wrap 2040, a banner 2045, a building wrap 2055, combinations of the same, or the like. The objects are not limited to those illustrated in the present drawings. The objects include any type of visual indicia of information.

The display device is at least one of an SRVMD 1210, 1310, 1410, 1710, 1810; a dashboard display device 1510; an infotainment system display device 1510, 1610; a passenger display device 1610; a computing device present in the vehicle 110; combinations of the same; or the like.

Vehicle navigation methods to maximize operator's intent are described, for example, in Couleaud, et al., U.S. patent application Ser. No. 18/213,690, filed Jun. 23, 2023, which is hereby incorporated by reference herein in its entirety. In some embodiments, a process for vehicle navigation is provided. The process includes receiving an input via a user interface. The input includes a destination. The process includes determining a primary goal and a secondary goal. The primary goal includes identifying a traversable route from a starting location to the destination. The process includes determining a plurality of waypoints based on the secondary goal. The process includes determining a plurality of candidate routes based on the starting location and the destination. The process includes identifying, from among the plurality of candidate routes, based on a number of waypoints of the plurality of waypoints positioned along each respective route of the plurality of candidate routes, a target route. The process includes generating for navigation by a vehicle, the target route.

The process for vehicle navigation includes one or more additional features in some embodiments. The input via the user interface further includes a natural language qualifier, and the secondary goal corresponds to the natural language qualifier. The process includes determining the plurality of waypoints based on the natural language qualifier in some embodiments. In other embodiments, the process includes determining the plurality of waypoints based on the natural language qualifier and a user profile including one or more of a digital photo album, a transaction history, or a digital wallet. The input via the user interface further includes a natural language constraint. The process includes identifying the target route from among the plurality of candidate routes based on the number of waypoints and based on the natural language constraint. The natural language constraint includes a minimum vehicle autonomy level. Identifying the target route from among the plurality of candidate routes includes determining that each segment of the target route has a corresponding vehicle autonomy level greater than or equal to the minimum vehicle autonomy level. Identifying the target route further includes identifying a first target route having a first expected duration and passing by a first number of waypoints. The process includes identifying a second target route having a second expected duration longer than the first expected duration and passing by a second number of waypoints that is greater than the first number of waypoints. The process includes generating, for display via the user interface, the first target route and the second target route. The process includes generating, for display via the user interface, an indication that the second target route has a longer expected duration than the first target route and passes by a greater number of waypoints than the first target route. The plurality of waypoints includes a plurality of external advertisement surfaces. The secondary goal includes maximizing a number of external advertisement surfaces visible from the traversable route. The process includes identifying the target route from among the plurality of candidate routes based on the number of waypoints positioned along the target route. The process includes determining a ranking of the plurality of external advertisement surfaces based on (a) content displayed by each respective external advertisement surface and (b) a user profile associated with the input. The process includes identifying the target route based on the ranking of the plurality of external advertisement surfaces. The process includes determining that a vehicle is positioned proximate to a first external advertisement surface along the target route. The process includes generating for display inside the vehicle a supplemental advertisement corresponding to the first external advertisement surface. The process includes determining that a vehicle is positioned proximate to a first external advertisement surface along the target route. The process includes instructing the first external advertisement surface to generate for display first content. The first content is determined based on a user profile associated with the input. The vehicle includes a first vehicle of a plurality of vehicles. The process includes determining, for each vehicle of the plurality of vehicles, a respective target route. Each respective target route is determined based on the location of the plurality of external advertisement surfaces, targeting requirements corresponding to each of the plurality of external advertisement surfaces; an expected time of arrival at one or more of the plurality of external advertisement surfaces along the respective target route; and a user profile associated with the vehicle of the plurality of vehicles.

In some embodiments, the operations shown, for example, in FIGS. 1A-10 and 12A-19G are performed without any explicit user actions or triggers. Users enjoy extended viewing experiences without user input. In some embodiments, additional explicit user actions result in content capture. The explicit user actions include at least one of a voice command, a pre-defined hand gesture, pushing a physical or virtual button, combinations of the same, or the like. In some embodiments, in response to voice queries during content capture, additional information about the captured scene is obtained and displayed. For example, the responses are displayed on a window or any other screen. In some embodiments, blind spot content is provided to a driver.

Predictive Model

Throughout the present disclosure, in some embodiments, determinations, predictions, likelihoods, and the like are determined with one or more predictive models. For example, FIG. 21 depicts a predictive model. A prediction process 2100 includes a predictive model 2150 in some embodiments. The predictive model 2150 receives as input various forms of data about one, more or all the users, media content items, devices, and data described in the present disclosure. The predictive model 2150 performs analysis based on at least one of hard rules, learning rules, hard models, learning models, usage data, load data, analytics of the same, metadata, profile information, combinations of the same, or the like. The predictive model 2150 outputs one or more predictions of a future state of any of the devices described in the present disclosure. A load-increasing event is determined by load-balancing processes, e.g., least connection, least bandwidth, round robin, server response time, weighted versions of the same, resource-based processes, and address hashing. The predictive model 2150 is based on input including at least one of a hard rule 2105, a user-defined rule 2110, a rule defined by a content provider 2115, a hard model 2120, a learning model 2125, combinations of the same, or the like.

The predictive model 2150 receives as input usage data 2130. The predictive model 2150 is based, in some embodiments, on at least one of a usage pattern of the user or media device, a usage pattern of the requesting media device, a usage pattern of the media content item, a usage pattern of the communication system or network, a usage pattern of the profile, a usage pattern of the media device, combinations of the same, or the like.

The predictive model 2150 receives as input load-balancing data 2135. The predictive model 2150 is based on at least one of load data of the display device, load data of the requesting media device, load data of the media content item, load data of the communication system or network, load data of the profile, load data of the media device, combinations of the same, or the like.

The predictive model 2150 receives as input metadata 2140. The predictive model 2150 is based on at least one of metadata of the streaming service, metadata of the requesting media device, metadata of the media content item, metadata of the communication system or network, metadata of the profile, metadata of the media device, combinations of the same, or the like. The metadata includes information of the type represented in the media device manifest.

The predictive model 2150 is trained with data. The training data is developed in some embodiments using one or more data processes including but not limited to data selection, data sourcing, and data synthesis. The predictive model 2150 is trained in some embodiments with one or more analytical processes including but not limited to classification and regression trees (CART), discrete choice models, linear regression models, logistic regression, logit versus probit, multinomial logistic regression, multivariate adaptive regression splines, probit regression, regression processes, survival or duration analysis, and time series models. The predictive model 2150 is trained in some embodiments with one or more machine learning approaches including but not limited to supervised learning, unsupervised learning, semi-supervised learning, reinforcement learning, and dimensionality reduction. The predictive model 2150 in some embodiments includes regression analysis including analysis of variance (ANOVA), linear regression, logistic regression, ridge regression, and/or time series. The predictive model 2150 in some embodiments includes classification analysis including decision trees and/or neural networks. In FIG. 21, a depiction of a multi-layer neural network is provided as a non-limiting example of a predictive model 2150, the neural network including an input layer (left side), three hidden layers (middle), and an output layer (right side) with 32 neurons and 192 edges, which is intended to be illustrative, not limiting. The predictive model 2150 is based on data engineering and/or modeling processes. The data engineering processes include exploration, cleaning, normalizing, feature engineering, and scaling. The modeling processes include model selection, training, evaluation, and tuning. The predictive model 2150 is operationalized using registration, deployment, monitoring, and/ or retraining processes.

The predictive model 2140 is configured to output results to a device or multiple devices. The device includes means for performing one, more, or all the features referenced herein of the systems, methods, processes, and outputs of one or more of FIGS. 1A-10 and 12A-19G, in any suitable combination. The device is at least one of a server 2155, a tablet 2160, a media display device 2165, a network-connected computer 2170, a media device 2175, a computing device 2180, combinations of the same, or the like.

The predictive model 2150 is configured to output a current state 2181, and/or a future state 2183, and/or a determination, a prediction, or a likelihood 2185, and the like. The current state 2181, and/or the future state 2183, and/or the determination, the prediction, or the likelihood 2185, and the like may be compared 2190 to a predetermined or determined standard. In some embodiments, the standard is satisfied (1490=OK) or rejected (1490=NOT OK). If the standard is satisfied or rejected, the predictive process 2100 outputs at least one of the current state, the future state, the determination, the prediction, the likelihood to any device or module disclosed herein, combinations of the same, or the like.

Communication System

FIG. 22 depicts a block diagram of system 2200, in accordance with some embodiments. The system is shown to include computing device 2202, server 2204, and a communication network 2206. It is understood that while a single instance of a component may be shown and described relative to FIG. 22, additional embodiments of the component may be employed. For example, server 2204 may include, or may be incorporated in, more than one server. Similarly, communication network 2206 may include, or may be incorporated in, more than one communication network. Server 2204 is shown communicatively coupled to computing device 2202 through communication network 2206. While not shown in FIG. 22, server 2204 may be directly communicatively coupled to computing device 2202, for example, in a system absent or bypassing communication network 2206.

Communication network 2206 may include one or more network systems, such as, without limitation, the Internet, LAN, Wi-Fi, wireless, or other network systems suitable for audio processing applications. The system 2200 of FIG. 22 excludes server 2204, and functionality that would otherwise be implemented by server 2204 is instead implemented by other components of the system depicted by FIG. 22, such as one or more components of communication network 2206. In still other embodiments, server 2204 works in conjunction with one or more components of communication network 2206 to implement certain functionality described herein in a distributed or cooperative manner. Similarly, the system depicted by FIG. 22 excludes computing device 2202, and functionality that would otherwise be implemented by computing device 2202 is instead implemented by other components of the system depicted by FIG. 22, such as one or more components of communication network 2206 or server 2204 or a combination of the same. In other embodiments, computing device 2202 works in conjunction with one or more components of communication network 2206 or server 2204 to implement certain functionality described herein in a distributed or cooperative manner.

Computing device 2202 includes control circuitry 2208, display 2210 and input/output (I/O) circuitry 2212. Control circuitry 2208 may be based on any suitable processing circuitry and includes control circuits and memory circuits, which may be disposed on a single integrated circuit or may be discrete components. As referred to herein, processing circuitry should be understood to mean circuitry based on at least one microprocessors, microcontrollers, digital signal processors, programmable logic devices, field-programmable gate arrays (FPGAs), application-specific integrated circuits (ASICs), system-on-chip (SoC), application-specific standard parts (ASSPs), indium phosphide (InP)-based monolithic integration and silicon photonics, non-classical devices, organic semiconductors, compound semiconductors, "More Moore" devices, "More than Moore" devices, cloud-computing devices, combinations of the same, or the like, and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i7 processor and an Intel Core i9 processor). Some control circuits may be implemented in hardware, firmware, or software. Control circuitry 2208 in turn includes communication circuitry 2226, storage 2222 and processing circuitry 2218. Either of control circuitry 2208 and 2234 may be utilized to execute or perform any or all the systems, methods, processes, and outputs of one or more of FIGS. 1A-10 and 12A-19G, or any combination of steps thereof (e.g., as enabled by processing circuitries 2218 and 2236, respectively).

In addition to control circuitry 2208 and 2234, computing device 2202 and server 2204 may each include storage (storage 2222, and storage 2238, respectively). Each of storages 2222 and 2238 may be an electronic storage device. As referred to herein, the phrase "electronic storage device" or "storage device" should be understood to mean any device for storing electronic data, computer software, or firmware, such as random-access memory, read-only memory, cloud-based storage, hard drives, optical drives, digital video disc (DVD) recorders, compact disc (CD) recorders, BLU-RAY disc (BD) recorders, BLU-RAY 8D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 2222 and 2238 may be used to store several types of content, metadata, and/or other types of data. Non-volatile memory may also be used (e.g., to launch a boot-up routine and other instructions). Cloud-based storage may be used to supplement storages 2222 and 2238 or instead of storages 2222 and 2238. In some embodiments, a user profile and messages corresponding to a chain of communication may be stored in one or more of storages 2222 and 2238. Each of storages 2222 and 2238 may be utilized to store commands, for example, such that when each of processing circuitries 2218 and 2236, respectively, are prompted through control circuitries 2208 and 2234, respectively. Either of processing circuitries 2218 or 2236 may execute any of the systems, methods, processes, and outputs of one or more of FIGS. 1A-10 and 12A-19G, or any combination of steps thereof.

In some embodiments, control circuitry 2208 and/or 2234 executes instructions for an application stored in memory (e.g., storage 2222 and/or storage 2238). Specifically, control circuitry 2208 and/or 2234 may be instructed by the application to perform the functions discussed herein. In some embodiments, any action performed by control circuitry 2208 and/or 2234 may be based on instructions received from the application. For example, the application may be implemented as software or a set of and/or one or more executable instructions that may be stored in storage 2222 and/or 2238 and executed by control circuitry 2208 and/or 2234. The application may be a client/server application where only a client application resides on computing device 2202, and a server application resides on server 2204.

The application may be implemented using any suitable architecture. For example, it may be a stand-alone application wholly implemented on computing device 2202. In such an approach, instructions for the application are stored locally (e.g., in storage 2222), and data for use by the application is downloaded on a periodic basis (e.g., from an out-of-band feed, from an Internet resource, or using another suitable approach). Control circuitry 2208 may retrieve instructions for the application from storage 2222 and process the instructions to perform the functionality described herein. Based on the processed instructions, control circuitry 2208 may determine a type of action to perform in response to input received from I/O circuitry 2212 or from communication network 2206.

The computing device 2202 is configured to communicate with an I/O device 2260 via the I/O circuitry 2212. The I/O device 2260 includes at least one of the outwardly facing imaging devices 140F, 140R, 140U, 140D, 140P, the inwardly facing imaging device 150, the extended display 260, the infotainment display device 560, the display device 710, the extended display device 760, the user device of FIG. 7C, the XR device of FIG. 7D, the SRVMD 1210, the SRVMD 1310, the SRVMD 1410, the dashboard-mounted display device 1510, the passenger seat back display device 1610, the SRVMD 1710, the SRVMD 1810, the server 2155, the tablet 2160, the media display device 2165, the network-connected computer 2170, the media device 2175, the computing device 2180, combinations of the same, or the like, in some embodiments. In some embodiments, the user input 2214 is received from the I/O device 2260. A wired and/or wireless connection between the I/O circuitry 2212 and the I/O device 2260 is provided in some embodiments.

In client/server-based embodiments, control circuitry 2208 may include communication circuitry suitable for communicating with an application server (e.g., server 2204) or other networks or servers. The instructions for conducting the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 2206). In another example of a client/server-based application, control circuitry 2208 runs a web browser that interprets web pages provided by a remote server (e.g., server 2204). For example, the remote server may store the instructions for the application in a storage device.

The remote server may process the stored instructions using circuitry (e.g., control circuitry 2234) and/or generate displays. Computing device 2202 may receive the displays generated by the remote server and may display the content of the displays locally via display 2210. For example, display 2210 may be utilized to present a string of characters. This way, the processing of the instructions is performed remotely (e.g., by server 2204) while the resulting displays, such as the display windows described elsewhere herein, are provided locally on computing device 2204. Computing device 2202 may receive inputs from the user via input/output circuitry 2212 and transmit those inputs to the remote server for processing and generating the corresponding displays.

Alternatively, computing device 2202 may receive inputs from the user via input/output circuitry 2212 and process and display the received inputs locally, by control circuitry 2208 and display 2210, respectively. For example, input/output circuitry 2212 may correspond to a keyboard and/or a set of and/or one or more speakers/microphones which are used to receive user inputs (e.g., input as displayed in a search bar or a display of FIG. 22 on a computing device). Input/output circuitry 2212 may also correspond to a communication link between display 2210 and control circuitry 2208 such that display 2210 updates in response to inputs received via input/output circuitry 2212 (e.g., simultaneously update what is shown in display 2210 based on inputs received by generating corresponding outputs based on instructions stored in memory via a non-transitory, computer-readable medium).

Server 2204 and computing device 2202 may transmit and receive content and data such as media content via communication network 2206. For example, server 2204 may be a media content provider, and computing device 2202 may be a smart television configured to download or stream media content, such as a live news broadcast, from server 2204. Control circuitry 2234, 2208 may send and receive commands, requests, and other suitable data through communication network 2206 using communication circuitry 2232, 2226, respectively. Alternatively, control circuitry 2234, 2208 may communicate directly with each other using communication circuitry 2232, 2226, respectively, avoiding communication network 2206.

It is understood that computing device 2202 is not limited to the embodiments and methods shown and described herein. In nonlimiting examples, computing device 2202 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same, capable of suitably displaying and manipulating media content.

Computing device 2202 receives user input 2214 at input/output circuitry 2212. For example, computing device 2202 may receive a user input such as a user swipe or user touch. It is understood that computing device 2202 is not limited to the embodiments and methods shown and described herein.

User input 2214 may be received from a user selection-capturing interface that is separate from device 2202, such as a remote-control device, trackpad, or any other suitable user movement-sensitive, audio-sensitive or capture devices, or as part of device 2202, such as a touchscreen of display 2210. Transmission of user input 2214 to computing device 2202 may be accomplished using a wired connection, such as an audio cable, USB cable, ethernet cable and the like attached to a corresponding input port at a local device, or may be accomplished using a wireless connection, such as Bluetooth, Wi-Fi, WiMAX, GSM, UTMS, CDMA, TDMA, 8G, 4G, 4G LTE, 5G, NearLink, ultra-wideband technology, or any other suitable wireless transmission protocol. Input/output circuitry 2212 may include a physical input port such as a 12.5 mm (0.4921 inch) audio jack, RCA audio jack, USB port, ethernet port, or any other suitable connection for receiving audio over a wired connection or may include a wireless receiver configured to receive data via Bluetooth, Wi-Fi, WiMAX, GSM, UTMS, CDMA, TDMA, 3G, 4G, 4G LTE, 5G, NearLink, ultra-wideband technology, or other wireless transmission protocols.

Processing circuitry 2218 may receive user input 2214 from input/output circuitry 2212 using communication path 2216. Processing circuitry 2218 may convert or translate the received user input 2214 that may be in the form of audio data, visual data, gestures, or movement to digital signals. In some embodiments, input/output circuitry 2212 performs the translation to digital signals. In some embodiments, processing circuitry 2218 (or processing circuitry 2236, as the case may be) conducts disclosed processes and methods.

Processing circuitry 2218 may provide requests to storage 2222 by communication path 2220. Storage 2222 may provide requested information to processing circuitry 2218 by communication path 2246. Storage 2222 may transfer a request for information to communication circuitry 2226 which may translate or encode the request for information to a format receivable by communication network 2206 before transferring the request for information by communication path 2228. Communication network 2206 may forward the translated or encoded request for information to communication circuitry 2232, by communication path 2230.

At communication circuitry 2232, the translated or encoded request for information, received through communication path 2230, is translated or decoded for processing circuitry 2236, which will provide a response to the request for information based on information available through control circuitry 2234 or storage 2238, or a combination thereof. The response to the request for information is then provided back to communication network 2206 by communication path 2240 in an encoded or translated format such that communication network 2206 forwards the encoded or translated response back to communication circuitry 2226 by communication path 2242.

At communication circuitry 2226, the encoded or translated response to the request for information may be provided directly back to processing circuitry 2218 by communication path 2254 or may be provided to storage 2222 through communication path 2244, which then provides the information to processing circuitry 2218 by communication path 2246. Processing circuitry 2218 may also provide a request for information directly to communication circuitry 2226 through communication path 2252, where storage 2222 responds to an information request (provided through communication path 2220 or 2244) by communication path 2224 or 2246 that storage 2222 does not contain information pertaining to the request from processing circuitry 2218.

Processing circuitry 2218 may process the response to the request received through communication paths 2246 or 2254 and may provide instructions to display 2210 for a notification to be provided to the users through communication path 2248. Display 2210 may incorporate a timer for providing the notification or may rely on inputs through input/output circuitry 2212 from the user, which are forwarded through processing circuitry 2218 through communication path 2248, to determine how long or in what format to provide the notification. When display 2210 determines the display has been completed, a notification may be provided to processing circuitry 2218 through communication path 2250.

The communication paths provided in FIG. 22 between computing device 2202, server 2204, communication network 2206, and all subcomponents depicted are examples and may be modified to reduce processing time or enhance processing capabilities for each step in the processes disclosed herein by one skilled in the art.

Terminology

The terminology used herein is for the purpose of describing particular embodiments only and is not intended to be limiting of the disclosure.

As used herein, the terms "real time," "simultaneous," "substantially on-demand," and the like are understood to be nearly instantaneous but may include delay due to practical limits of the system. Such delays may be in the order of milliseconds or microseconds, depending on the application and nature of the processing. Relatively longer delays (e.g., greater than a millisecond) may result due to communication or processing delays, particularly in remote and cloud computing environments.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least some embodiments are described as using a plurality of units or modules to perform a process or processes, it is understood that the process or processes may also be performed by one or a plurality of units or modules. Additionally, it is understood that the term controller/control unit may refer to a hardware device that includes a memory and a processor. The memory may be configured to store the units or the modules, and the processor may be specifically configured to execute said units or modules to perform one or more processes which are described herein.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third", and so on, herein, are provided to identify structures or operations, without describing an order of structures or operations, and, to the extent the structures or operations are used in an embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random access memory (RAM), UltraRAM, cloud-based storage, and the like.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

Any use of a phrase such as "in some embodiments" or the like with reference to a feature is not intended to link the feature to another feature described using the same or a similar phrase. Any and all embodiments disclosed herein are combinable or separately practiced as appropriate. Absence of the phrase "in some embodiments" does not infer that the feature is necessary. Inclusion of the phrase "in some embodiments" does not infer that the feature is not applicable to other embodiments or even all embodiments.

The systems and processes discussed herein are intended to be illustrative and not limiting. One skilled in the art would appreciate that the actions of the processes discussed herein may be omitted, modified, combined, duplicated, rearranged, and/or substituted, and any additional actions may be performed without departing from the scope of the invention. More generally, the disclosure herein is meant to provide examples and is not limiting. Only the claims that follow are meant to set bounds as to what the present disclosure includes. Furthermore, it should be noted that the features and limitations described in any some embodiments may be applied to any other embodiment herein, and flowcharts or examples relating to some embodiments may be combined with any other embodiment in a suitable manner, done in different orders, or done in parallel. In addition, the methods and systems described herein may be performed in real time. It should also be noted that the methods and/or systems described herein may be applied to, or used in accordance with, other methods and/or systems.

This description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for controlling media acquisition by an imaging device, the imaging device positioned to capture media external to a vehicle for conveying a person, the method comprising:
   instructing the imaging device to acquire the media;
   determining a gaze of the person in the vehicle;
   determining a trajectory of the gaze;
   identifying, based on the gaze, an object of interest in the external environment of the vehicle;
   determining whether the trajectory of the gaze is likely to cross an overflow trigger location; and
   based at least in part on determining that the gaze is likely to cross the overflow trigger location, instructing the imaging device to adjust the acquiring of the media to capture content related to the object of interest.

2. The method of claim 1, wherein the determining the gaze of the person in the vehicle is based on an image of the person obtained by an inwardly focused imaging device.

3. The method of claim 2, wherein the determining the gaze of the person is based on at least one of a gaze location of the person, an eye position of the person, a direction of the gaze of the person, a head position of the person, or a head orientation of the person.

4. The method of claim 1, comprising:
   further in response to determining the gaze of the person is focused on the object of interest, generating for display acquired media including the object of interest on an extended display device.

5. The method of claim 1, comprising:
   determining an interest of the person in the object of interest based on the gaze of the person.

6. The method of claim 1, comprising:
   determining an interest of the person in the object of interest based on at least one of: a duration of time that the gaze of the person is incident on the object of interest; a determined interest of another person in the vehicle in the object of interest; a determined interest of one or more other people that have passed through the same location as the vehicle in an object similar to the object of interest; a user preference; or a trained model configured to determine the interest of people in objects based on the gaze of the person.

7. The method of claim 6, wherein a degree of the interest increases as a length of time that the gaze is incident on or near the object of interest increases.

8. The method of claim 1, comprising:
   receiving a user selection of a level of interest in each of a plurality of objects scenes;
   determining whether the object of interest matches one or more of the plurality of objects; and
   filtering the identifying of the object of interest based on whether the object of interest meets or exceeds the selected level of interest in the matching one or more of the object of interest.

9. The system of claim 1, wherein the control circuitry is configured to:
   determine an interest of the person in the object of interest based on at least one of: a duration of time that the gaze of the person is incident on the object of interest; a determined interest of another person in the vehicle in the object of interest; a determined interest of one or more other people that have passed through the same location as the vehicle in an object similar to the object of interest; a user preference; or a trained model configured to determine the interest of people in objects based on the gaze of the person.

10. The system of claim 9, wherein a degree of the interest increases as a length of time that the gaze is incident on or near the object of interest.

11. The method of claim 7, further comprising:
   adjusting the degree of interest based on determining that the gaze is likely to cross the overflow trigger location; and
   wherein the instructing the imaging device to adjust the acquiring of the media to capture content related to the object of interest is performed based at least in part on the adjusted degree of interest.

12. The method of claim 1, wherein the determining whether the trajectory of the gaze is likely to cross an overflow trigger location further comprises:
   projecting the gaze along a predicted gaze trajectory; and
   determining, based on the predicted gaze trajectory, that the gaze is likely to cross the overflow trigger location at a future time.

13. The system of claim 10, wherein the control circuitry is further configured to adjust the degree of interest based on determining that the gaze is likely to cross the overflow trigger location; and wherein the control circuitry is configured to instruct the imaging device to adjust the acquiring of the media to capture content related to the object of interest based at least in part on the adjusted degree of interest.

14. A method comprising:

mapping, at an extended reality device, a virtual space to a physical space;

receiving, at the extended reality device, extended reality content for display with a content item;

identifying that playback of the content item started at a display;

determining a gaze of a person;

determining a trajectory of the gaze;

identifying, based on the gaze, an object of interest in the external environment of the vehicle;

determining whether the trajectory of the gaze is likely to cross an overflow trigger location of the display; and based at least in part on determining that the gaze is likely to cross the overflow trigger location of the display, generating, for concurrent output at the extended reality device, the content item and the extended reality content.

15. The system of claim 14, wherein the control circuitry is configured to determine whether the trajectory of the gaze is likely to cross an overflow trigger location by:

projecting the gaze along a predicted gaze trajectory; and determining, based on the predicted gaze trajectory, that the gaze is likely to cross the overflow trigger location at a future time.

16. A system for controlling media acquisition by an imaging device, the imaging device positioned to capture media external to a vehicle for conveying a person, the system comprising:

control circuitry configured to:

instruct the imaging device to acquire the media;

determine a gaze of the person in the vehicle;

determine a trajectory of the gaze;

identify, based on the gaze, an object of interest in the external environment of the vehicle;

determine whether the trajectory of the gaze is likely to cross an overflow trigger location; and based at least in part on determining that the gaze is likely to cross the overflow trigger location, instruct the imaging device to adjust the acquiring of the media to capture content related to the object of interest.

17. The system of claim 16, comprising:

an inwardly focused imaging device, wherein the control circuitry configured to determine the gaze of the person in the vehicle is based on an image of the person obtained by the inwardly focused imaging device.

18. The system of claim 17, wherein the control circuitry configured to determine the gaze of the person is based on at least one of a gaze location of the person, an eye position of the person, a direction of the gaze of the person, a head position of the person, or a head orientation of the person.

19. The system of claim 16, comprising:

an extended display device, wherein the control circuitry is configured to:

further in response to determining the gaze of the person is focused on the object of interest, generate for display acquired media including the object of interest on the extended display device.

20. The system of claim 16, wherein the control circuitry is configured to: determine an interest of the person in the object of interest is based on the gaze of the person.

* * * * *